United States Patent [19]

Kajiura et al.

[11] 4,346,366

[45] Aug. 24, 1982

[54] SYSTEM FOR GENERATING AND MODIFYING DESIGNS FOR AUTOMATIC KNITTING MACHINERY AND THE LIKE

[75] Inventors: Toshihiro Kajiura, Osaka; Chiaki Masaki, Settsu; Masahiro Mori, Osaka, all of Japan

[73] Assignee: Kanebo Limited, Tokyo, Japan

[21] Appl. No.: 123,461

[22] Filed: Feb. 21, 1980

Related U.S. Application Data

[63] Continuation-in-part of Ser. No. 916,469, Jun. 19, 1978, abandoned, which is a continuation of Ser. No. 565,119, Apr. 4, 1975, abandoned.

[30] Foreign Application Priority Data

Apr. 9, 1974 [JP] Japan .................................. 49-39446

[51] Int. Cl.³ ............................................. G06F 15/46
[52] U.S. Cl. .............................. 340/146.3 R; 364/470; 364/900
[58] Field of Search ............... 364/470, 200, 900, 488, 364/518; 66/50 R, 232, 238

[56] References Cited

U.S. PATENT DOCUMENTS

| | | | |
|---|---|---|---|
| 3,634,827 | 1/1972 | Lourie et al. | 364/470 |
| 3,644,935 | 2/1972 | Lourie | 340/707 |
| 3,671,944 | 6/1972 | Dubner | 364/470 |
| 3,744,035 | 7/1973 | Geirhos et al. | 364/470 |
| 3,844,139 | 10/1974 | De Cerjat et al. | 66/50 R |
| 3,851,315 | 11/1974 | Anderson | 364/200 |
| 3,890,806 | 6/1975 | Grozinger | 66/50 R |
| 3,924,244 | 12/1975 | Seitz | 364/470 |
| 4,078,253 | 3/1978 | Kajiura et al. | 364/470 |

*Primary Examiner*—Leo H. Boudreau
*Attorney, Agent, or Firm*—Nelson E. Kimmelman

[57] ABSTRACT

A computerized pattern generating system for producing a knit or a woven pattern has been found. Any desired pattern can be obtained without drafting a picture. The system has at least a digital memory and an arithmetic unit. On the digital memory, each color of a knit pattern corresponds to binary digital 00, 01, 10 or 11. Said digital information is automatically created by using the arithmetic unit, and is further modified according to the desired pattern. The pattern on the digital memory is applied to a fabric-making machine through a punched paper tape, a direct communication line, or any magnetic storage means.

7 Claims, 118 Drawing Figures

FIG.1a
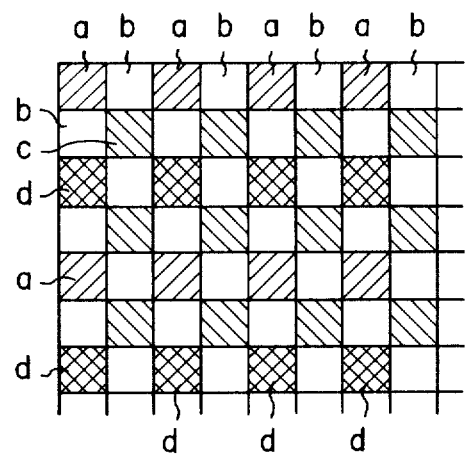
FIG.1b
FIG. 2
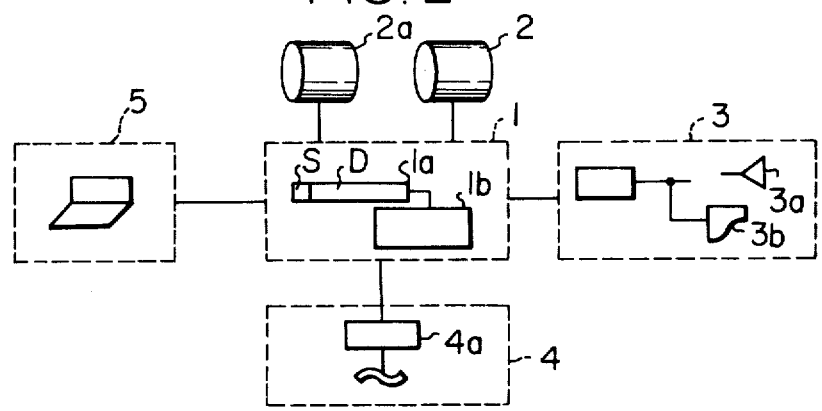

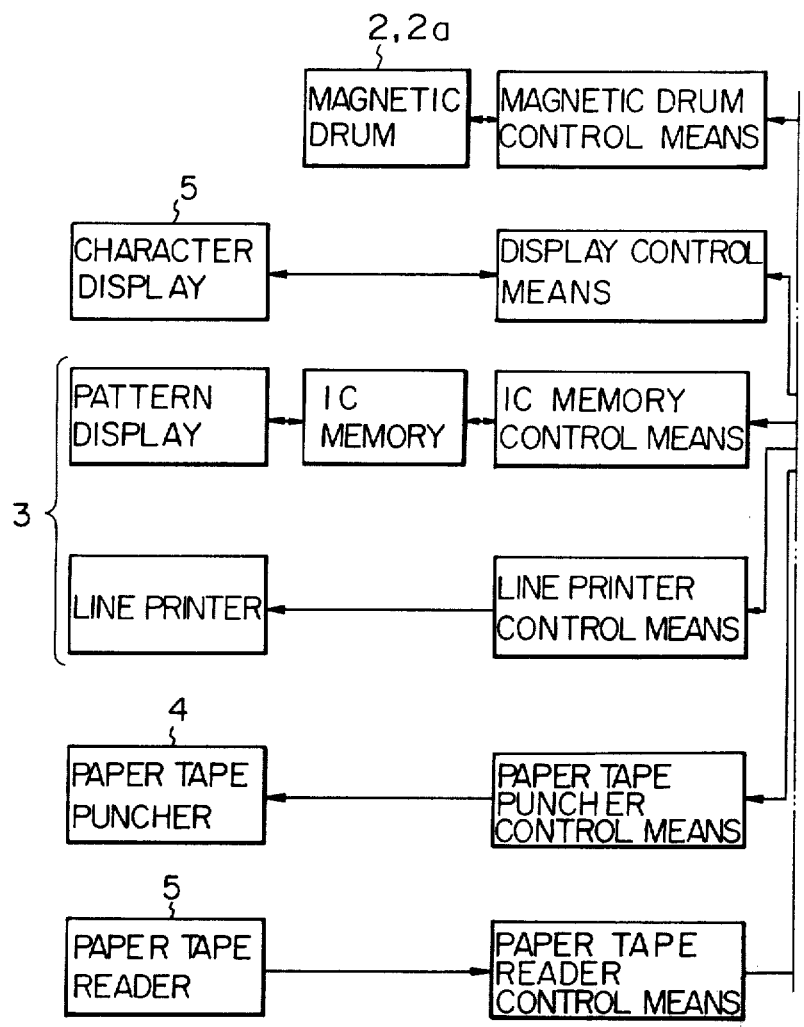

FIG.4a
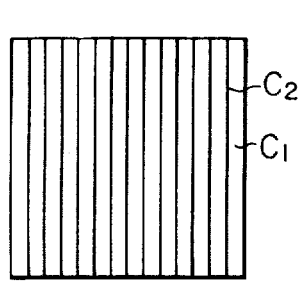
FIG.4b
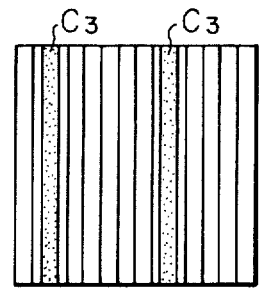
FIG.4c
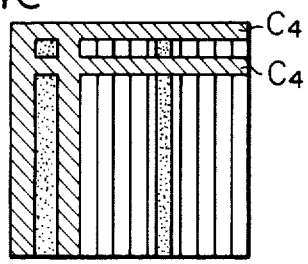
FIG.4d
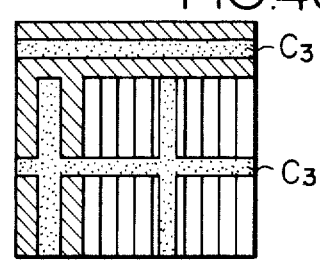
FIG.4e
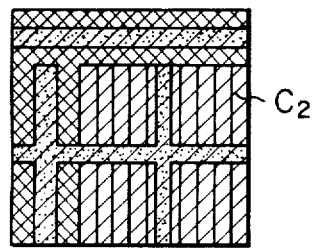
FIG.4f
FIG.4g
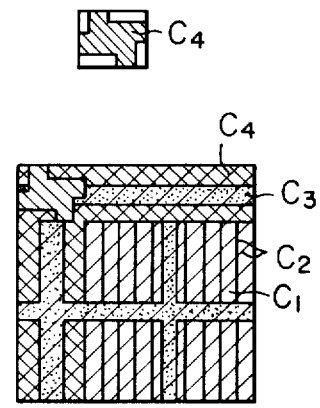

Fig 5
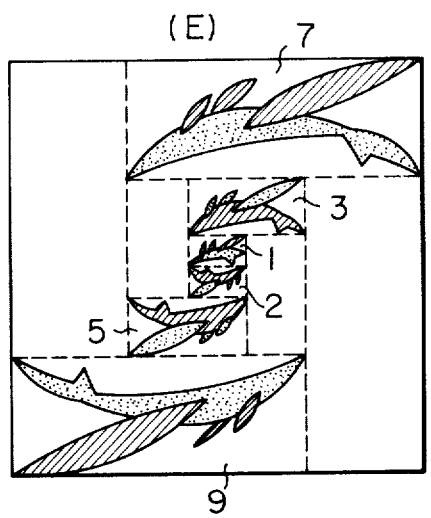
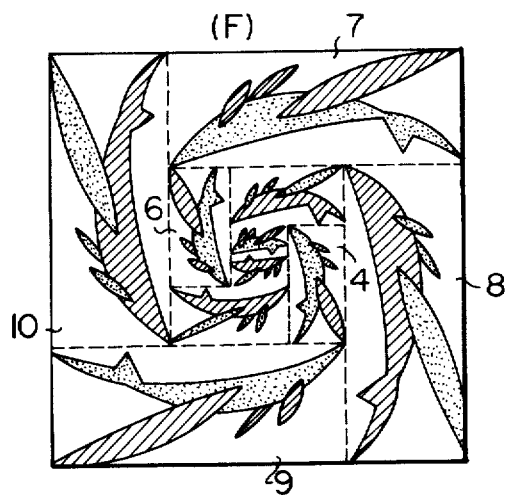
Fig. 6
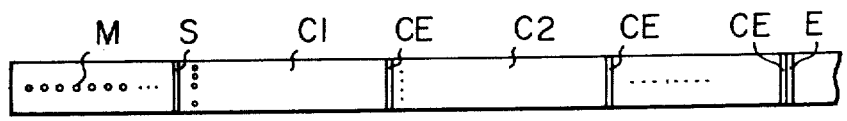

FIG.5a
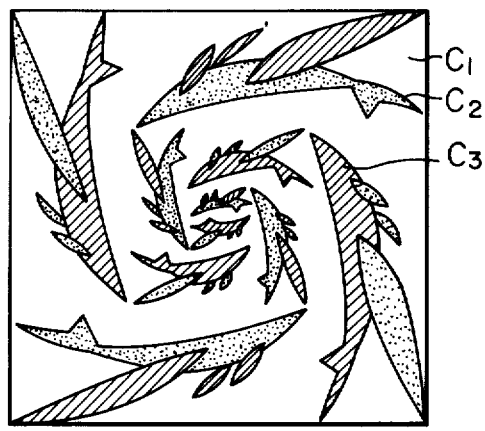
FIG.5b
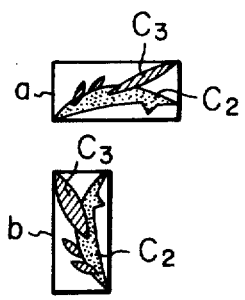
FIG.5c
FIG.5d
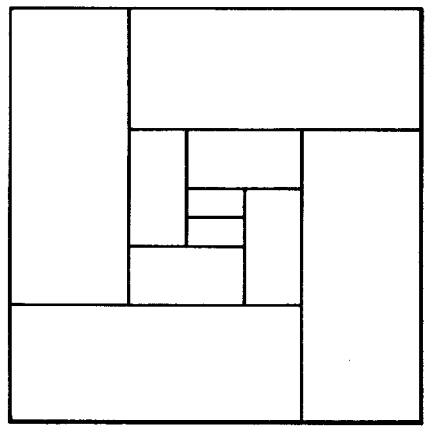
FIG.5e
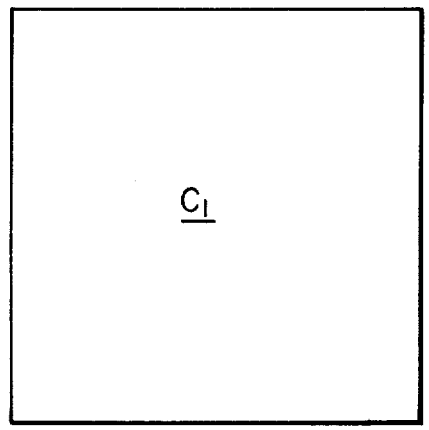

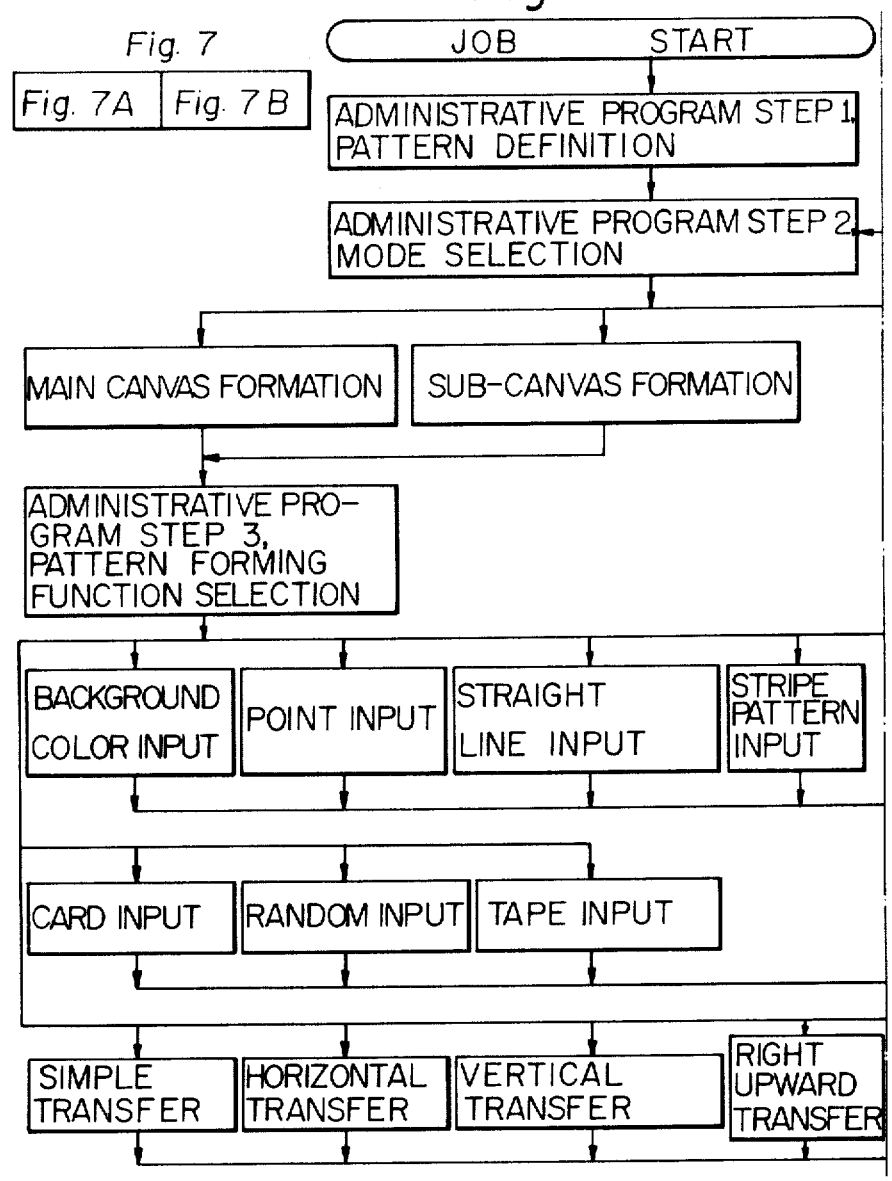

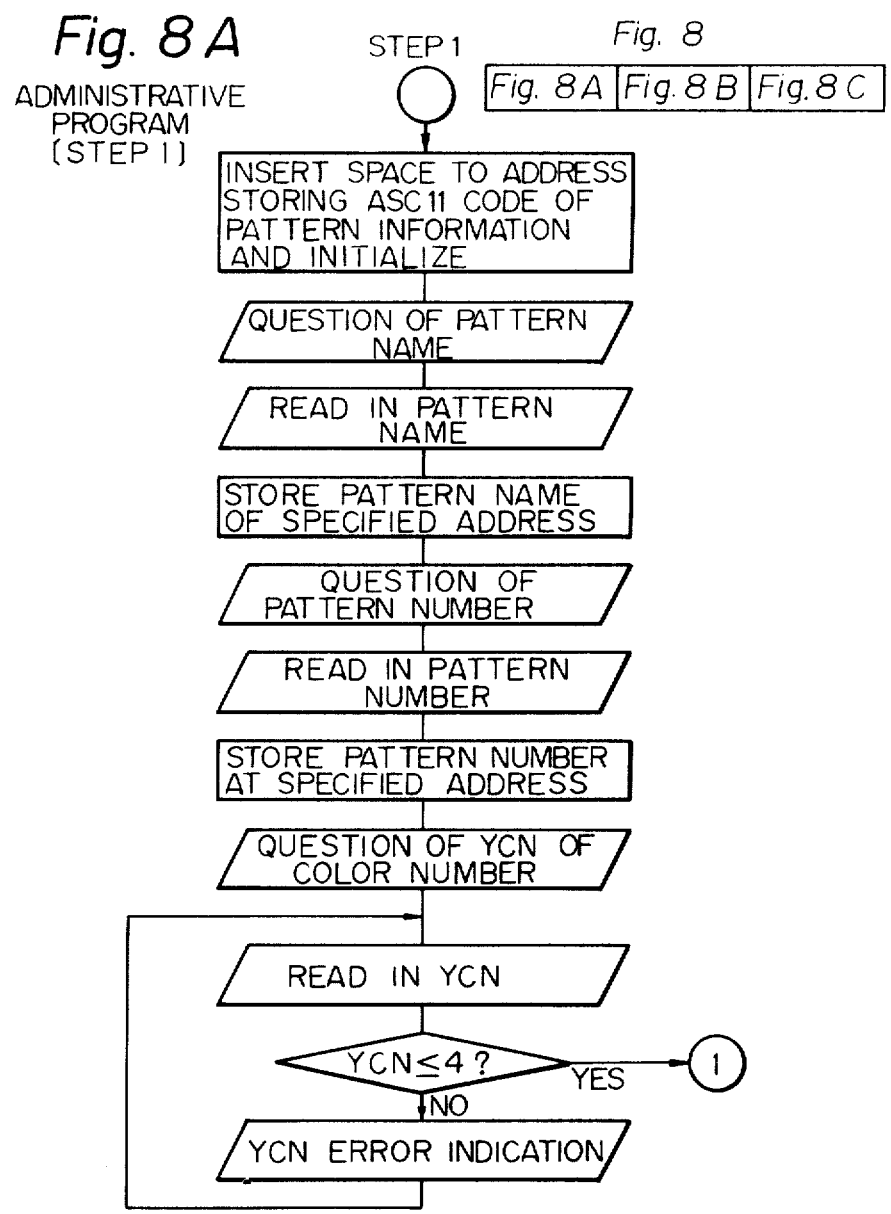

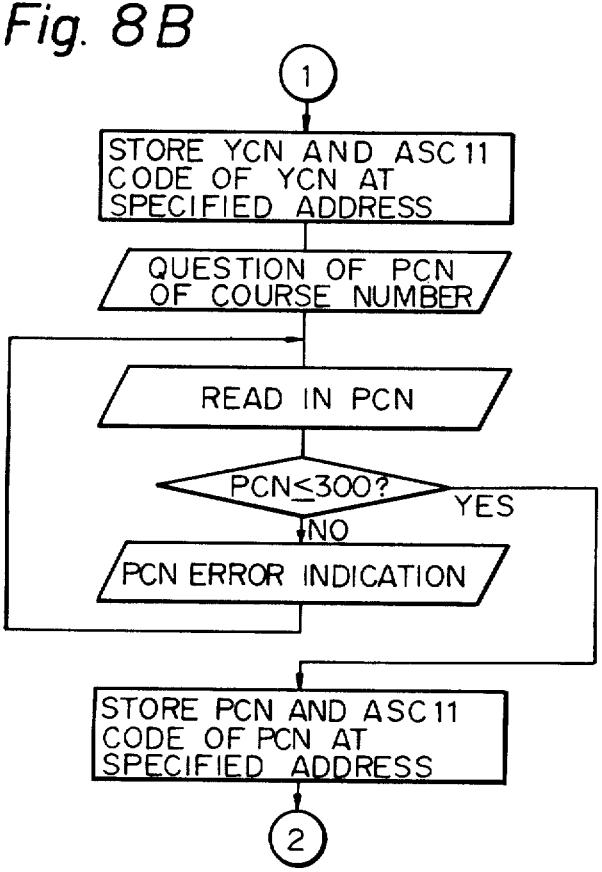

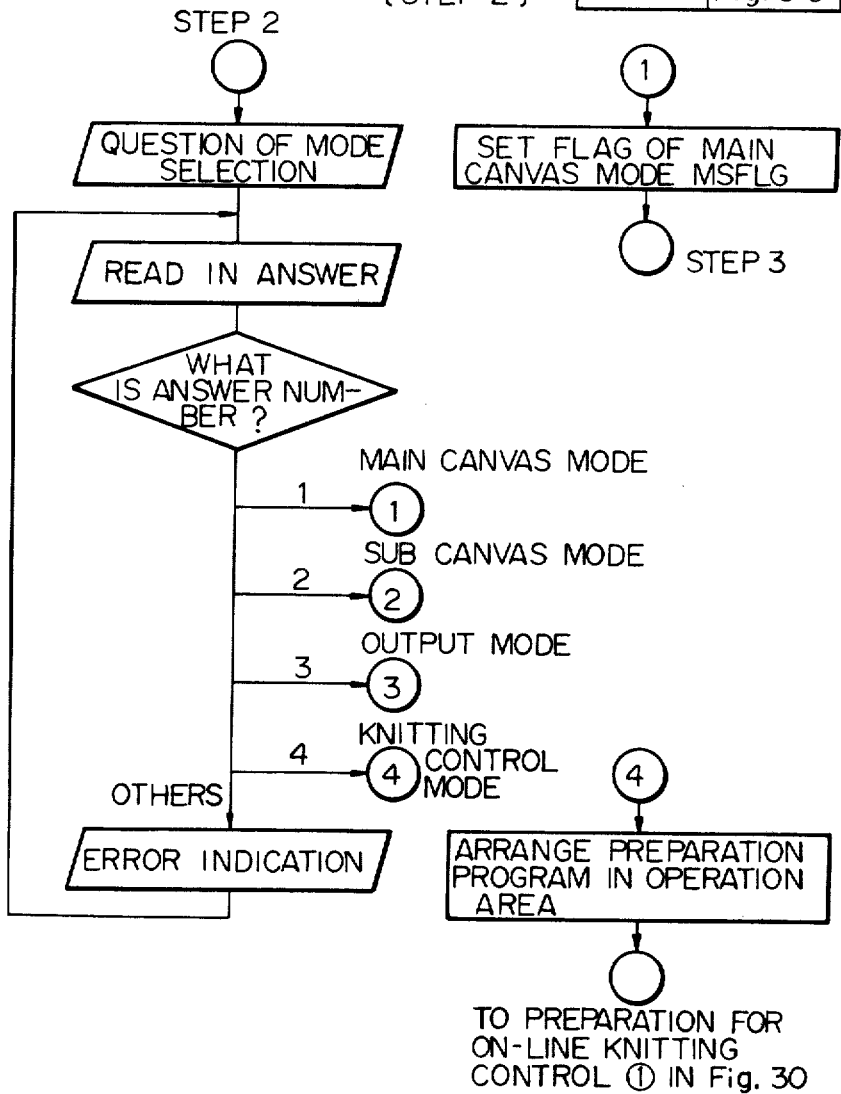

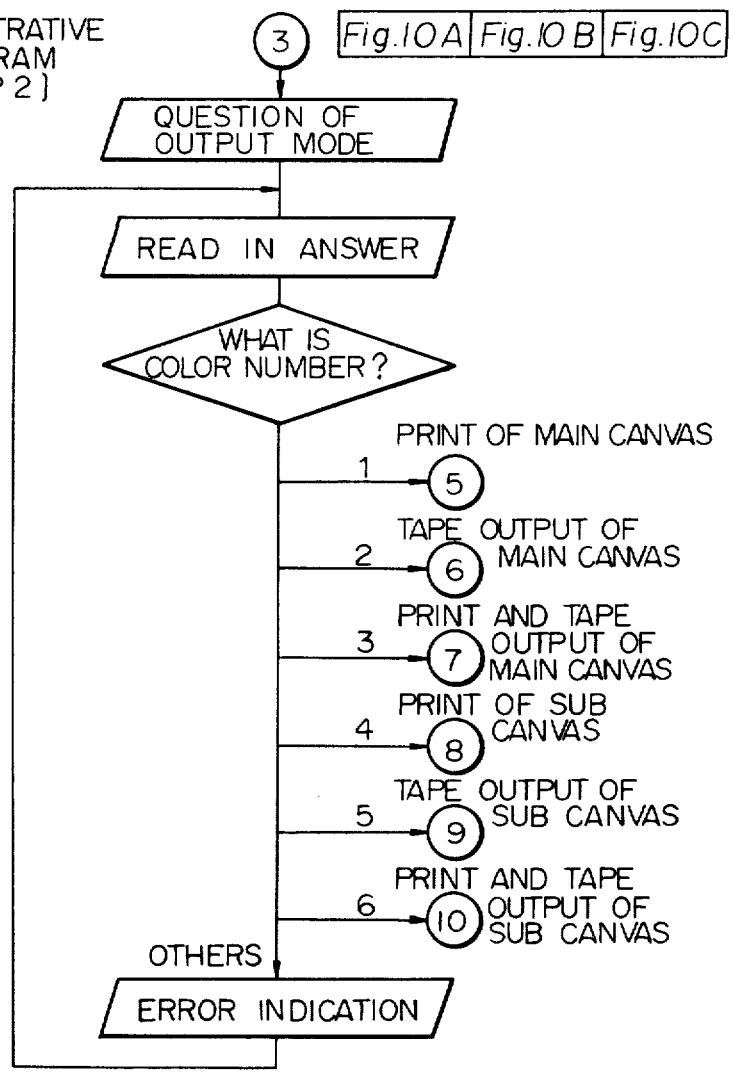

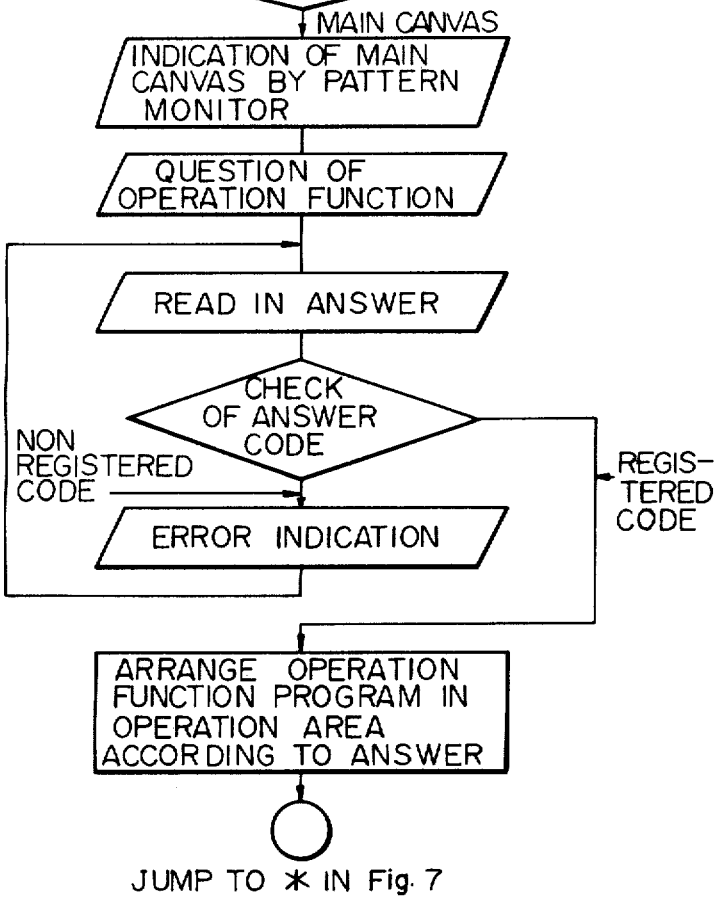

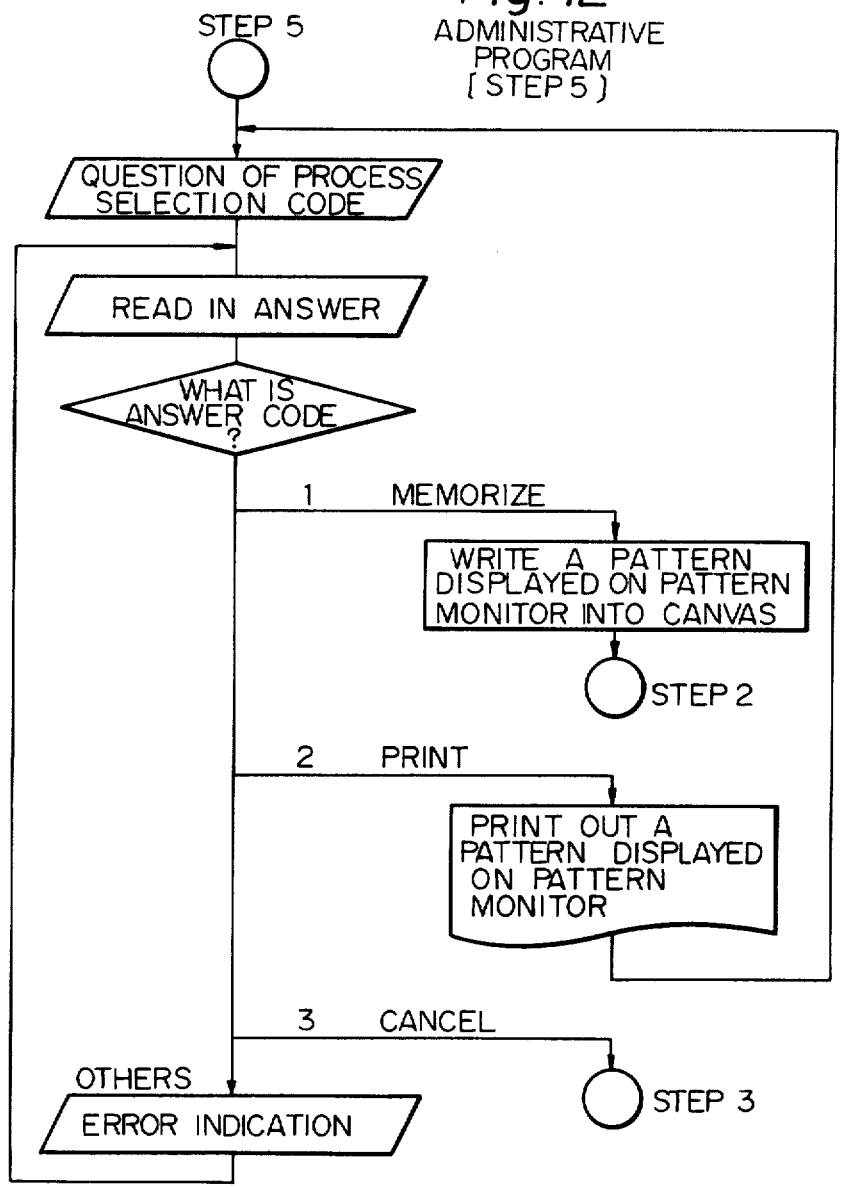

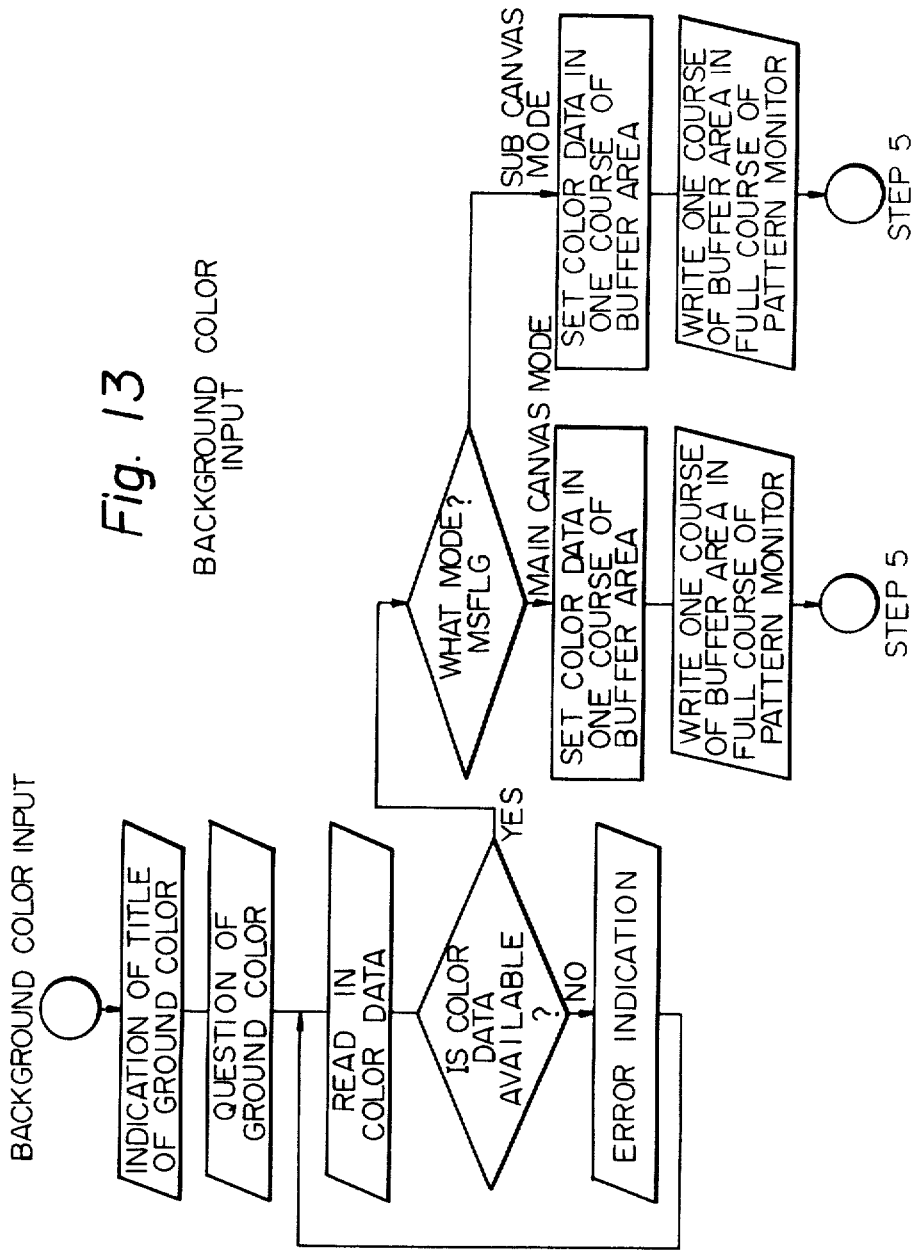

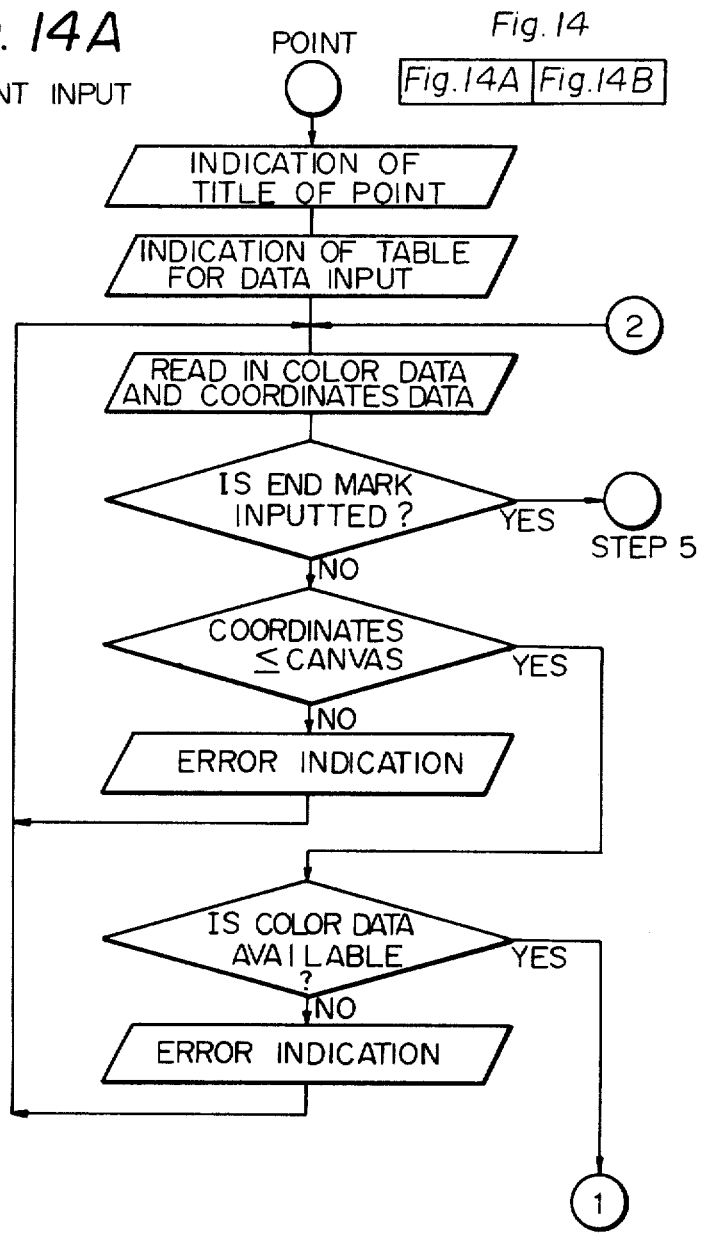

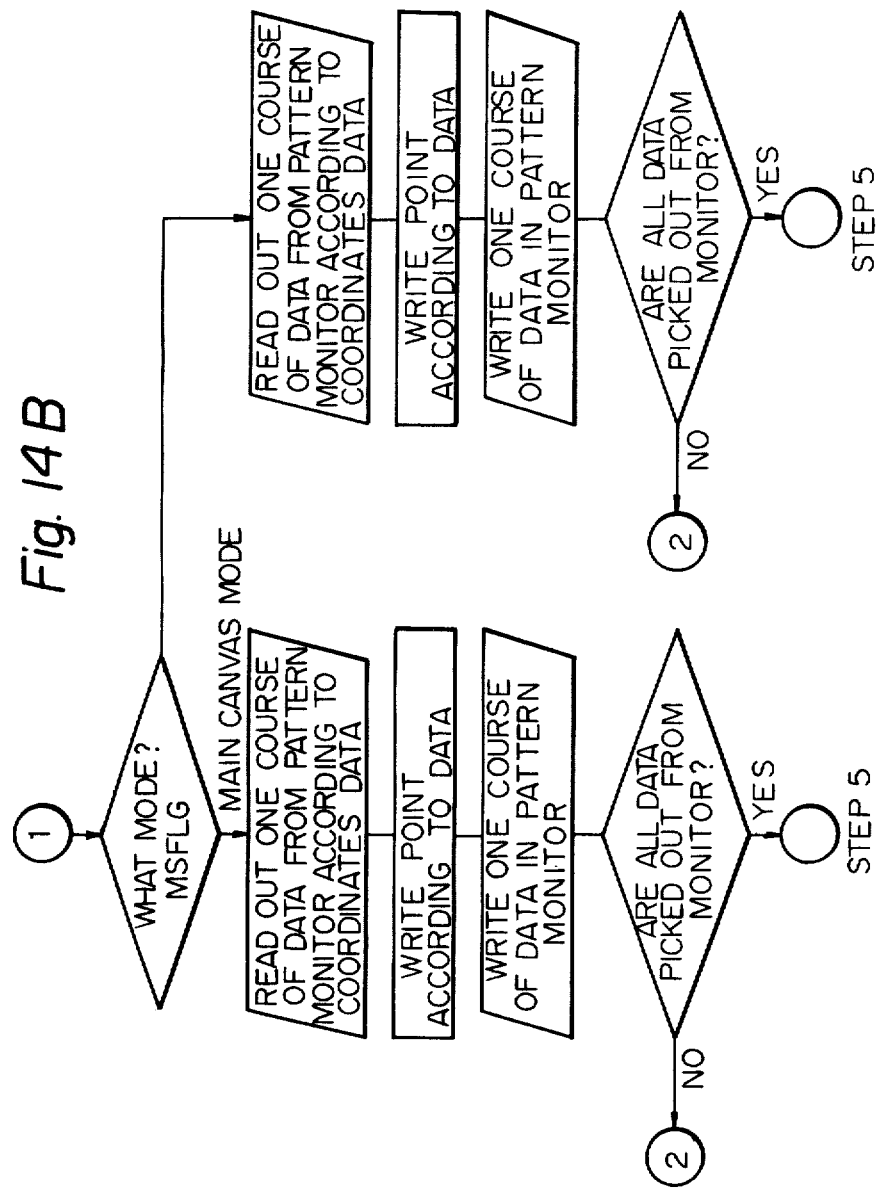

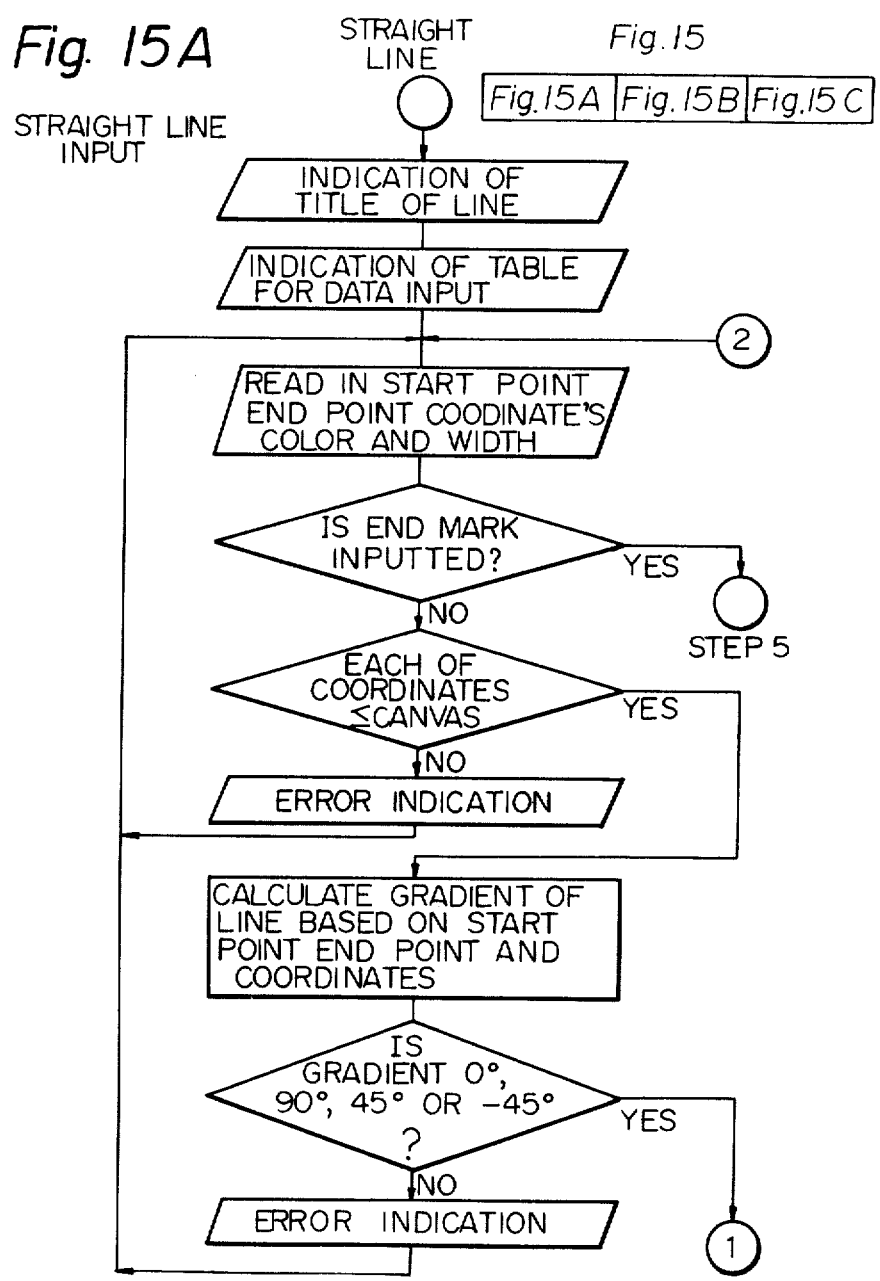

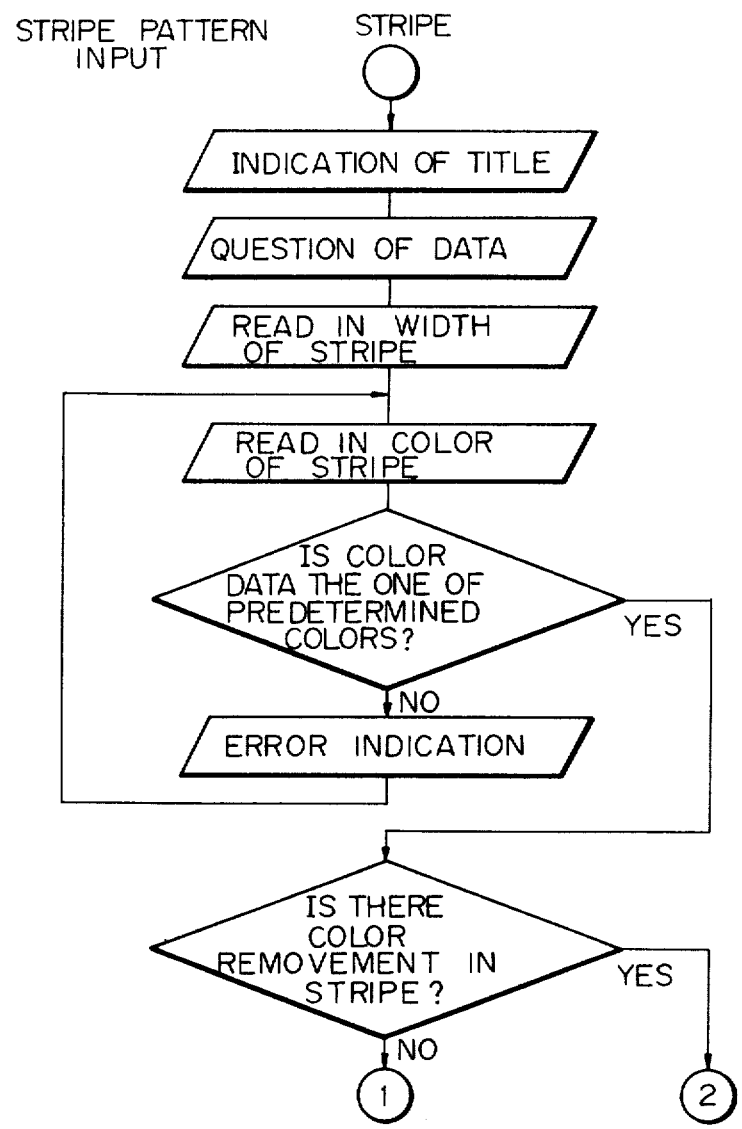

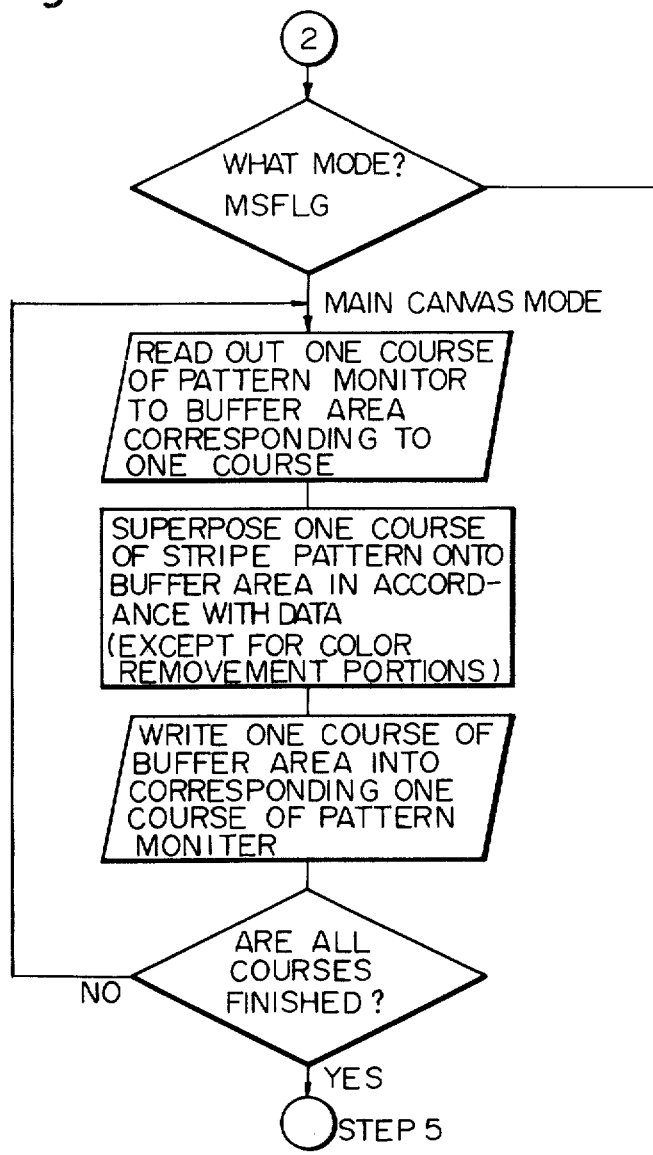

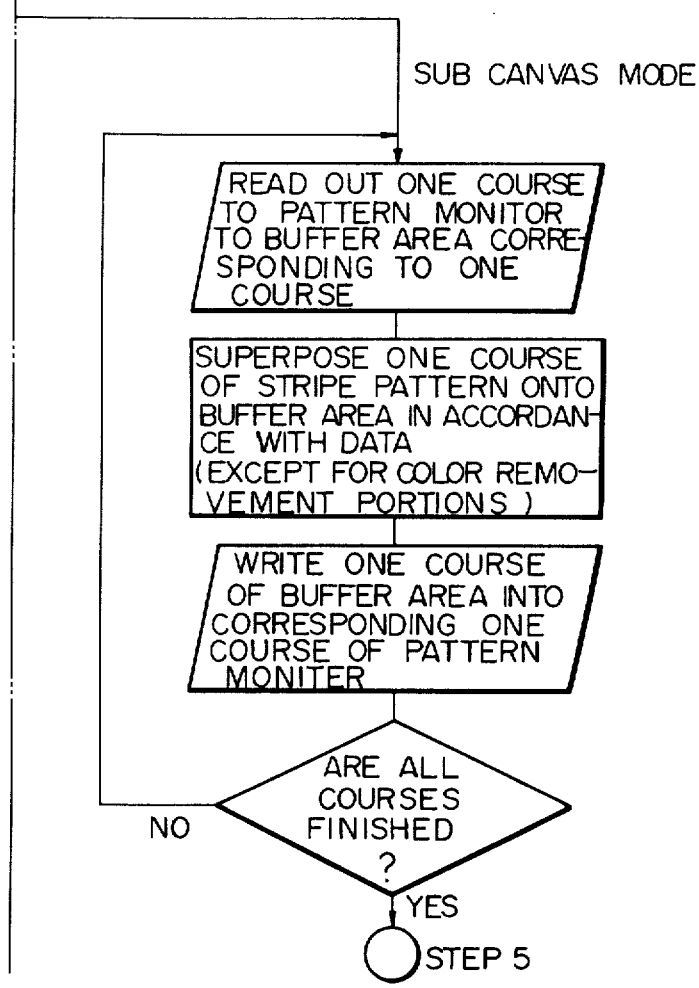

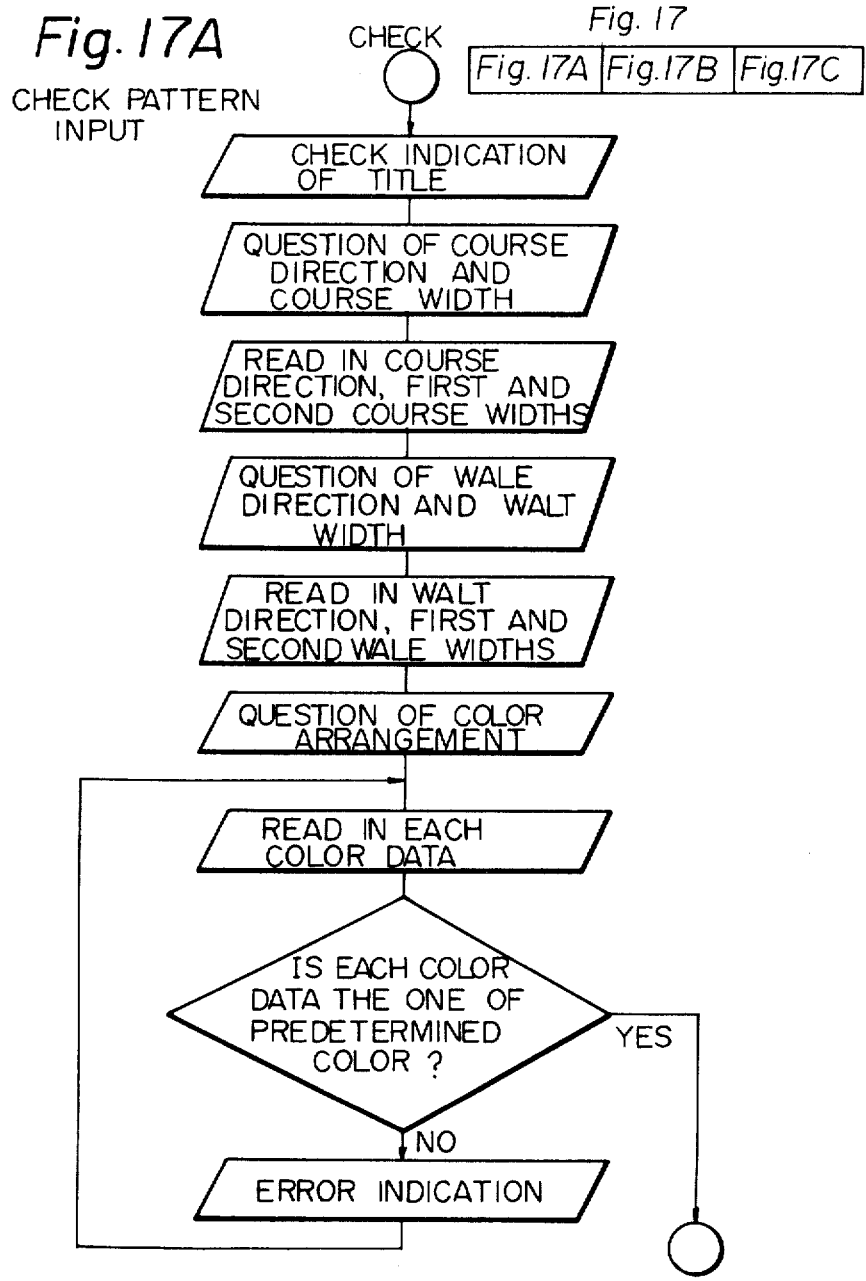

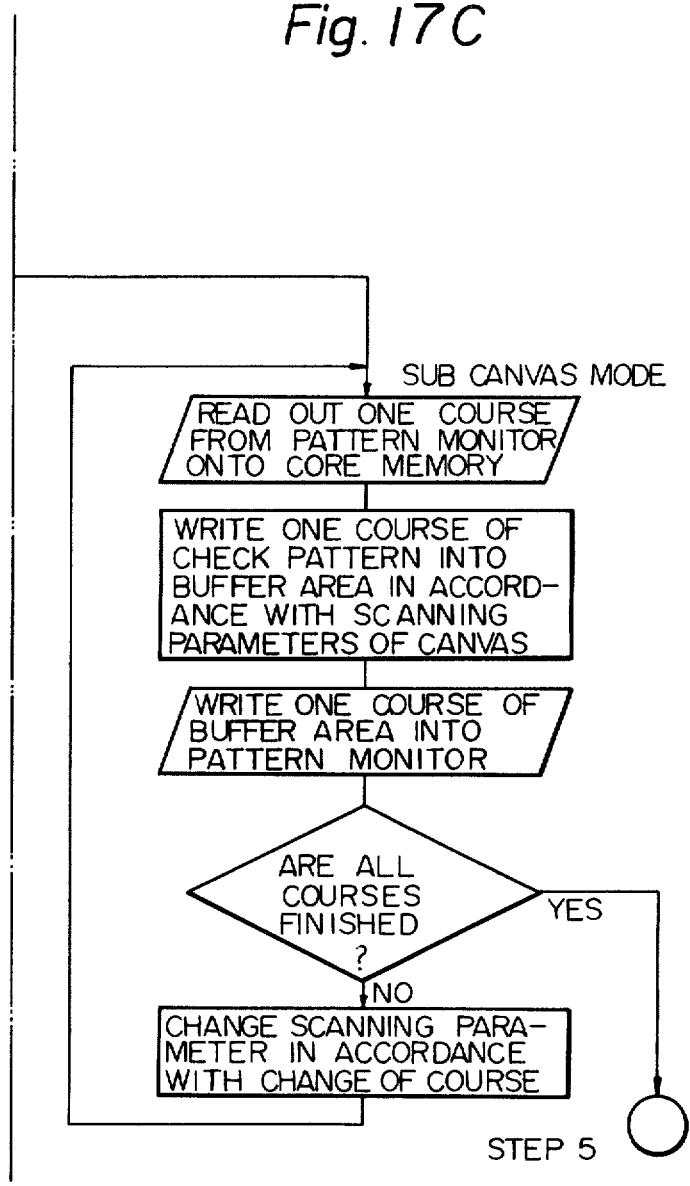

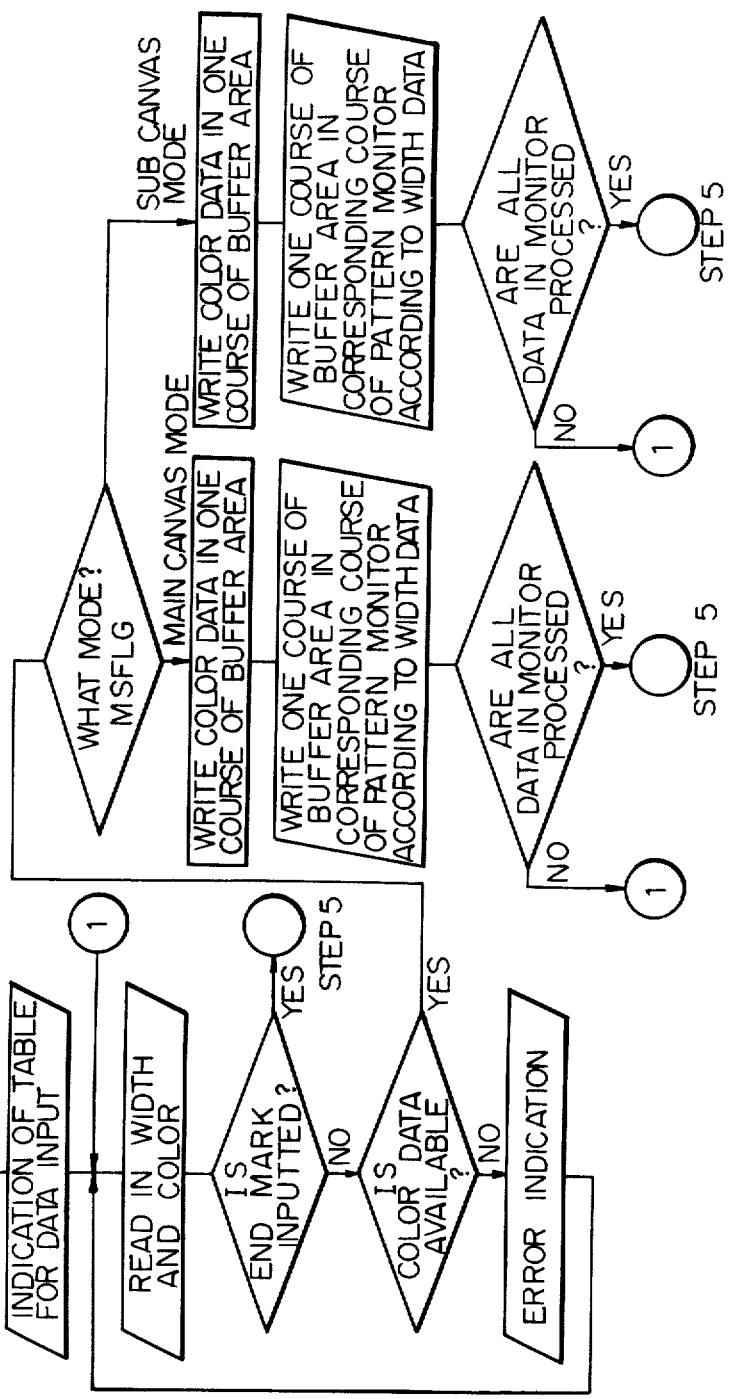
Fig. 18 BORDER PATTERN INPUT

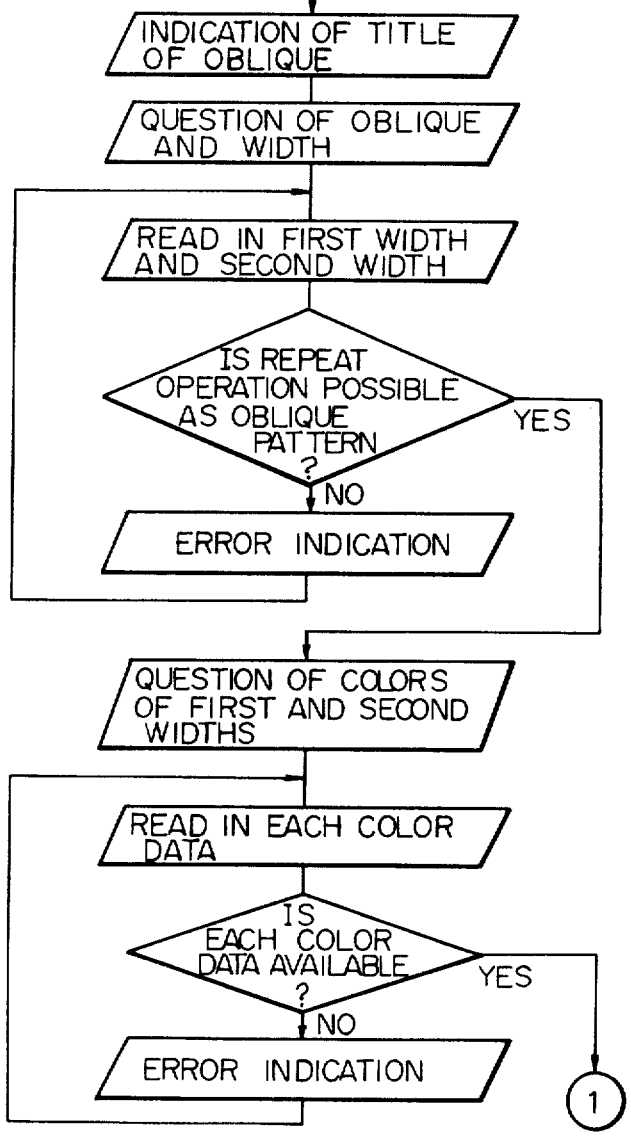

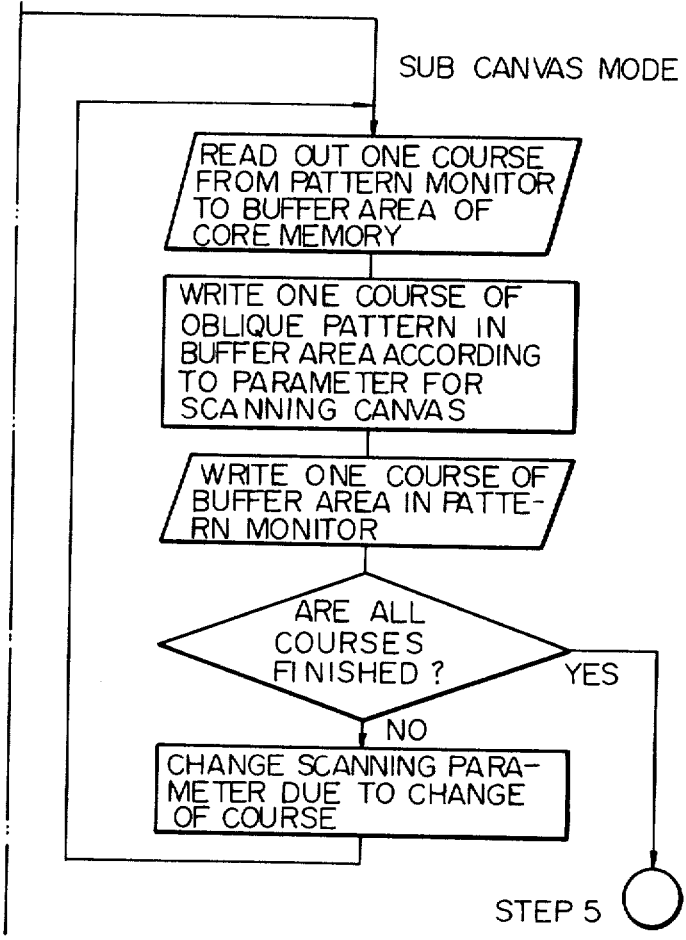

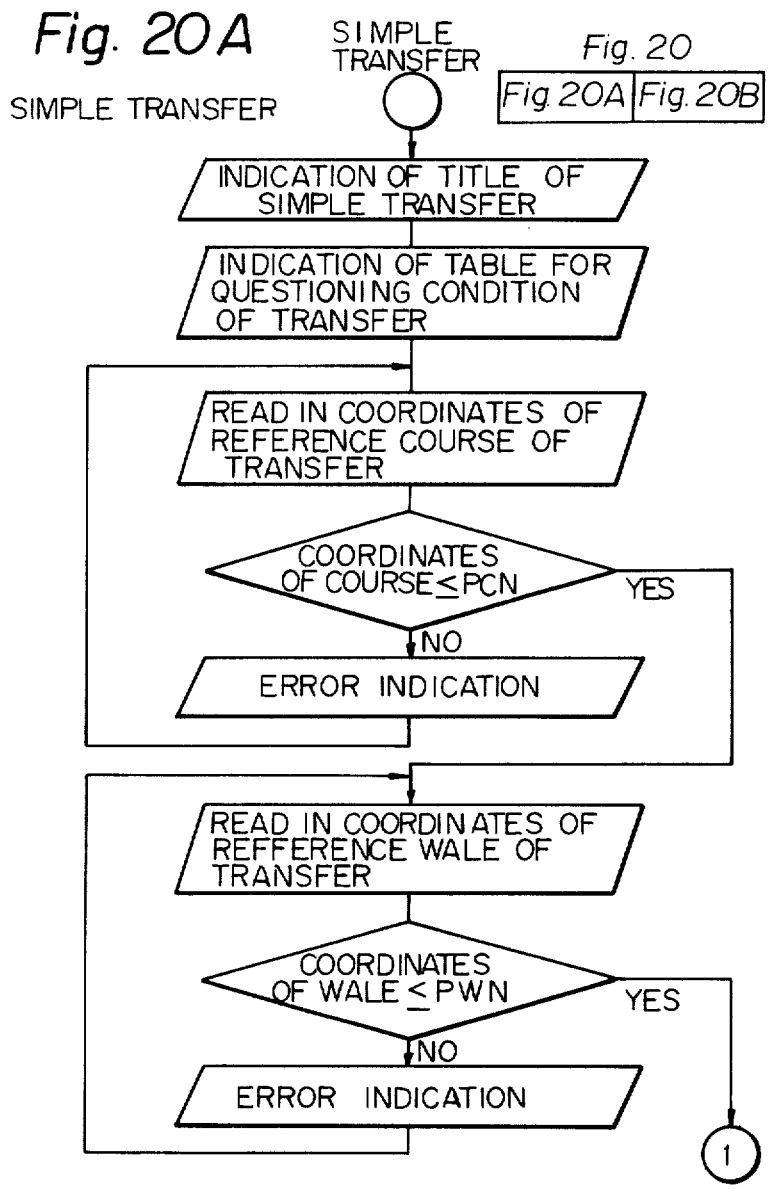

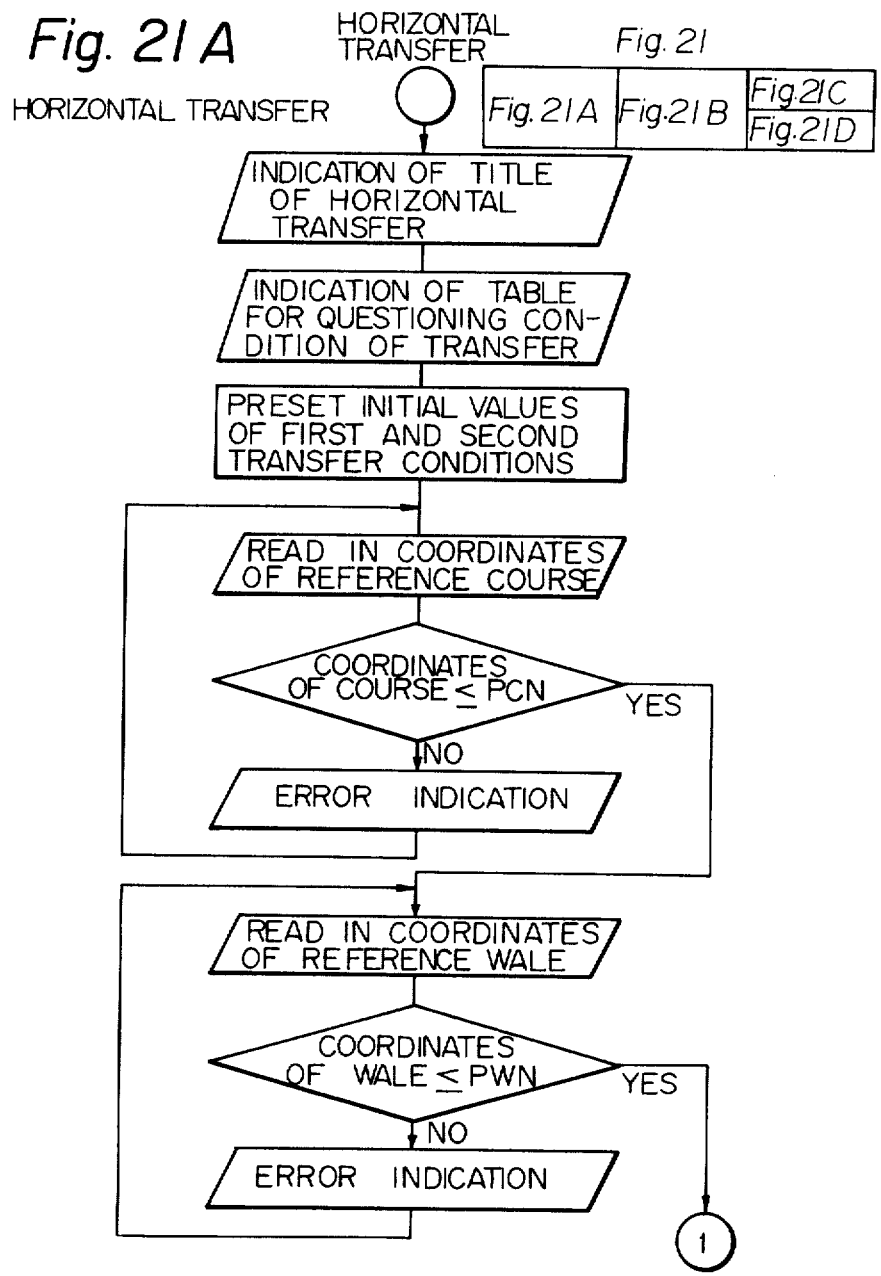

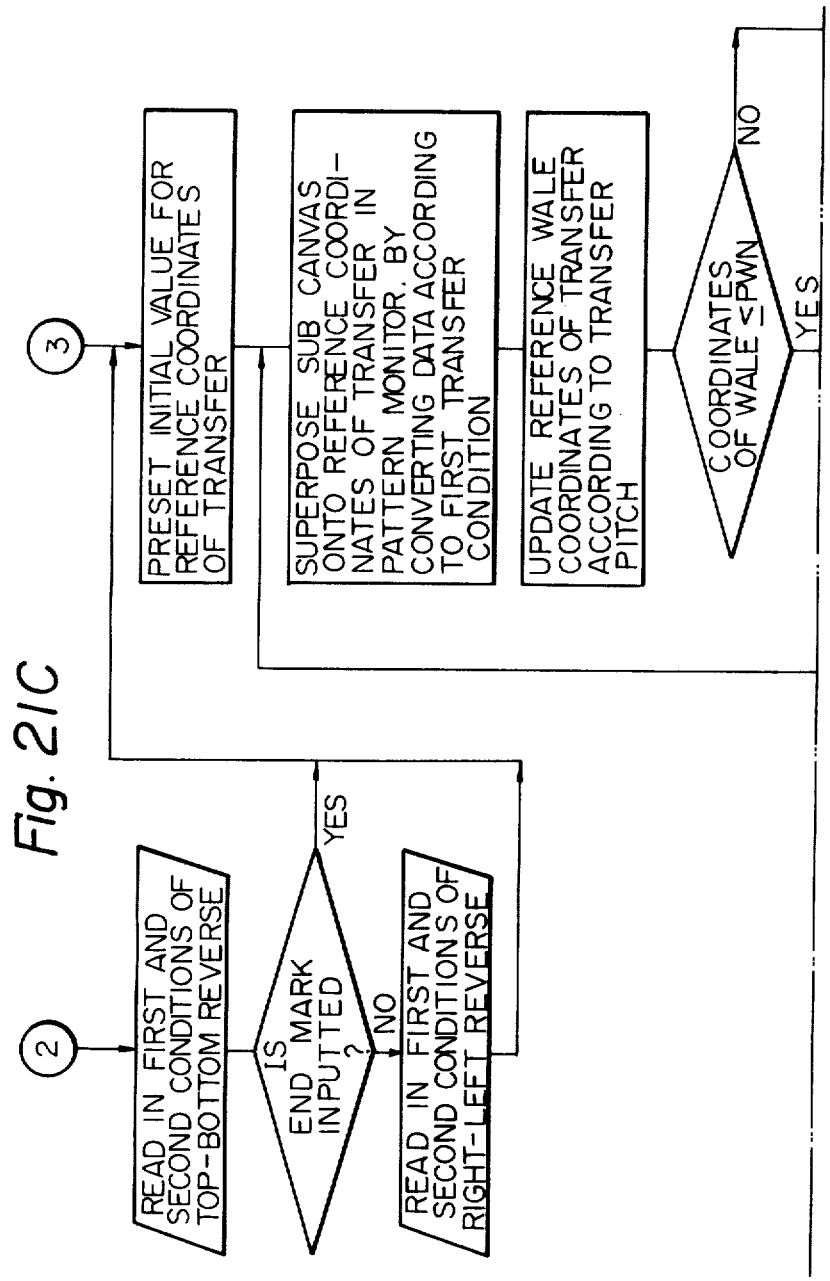

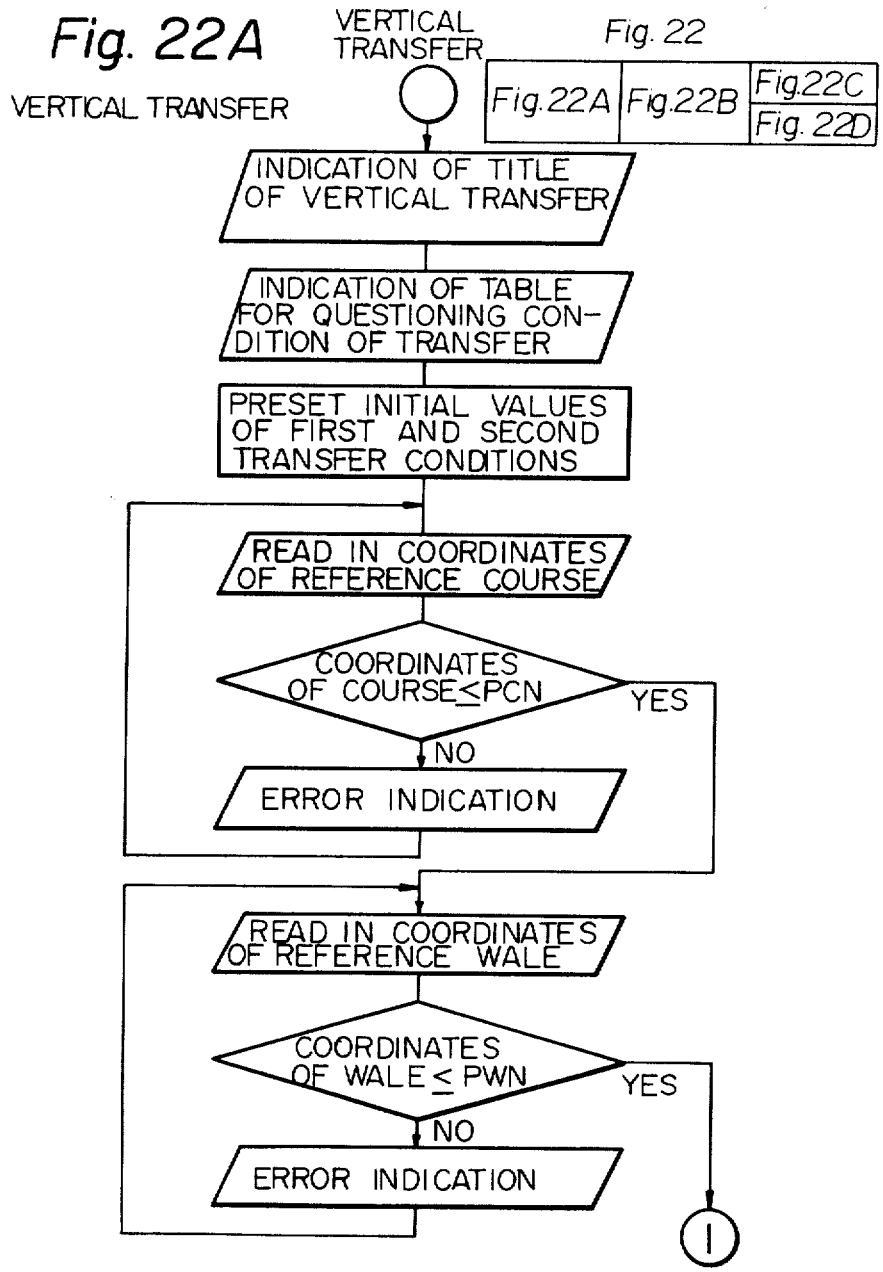

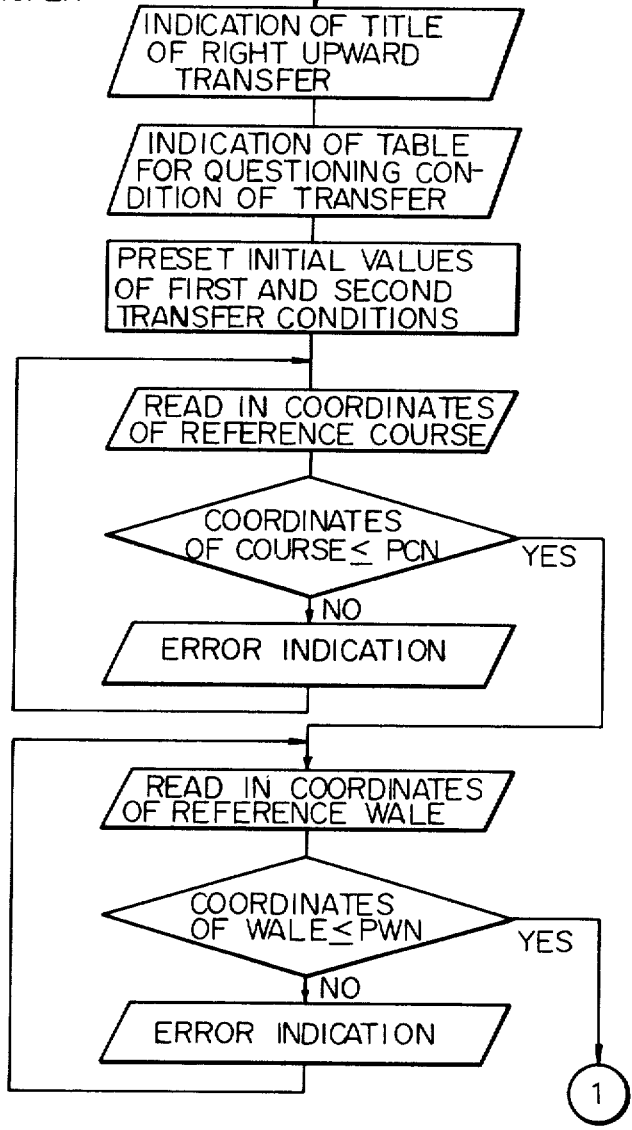

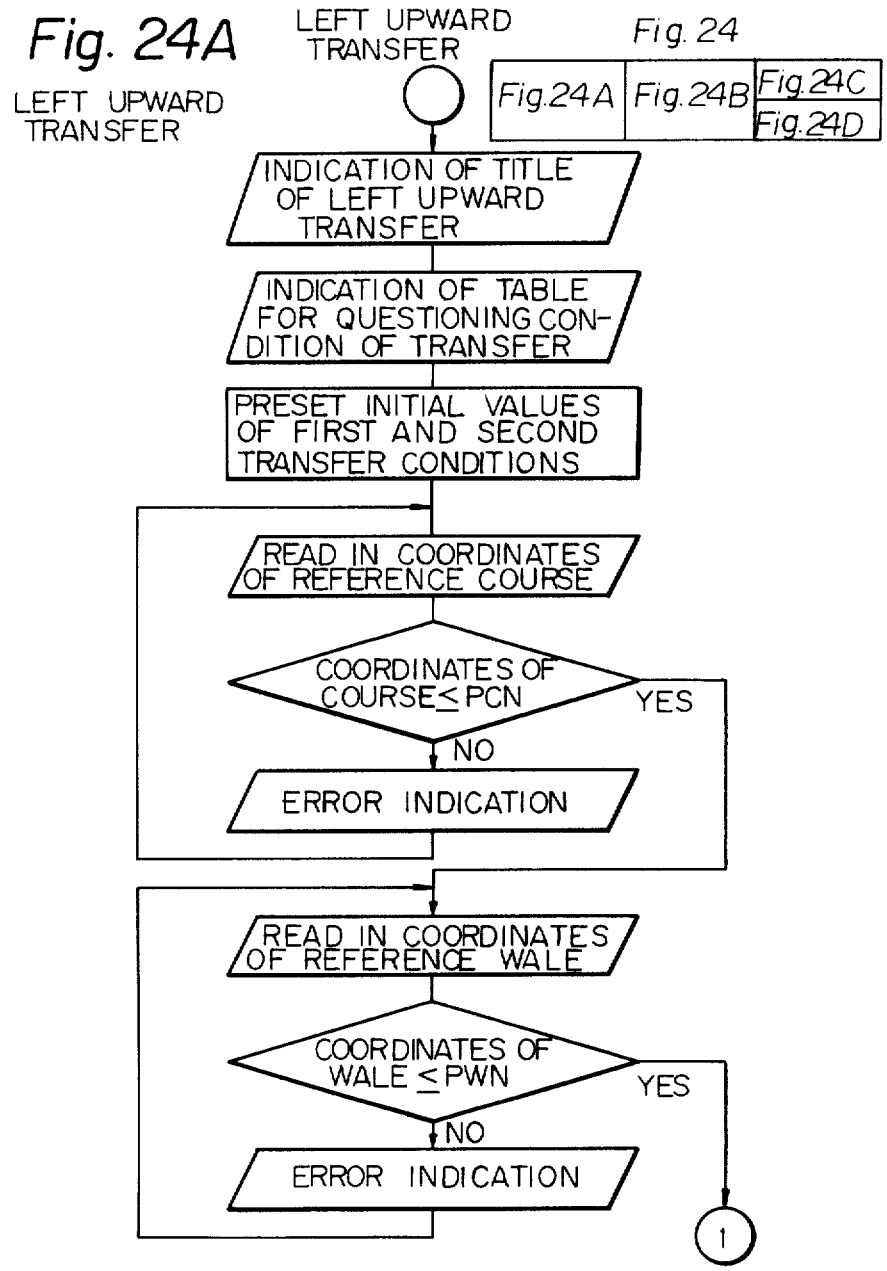

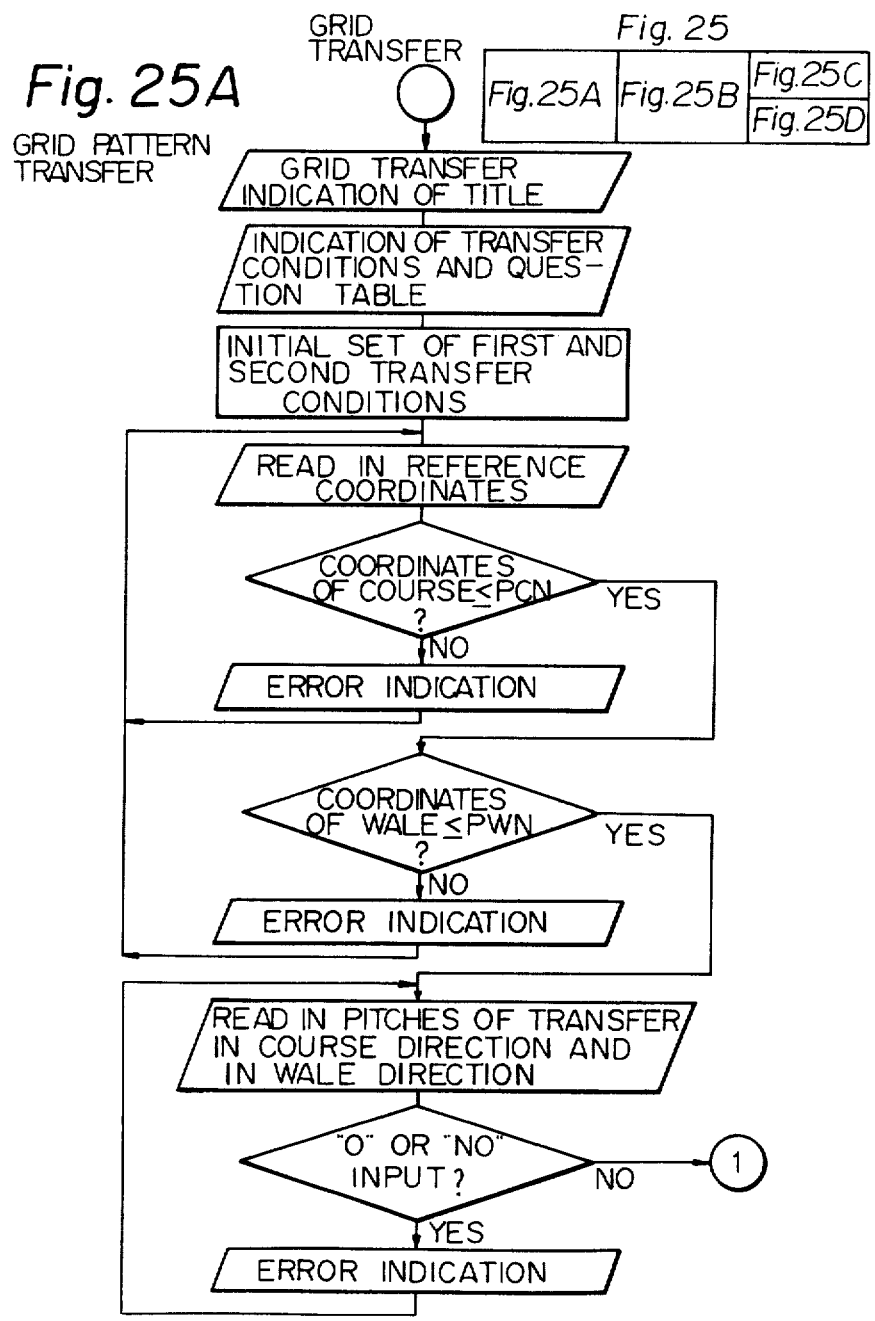

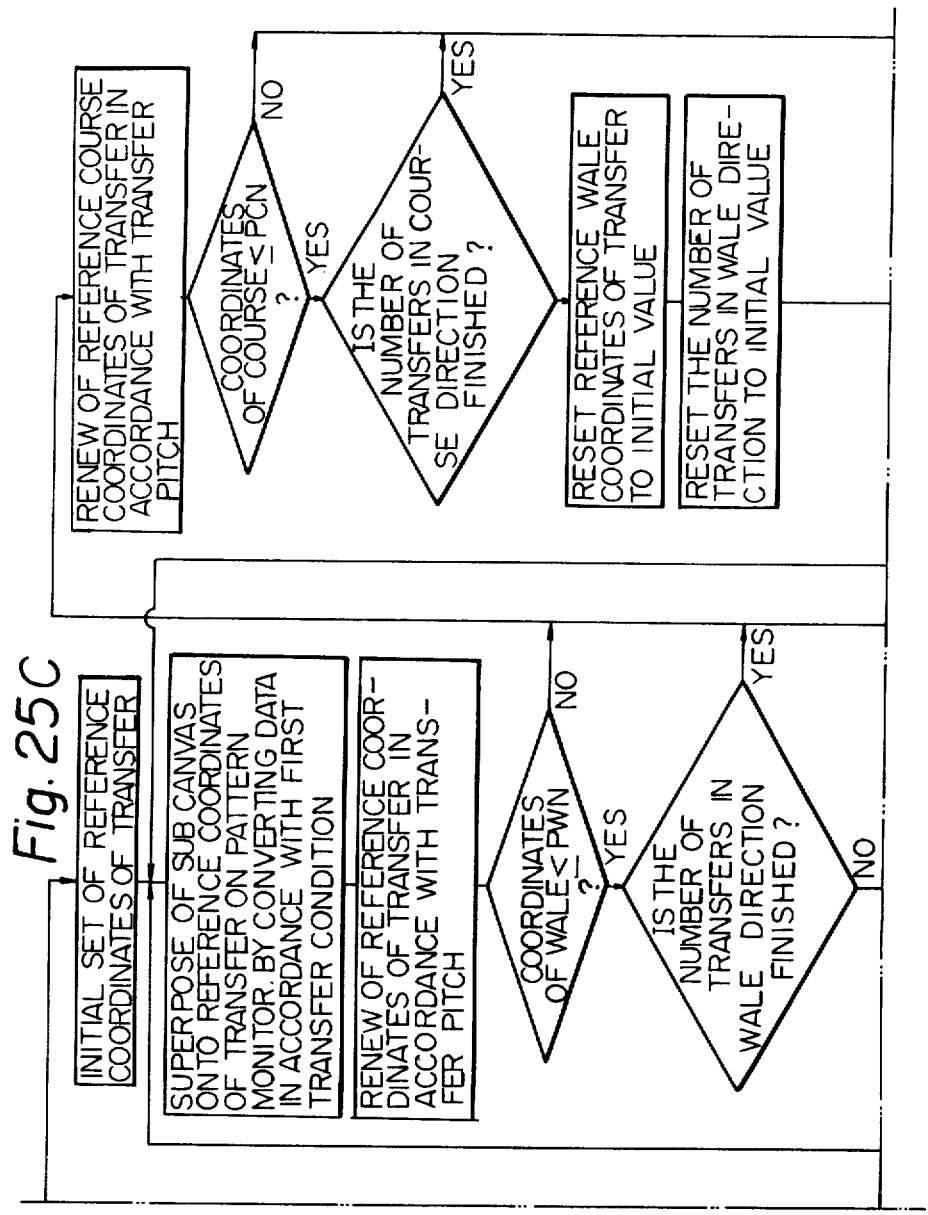

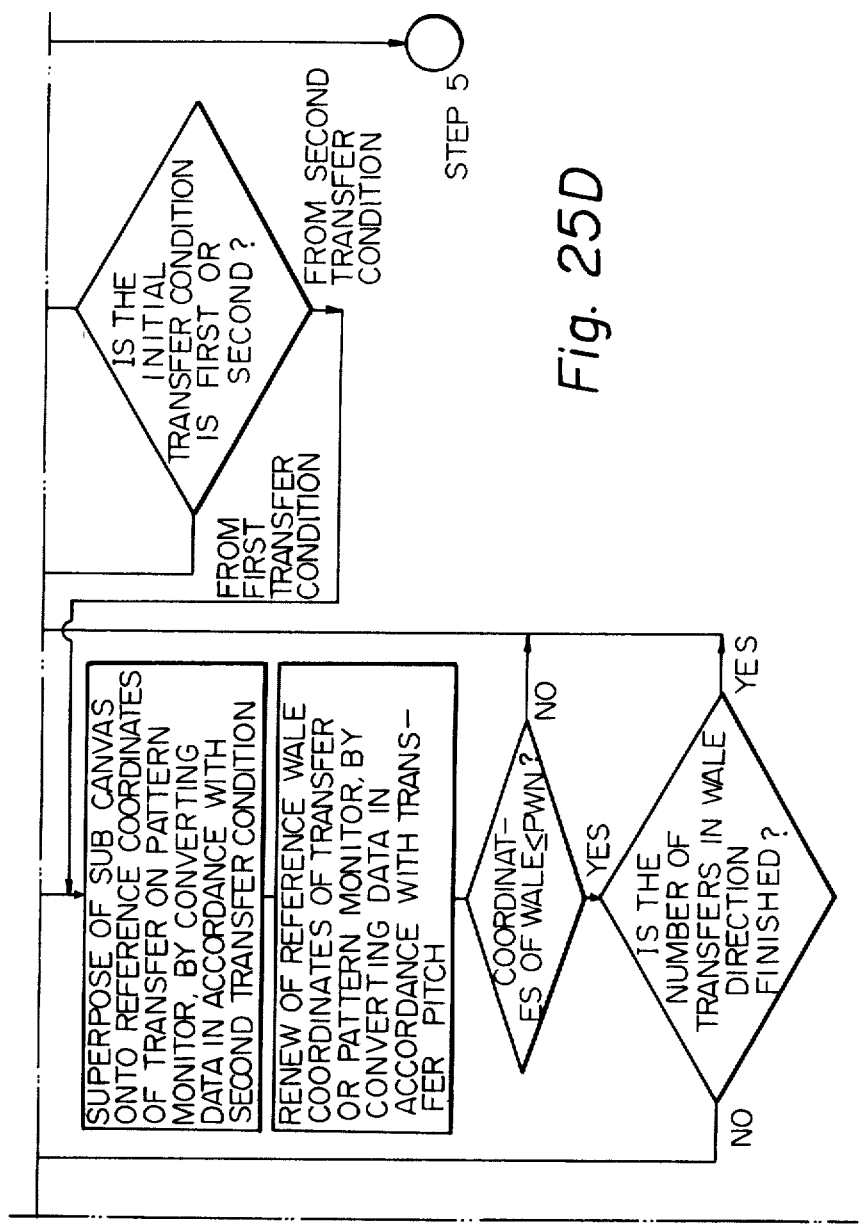

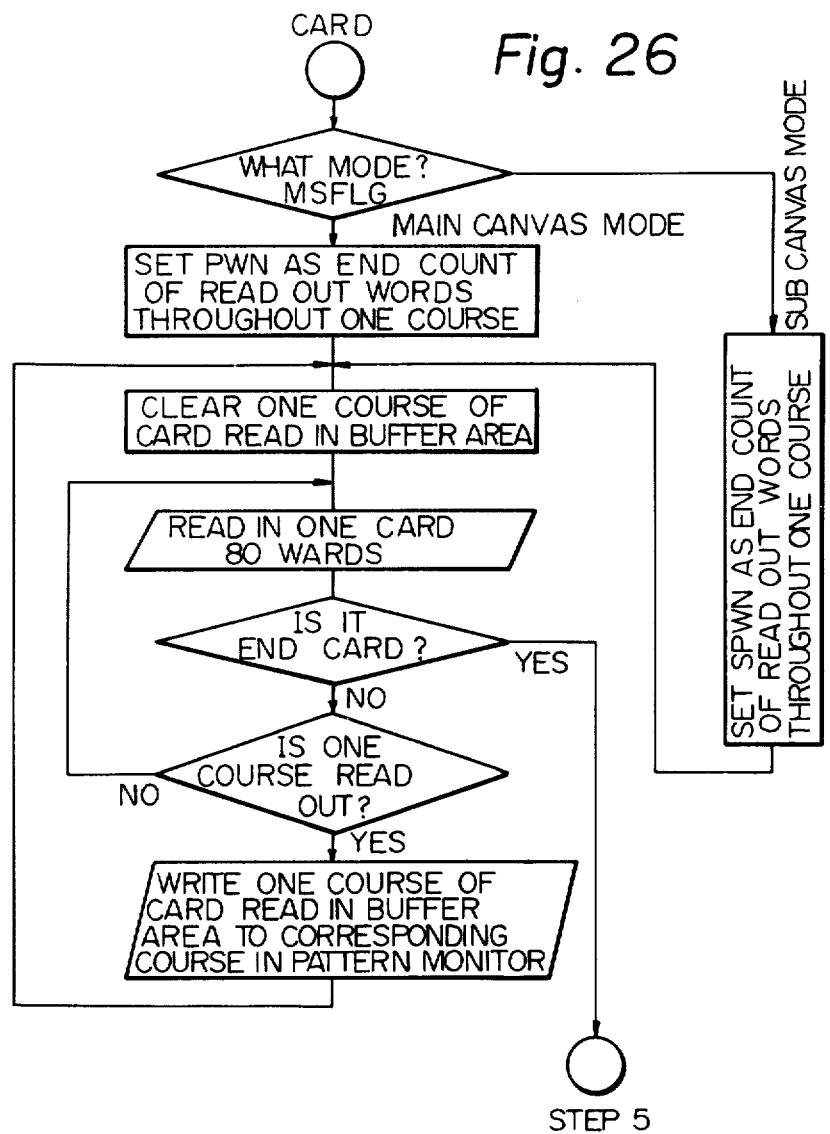

RANDOM INPUT

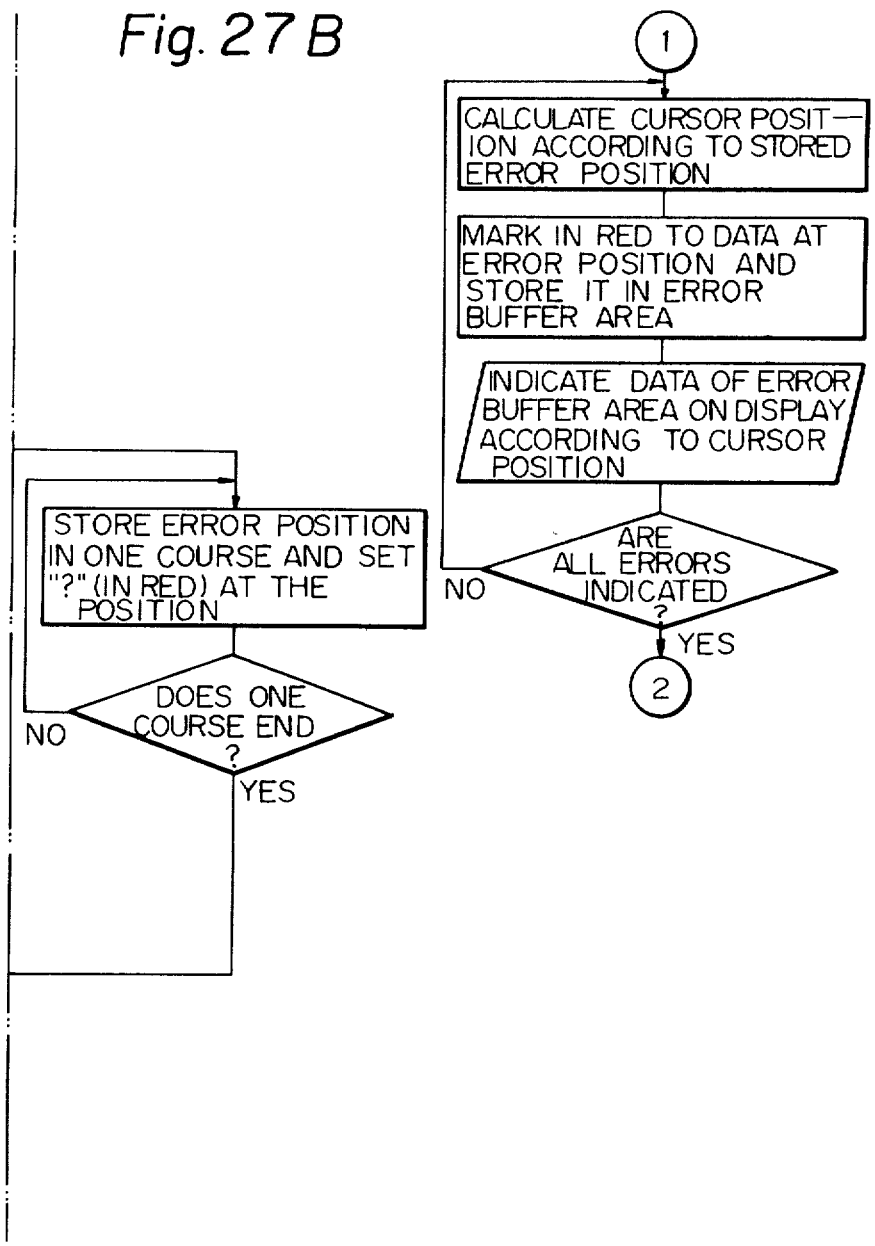

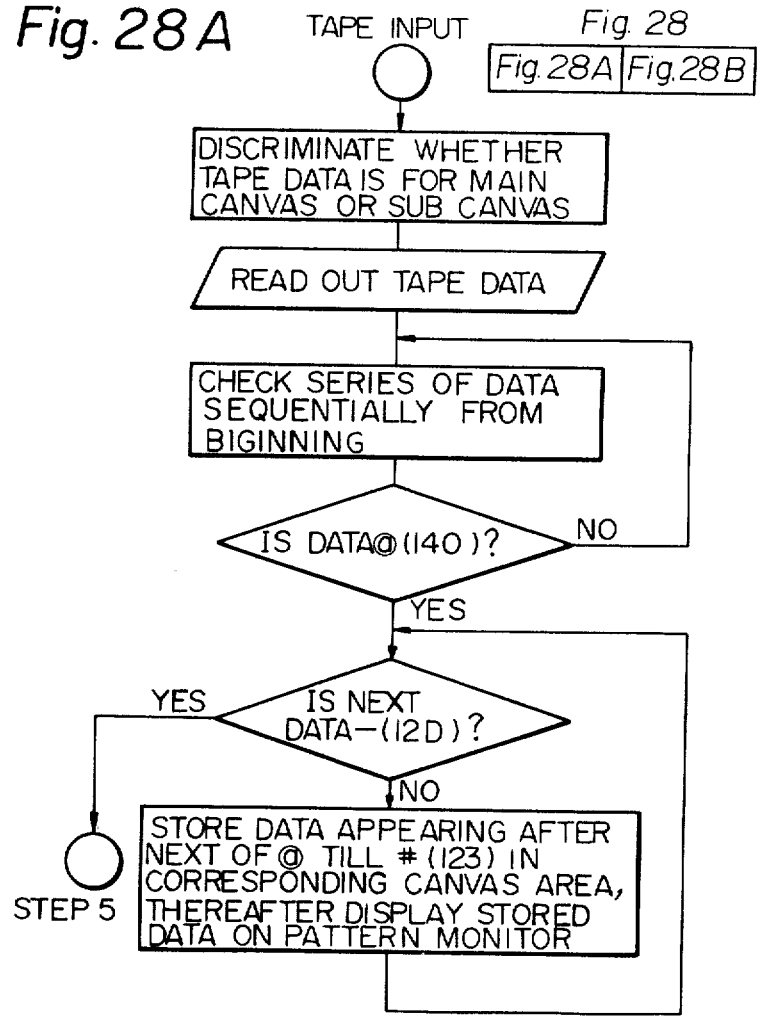

* SPECIFICATION OF TAPE INPUT

TAPE OUTPUT

Fig. 29B
\* FUNDAMENTAL OF PATTERN TAPE
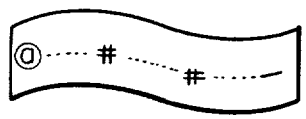
{ @ ONE DISPLAY START
  # COURSE CHANGE
  — ONE DISPLAY END
DATA ARE PUNCHED ACCORDING
TO ASCII CODE (130, 131, 132, 133)
\* SPECIFICATION OF THE TAPE
   OUTPUT
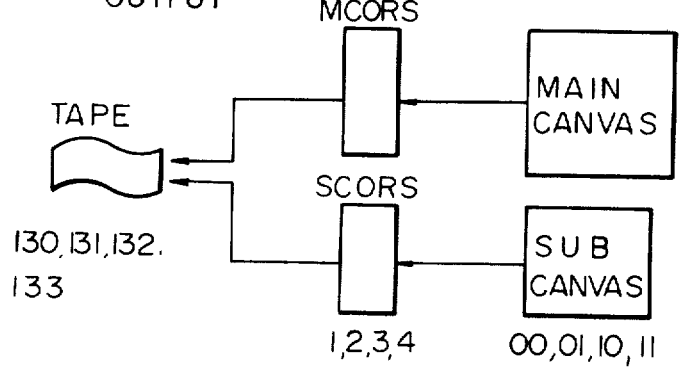

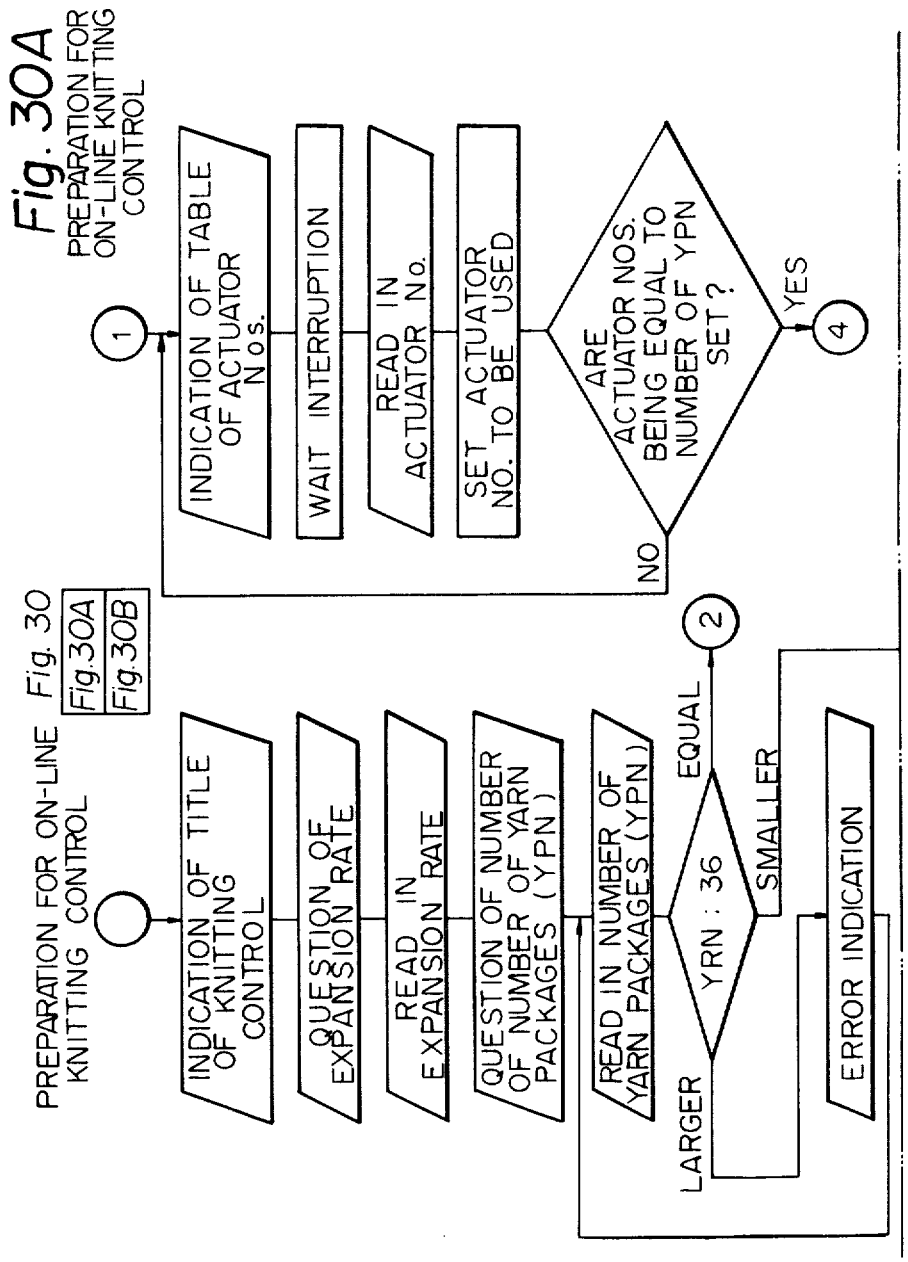

PREPARATION FOR ON-LINE KNITTING CONTROL

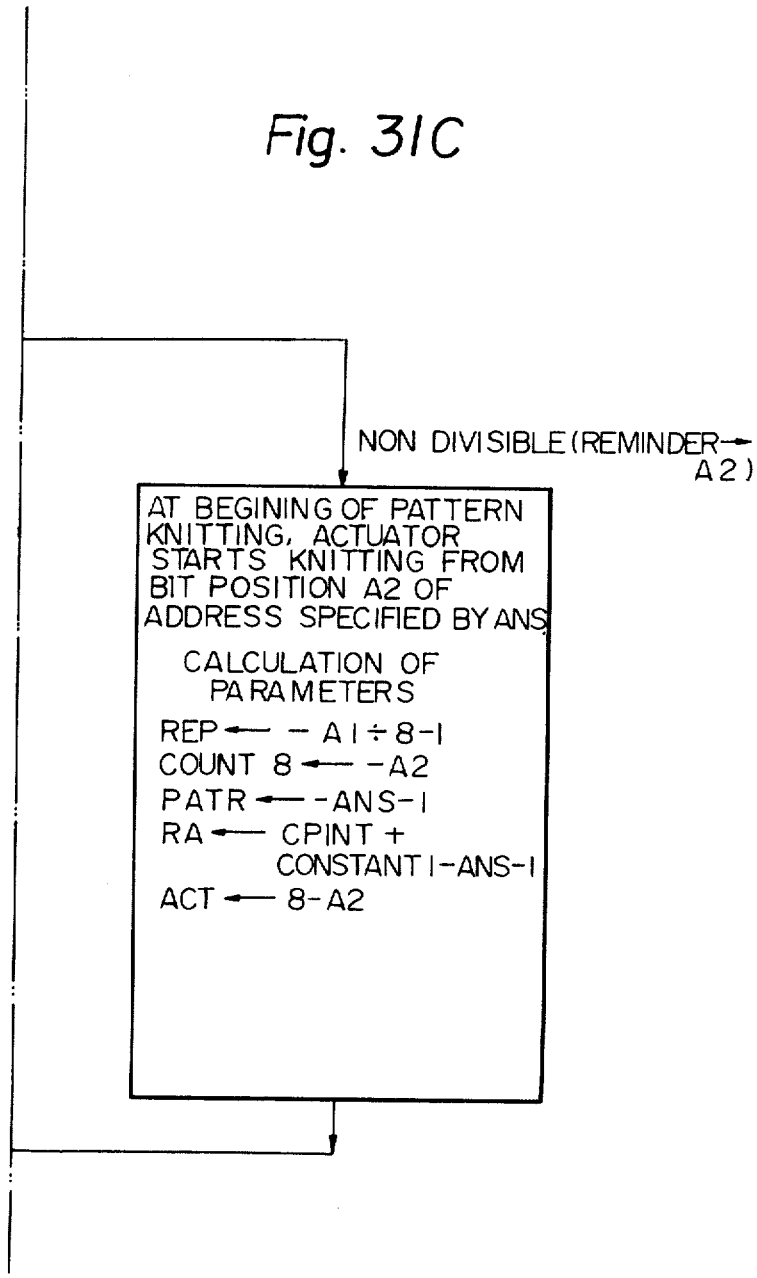

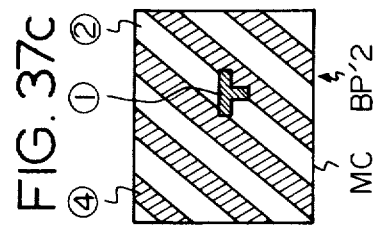
FIG. 37c
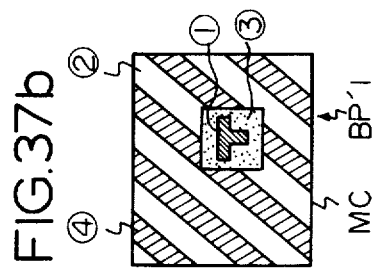
FIG.37b
FIG.37d
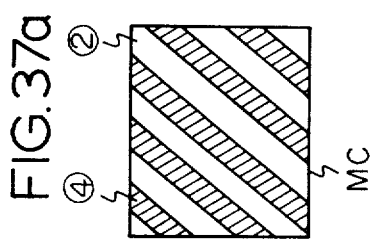
FIG.37a 4,346,366

SYSTEM FOR GENERATING AND MODIFYING DESIGNS FOR AUTOMATIC KNITTING MACHINERY AND THE LIKE

This is a continuation-in-part application of Ser. No. 916,469, filed June 19, 1978, now abandoned, which was a continuation of Ser. No. 565,119, filed Apr. 4, 1975, now abandoned.

BACKGROUND OF THE INVENTION

1. Field of the Invention

This invention relates to a system generating pattern information by digitizing patterns being analyzed, for producing Jacquard patterns by a fabric-making, machine such as a weaving-machine or a knitting-machine.

2. Prior Art

Lately, techniques for automatically representing patterns on a fabric have greatly advanced, as exemplified by a Jacquard knitting machine called "SYSTEM-NIT", which is a computerized knitting-machine developed by the Fibrous High Molecular Material Laboratory of the Ministry of International Trade and Industry of Japan. To operate the Jacquard knitting-machine, it is necessary to apply pattern information to the machine. The nature of the pattern information varies depending on the type of the knitting-machine, i.e., a machine having a mechanical pattern control device or a machine having an electronic pattern control device, so that signals which are adapted for the specific pattern control device are formulated directly or indirectly by suitable processes. Generally speaking, the pattern information is derived from a design developed by an artist, by using a pattern analyzing device.

With a conventional pattern analyzing device, a paper carrying a pattern (design) to be analyzed is wound on a rotary drum, and the paper is optically and electrically scanned while mechanically rotating the drum, for generating sequential electric signals corresponding to the color (red, green, or blue) of each of the picture elements in the design. The electric signals thus generated are converted into digital signals, for providing pattern information, e.g., in the form of punched tape.

The conventional pattern analyzing device, however, has a shortcoming in that its operation is rather complicated, because rotation of the drum is involved therein, and that it requires a considerably long time and a large amunt of labor to complete the analysis of a pattern due to the need of a long analyzing time.

SUMMARY OF THE INVENTION

It is an object, therefore, of the present invention to overcome said disadvantage and limitation of prior arts by providing a new and improved pattern generating system.

The above and other objects are attained by a pattern generating system having at least an arithmetic unit having at least one digital register and a controller, said operating unit processing digital information through said register under the control of said controller;

a digital memory connected to said arithmetic unit, said digital memory having at least one main canvas area and one sub-canvas area;

a monitor means connected to said arithmetic unit, said monitor means monitoring contents of each of said areas of the digital memory;

an output means connected to said arithmetic unit, said output means reading out the contents of said main canvas area; and an input means connected to said arithmetic unit, so as to receive input relating to control information for controlling operation of the arithmetic unit and stored pattern information to be applied to said areas;

said controller being adapted to, in response to said control information from the input means, transfer digital information between said main canvas area and said sub-canvas area in a predetermined fashion, process digital information on specified patterns in said areas, and control said monitor means and said output means; said system producing, under the control of said controller, digital information corresponding to colors of individual picture elements of a desired pattern at different cells of said main canvas area; said output means producing an output pattern information consisting of the contents of said main canvas area.

BRIEF DESCRIPTION OF THE DRAWINGS

The foregoing and other objects, features, and attendant advantages of the present invention will be appreciated as they become better understood by the accompanying drawings wherein;

FIG. 1A is a depiction of a pattern which is to be reproduced by a knitting machine;

FIG. 1B is a diagram of an equivalent digital coding of the colors of the pattern in FIG. 1A;

FIG. 2 is a block diagram of an embodiment of the pattern generating system according to the present invention;

FIG. 3 is a block diagram indicating that it is comprised of FIGS. 3A and 3B;

FIG. 3A is part of an overall block diagram of a practical embodiment of the pattern generating system according to the present invention;

FIGS. 4A through 4G illustrate formation of a pattern by the system according to the present invention;

FIGS. 5A through 5F illustrate formation of another pattern by the system according to the present invention;

FIG. 6 shows a format of output information for a pattern;

FIG. 7 is a block diagram indicating that it is comprised of FIGS. 7A and 7B;

FIG. 7A is one part of a general flow chart of computer software for the pattern generating system according to the present invention;

FIGS. 8–32 are respective block diagrams which are break downs of corresponding blocks of FIG. 7 that are identified below;

FIG. 37 is a diagram of a color pattern related to the explanation of FIG. 9.

DESCRIPTION OF THE PREFERRED EMBODIMENTS

Figure 3B:
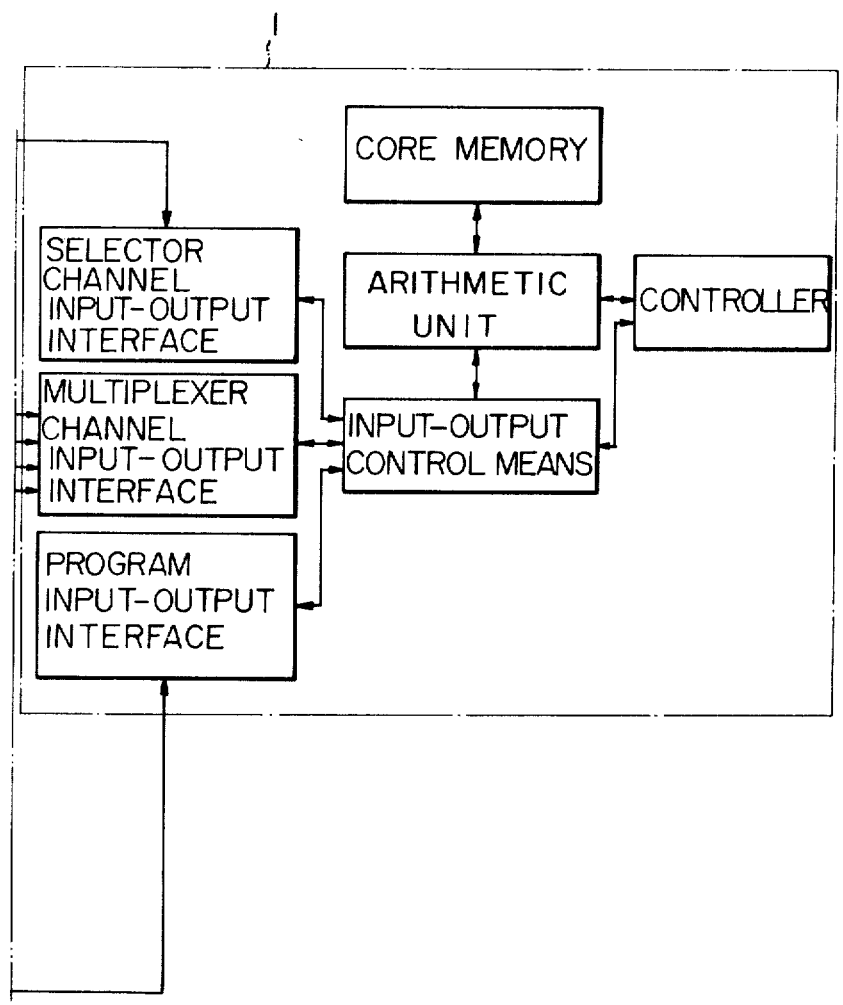
FIG. 3B is the other part of the overall block diagram of said embodiment.

FIG. 1 illustrates operative principles of a pattern generating system according to the present invention. Let it be assumed that a pattern, as shown in FIG. 1A, is to be produced by knitting, and that the pattern to be knit consists of very small predetermined picture elements and only one color is allowed in one picture element. Each element of the lattice of FIG. 1A represents such picture elements in which, for instance, the element a with hatches from the top right to the bottom left represents a red element; the blank element b represents a blue element; the element c with hatches from the top left to the bottom right represents a yellow element; and the element d with crosshatching represents a black element. Accordingly, when the elements a, b, c and d are designated by digits 00, 01, 10, and 11, respectively, so as to produce an information pattern, as shown in FIG. 1B, then, the information of FIG. 1B is completely equivalent to the pattern of FIG. 1A. Thus, it is possible to obtain an information pattern corresponding to a desired knit pattern by producing such a digital information pattern as shown in FIG. 1B, on the digital memory of the information processing means and suitable processing it. The information pattern can be extracted as an output, for instance, onto a paper tape, which is usable as pattern information for controlling the knitting-machine.

FIG. 2 shows a basic block diagram of the pattern generating system according to the present invention. In the figure, reference numeral 1 is an operational unit, 2 and 2a are digital memories which, for instance, consist of magnetic drums, 3 is a monitor means including a cathode ray tube display means 3a and a line printer 3b, 4 is an output means which, for instance, consists of a paper tape puncher 4a, and 5 is an input means consisting of a paper tape reader means, a card reader means, a typewriter means, or an operating means. The digital memories 2 and 2a correspond to a main canvas area and a sub-canvas area, respectively, which are used in producing a desired pattern thereon. More particularly, the purpose of the main canvas area is to generate a finalized complete information pattern for the desired pattern, and the sub-canvas area 2a generates a pattern which is used in modifying all of part of the overall pattern on the main canvas area 2. The size of the sub-canvas area 2a is the same as or smaller than that of the main canvas area.

The operating unit 1 includes at least a register 1a and a controller 1b. The register 1a has a code portion S and a data portion D, and information processing operations on the digital memories 2 and 2a are all effected through the register 1a. For example, when it is desired to modify the information relating to a specific picture element on the digital memory 2 or 2a, that information is read out onto the register 1a from the digital memory 2 or 2a under the control of the controller 1b, and after completing the desired modification, the modified information is written again at the original position of that picture element.

Figure 8C:
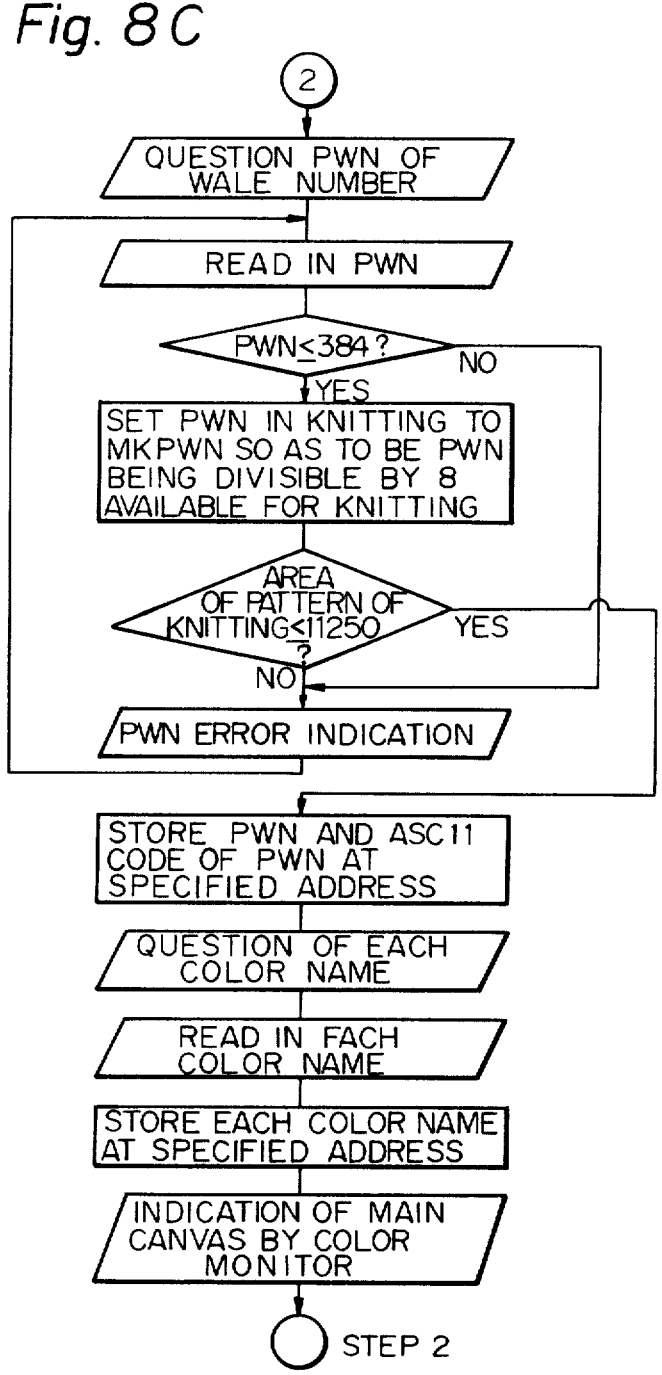

In more detail, the pattern course number (PCN) is read out in sequence from ① to ② in FIG. 8 and the pattern wale number (PWN) is read out in sequence from ② to "STEP 2". Then an area having the size of PCN×PWN is allotted on the digital memory as the main canvas. Similarly, the sub-canvas pattern course number SPCN and the sub-canvas pattern wale number SPWN are read out in sequence from ② to the eleventh block at the bottom of FIG. 9. Then an area having a size of SPCN×SPWN is allotted in the digital memory as the sub-canvas.

The monitor means 3 displays an information pattern stored in the digital memory 2 or 2a, e.g., as shown in FIG. 1B, after converting it into a design pattern, e.g., as shown in FIG. 1A, so as to enable operating personnel to monitor the progress of the process of pattern formation.

The purpose of the output means 4 is to produce output information upon completion of the desired pattern, for instance, by punching a paper tape or cards so as to represent the information formed on the main canvas 2.

The input means 5 acts to place a separately prepared pattern on the entire area or a part of the main canvas or the sub-canvas, or to deliver control information into the pattern analyzing system for controlling the formation of a desired pattern on said main canvas area and sub-canvas area. The input means consists of a paper tape reader, a card reader, a keyborad, a character display means, or a special operating means.

The operating unit 1, as shown in FIG. 2, may be formed by using special integrated circuit hardware. Alternately, the operating unit 1 can be a conventional small computer, known as a mini-computer, with a suitable software loaded in its memory.

FIG. 3 is a block diagram of a practical pattern analyzing system corresponding to the diagram of FIG. 2, which system uses an operating unit 1 consisting of a computer of the HIDIC-500 series made by Hitachi, Ltd. in Japan. In the figure, elements encircled in dash-dot lines form the arithmetic unit 1; a magnetic drum provides the digital memories 2 and 2a; a display and a line printer forms the monitor means 3; a paper tape punch is the output means 4; and a paper tape reader and a character display means form the input means 5. The peripheral devices, as designated by the reference numerals 2 through 5, are connected to the computer 1 through suitable control means.

Processing functions, which can be performed by the main canvas area and the sub-canvas area in the system according to the present invention, are as follows.

(a) Ground Color

Information specified as the background color (in case of a four color pattern, one of the codes 00, 01, 10, and 11) is applied to the entire area covering each of the picture elements on the main canvas or the sub-canvas (see FIG. 13).

(b) Points

Any picture element at the specified coordinates on the main canvas or the sub-canvas can be colored, as specified (see FIG. 14).

(c) Straight Line

Figure 15B:
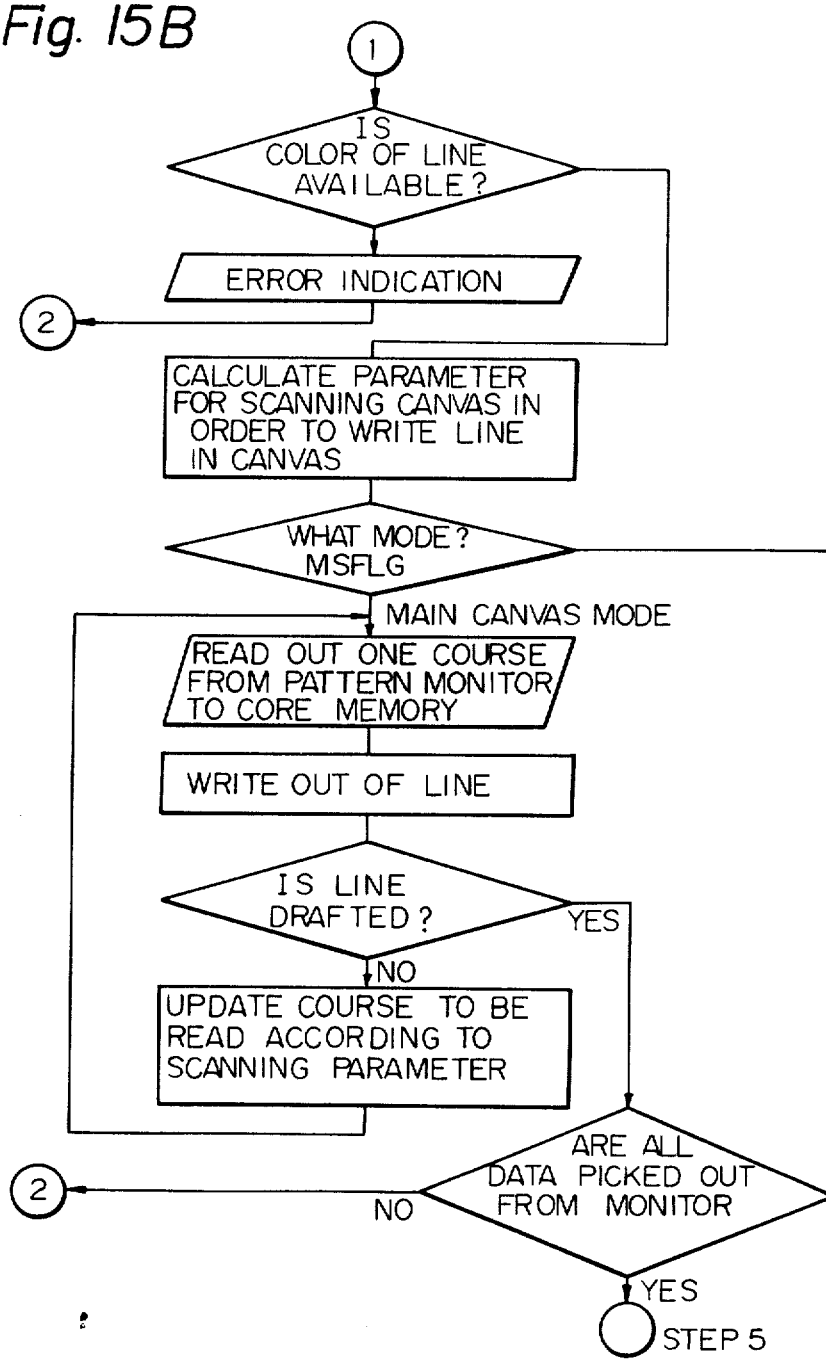
Figure 15C:
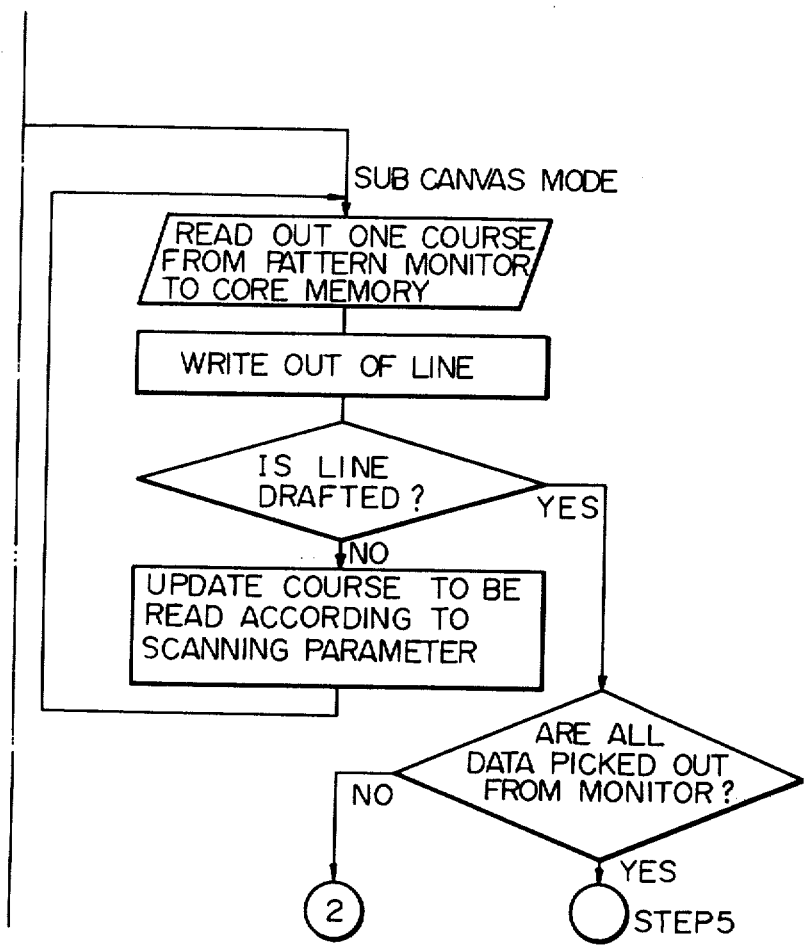

Straight lines can be drawn at specified locations on the main canvas or the sub-canvas in specified colors (see FIG. 15).

(d) Stripes

Figure 16B:
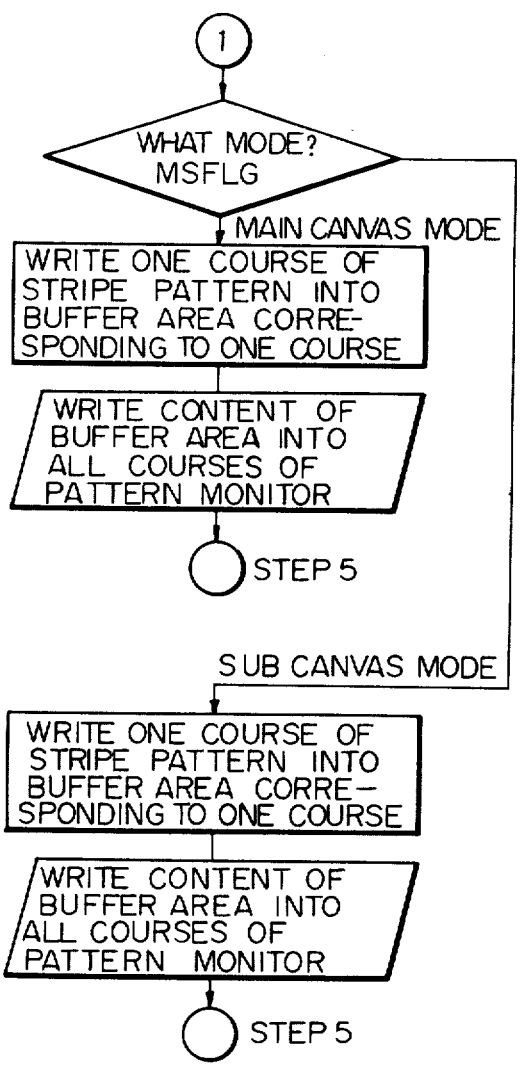

Stripes (vertical lines) can be drawn on the main canvas or the sub-canvas in specified colors (see FIG. 16).

(e) Check

Figure 17B:
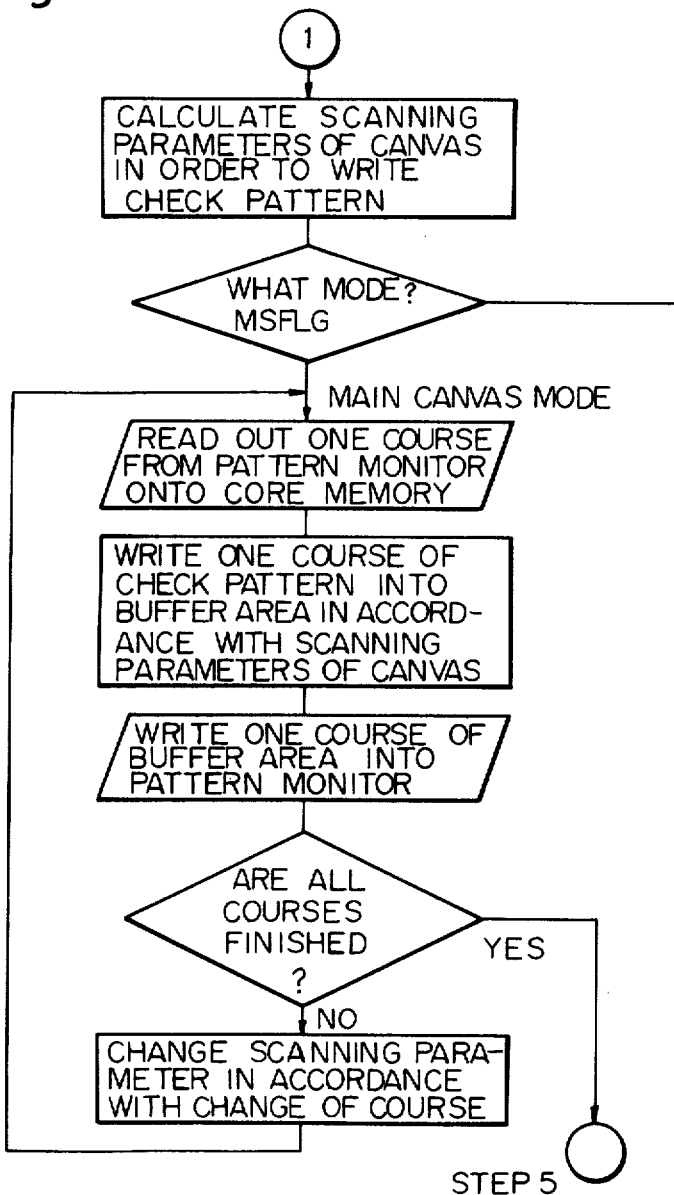

Check patterns can be drawn on the main canvas or the sub-canvas in specified colors (see FIG. 17).

(f) Border

Borders (horizontal lines) can be drawn on the main canvas or the sub-canvas in specified colors (see FIG. 18).

(g) Oblique or Bias Patterns

Figure 19B:
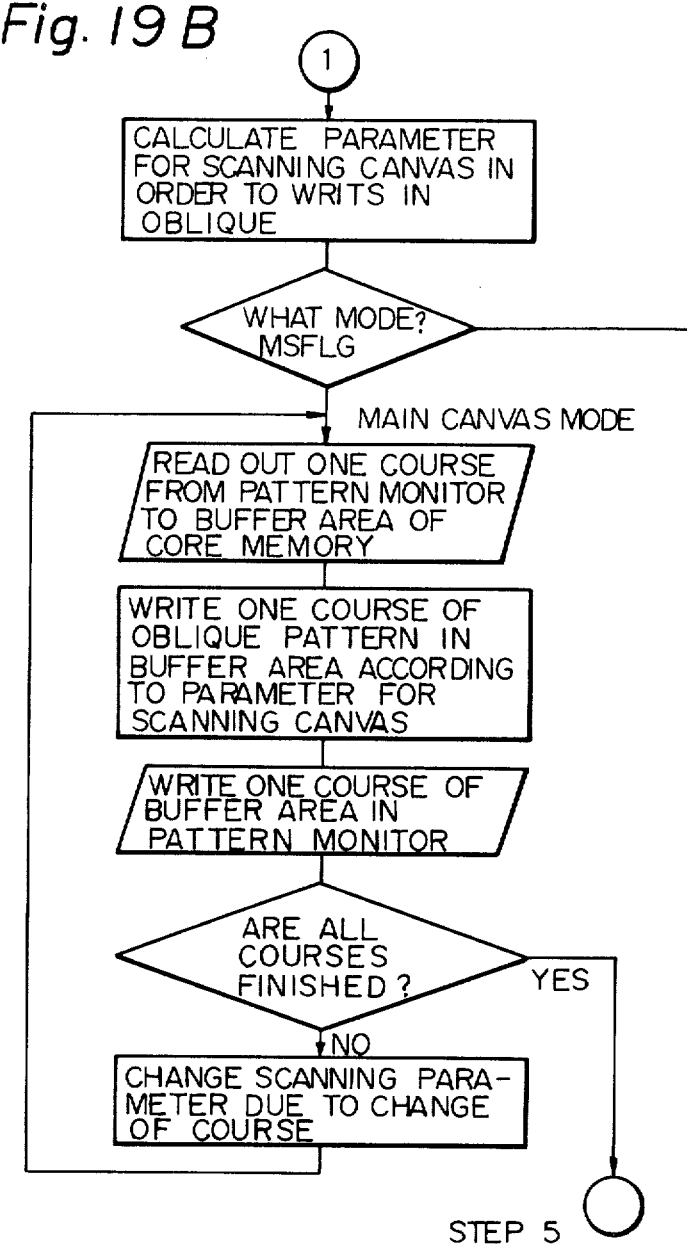

Oblique or bias patterns can be drawin on the main canvas or the sub-canvas in specified colors (see FIG. 19).

(h) Random Input

Figures 27, 27A:
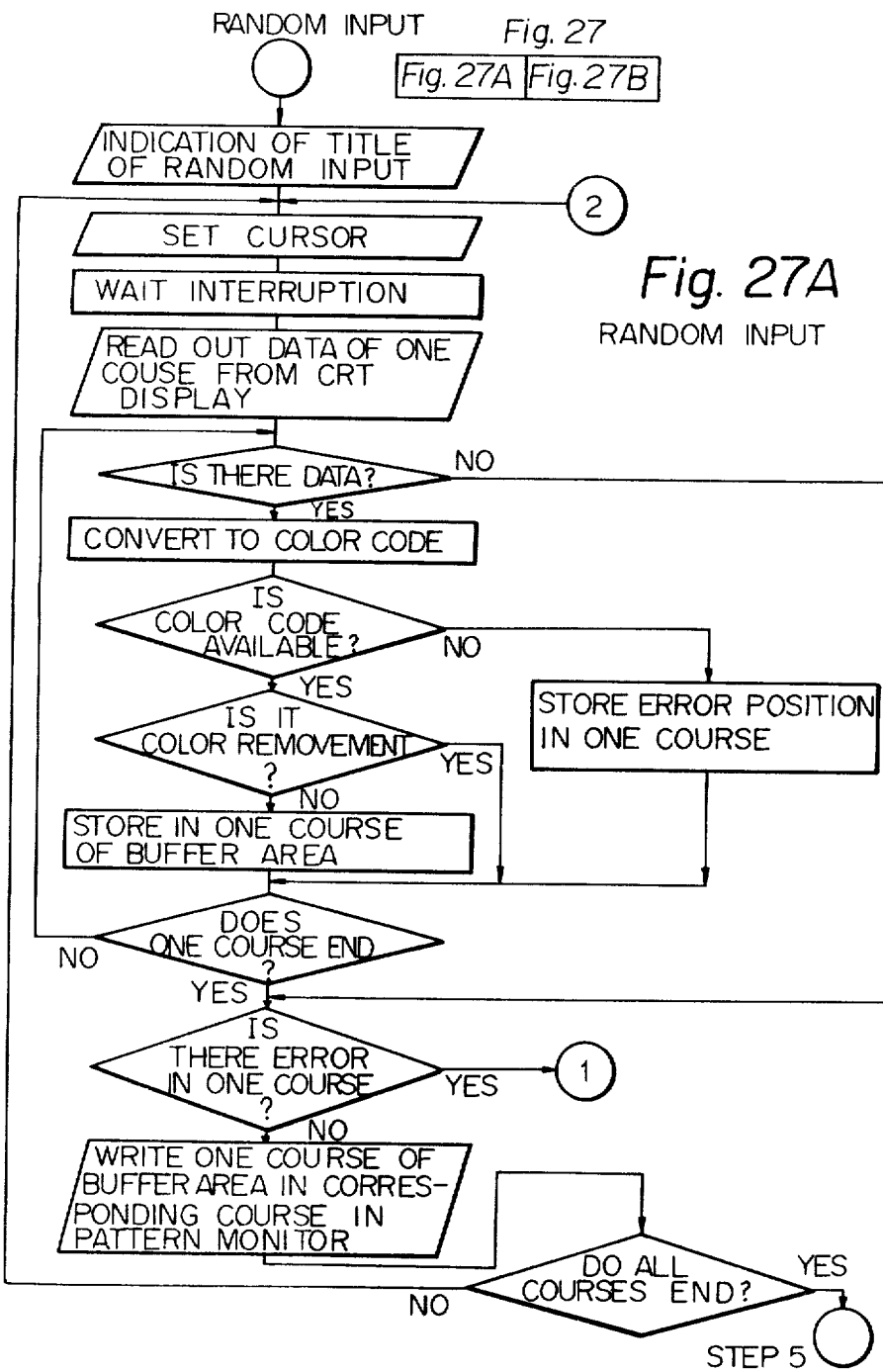

In addition to the foregoing functions, arbitrary information can be placed on the sub-canvas area through the input means as an input thereto (see FIG. 27).

(i) Simple Transfer

Figure 20B:
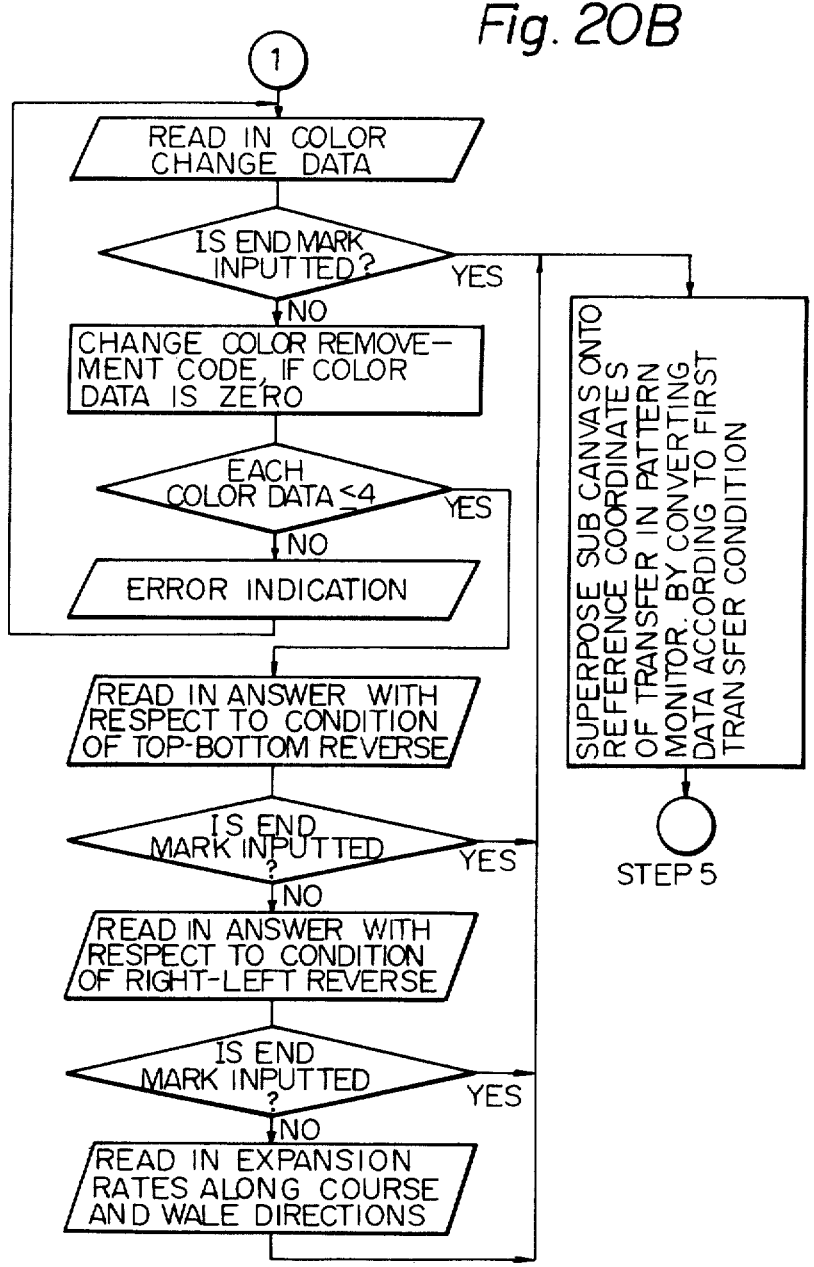

The pattern on the sub-canvas can be transferred onto the main canvas as it is (see FIG. 20).

(j) Horizontal Transfer

Figure 21B:
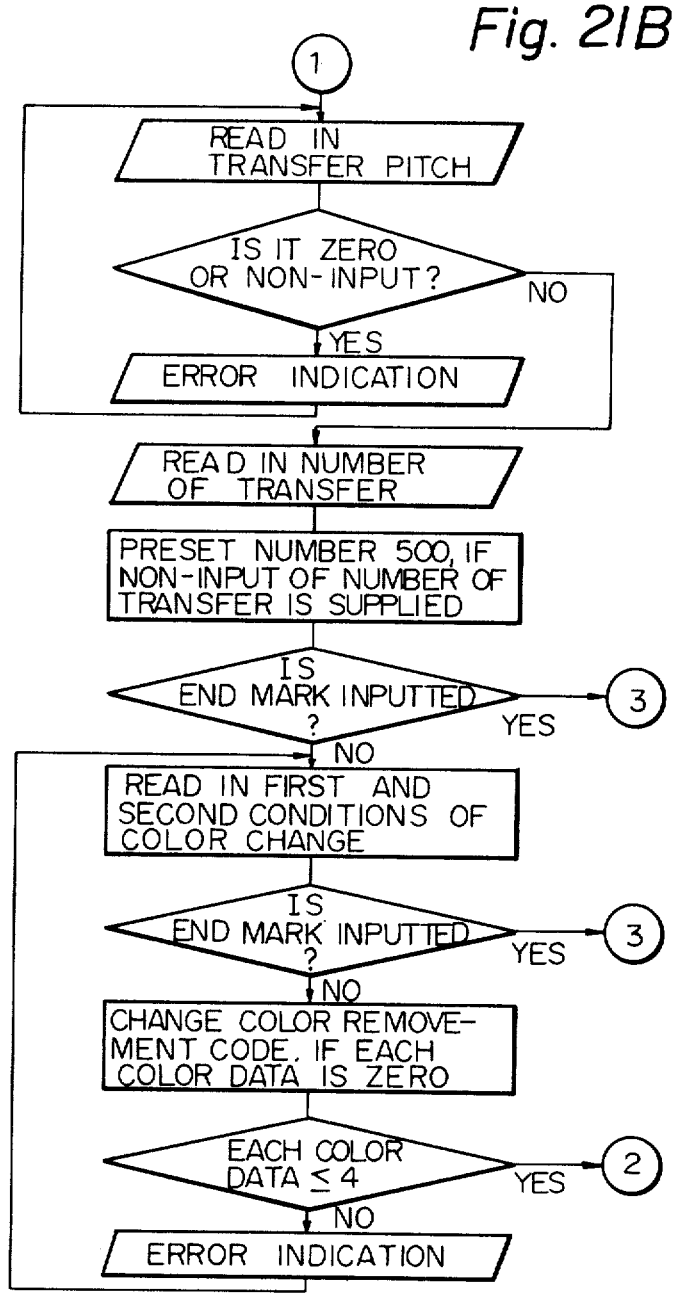
Figure 21D:
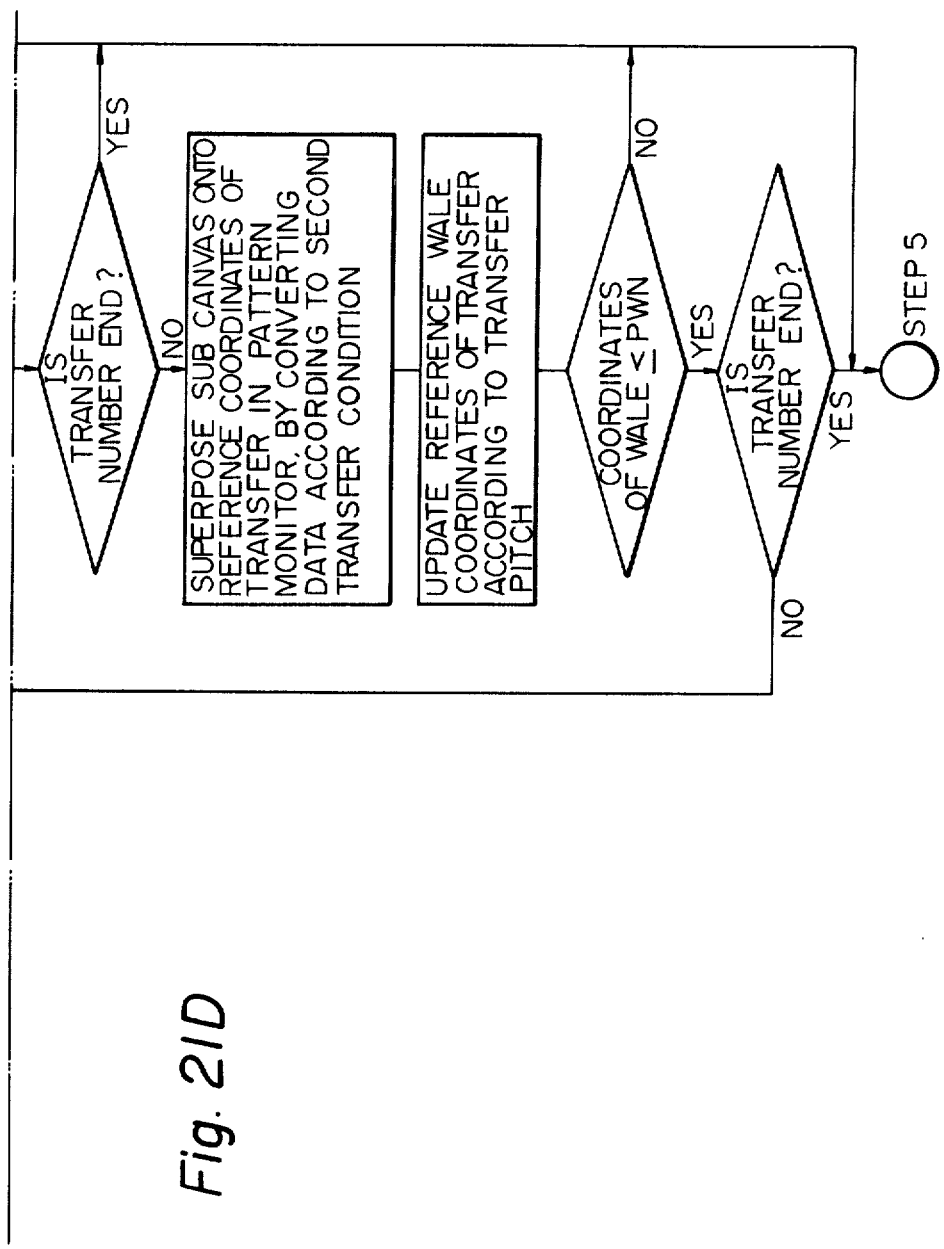

The pattern on the sub-canvas can be repeatedly transferred onto the main canvas in a horizontal arrangement (see FIG. 21).

(k) Vertical Transfer

Figure 22B:
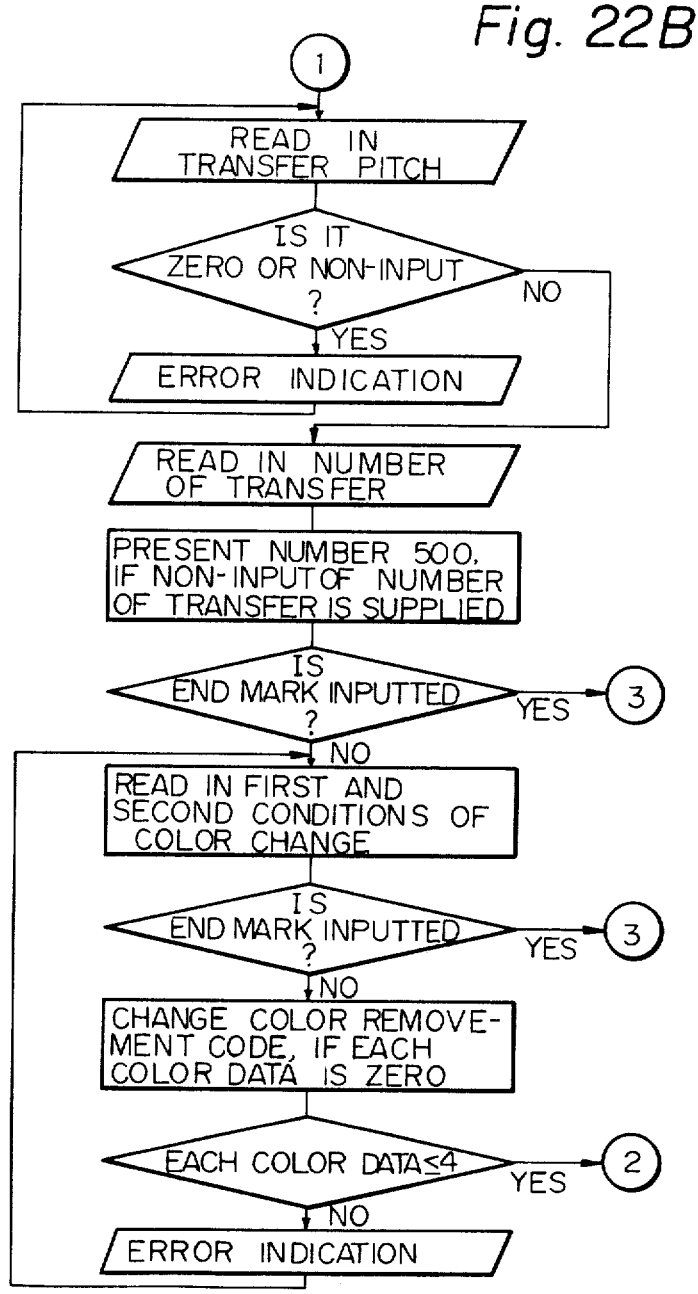
Figure 22C:
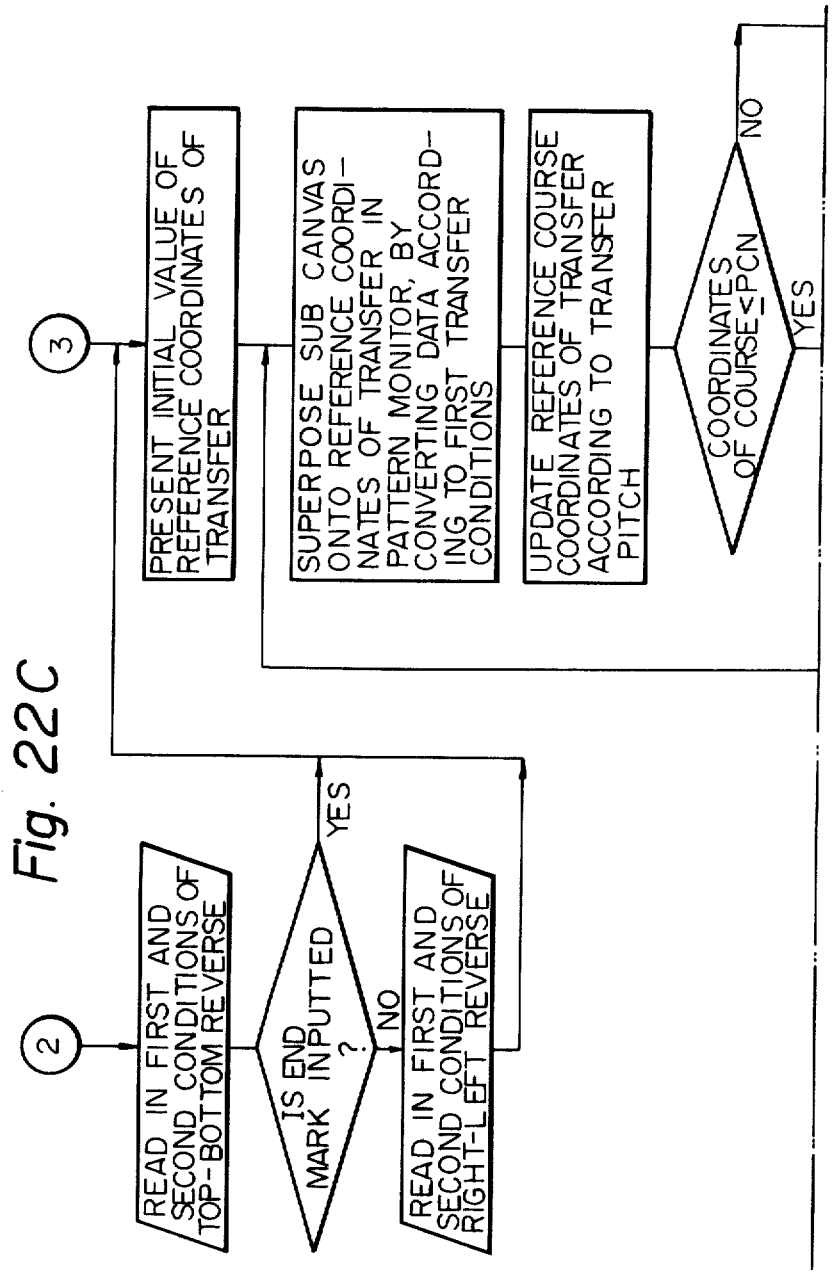
Figure 22D:
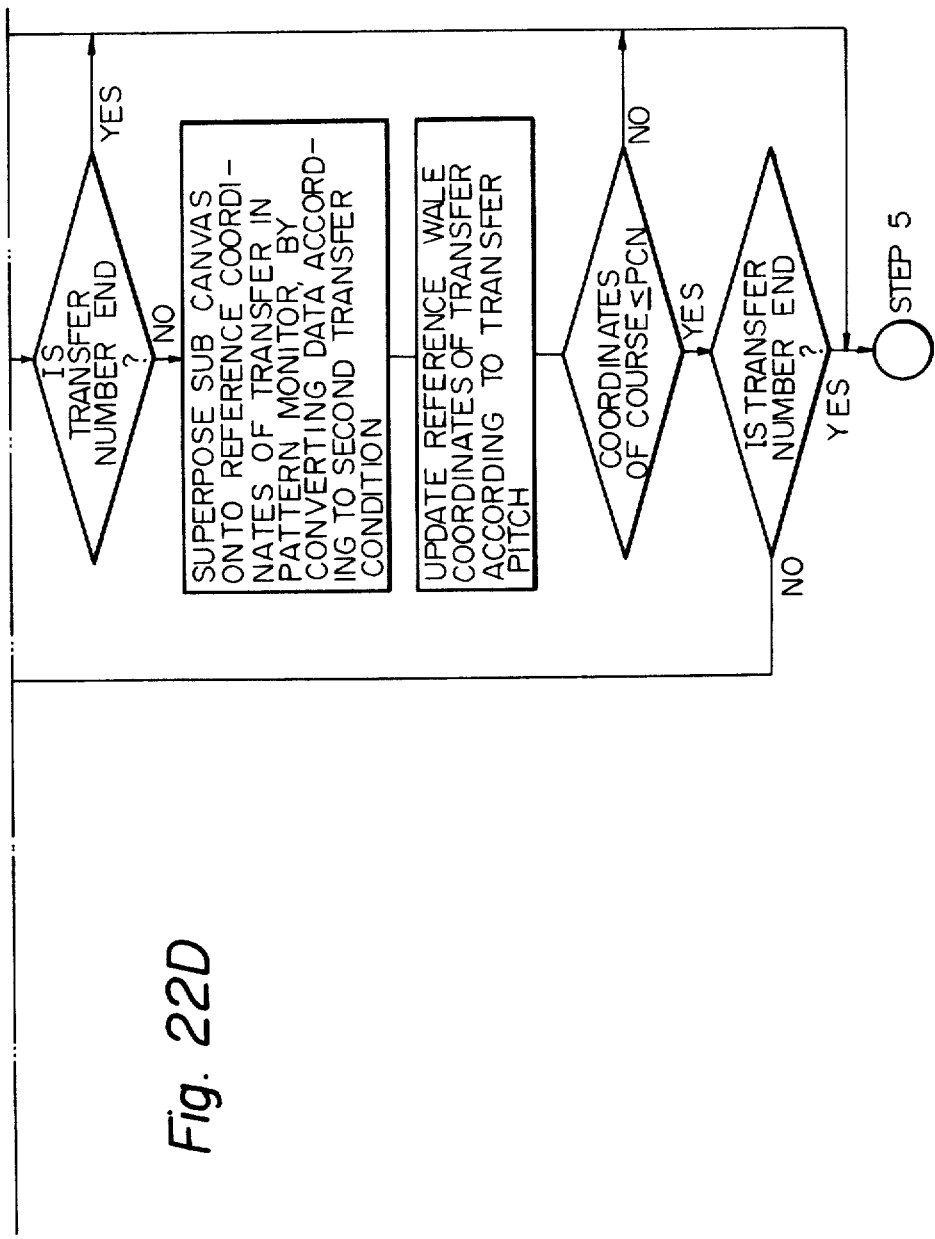

The pattern on the sub-canvas can be repeatedly transferred onto the main canvas in a vertical arrangement (see FIG. 22).

(l) Right Upward Transfer

Figure 23B:
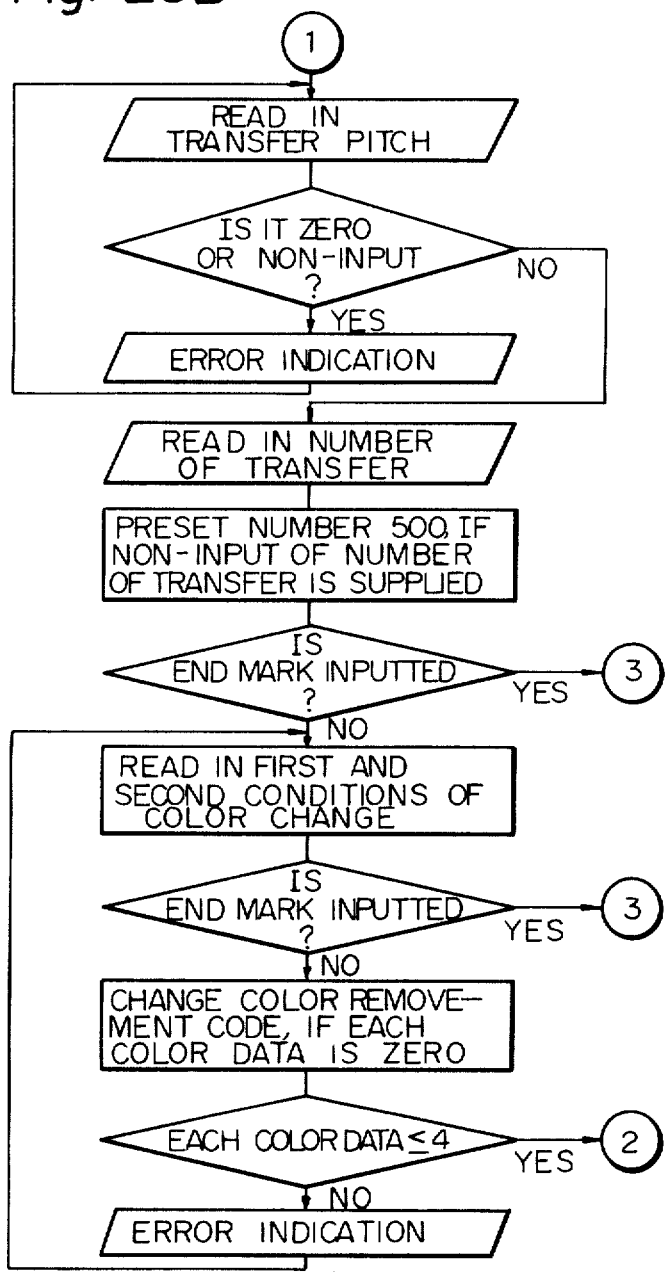
Figure 23C:
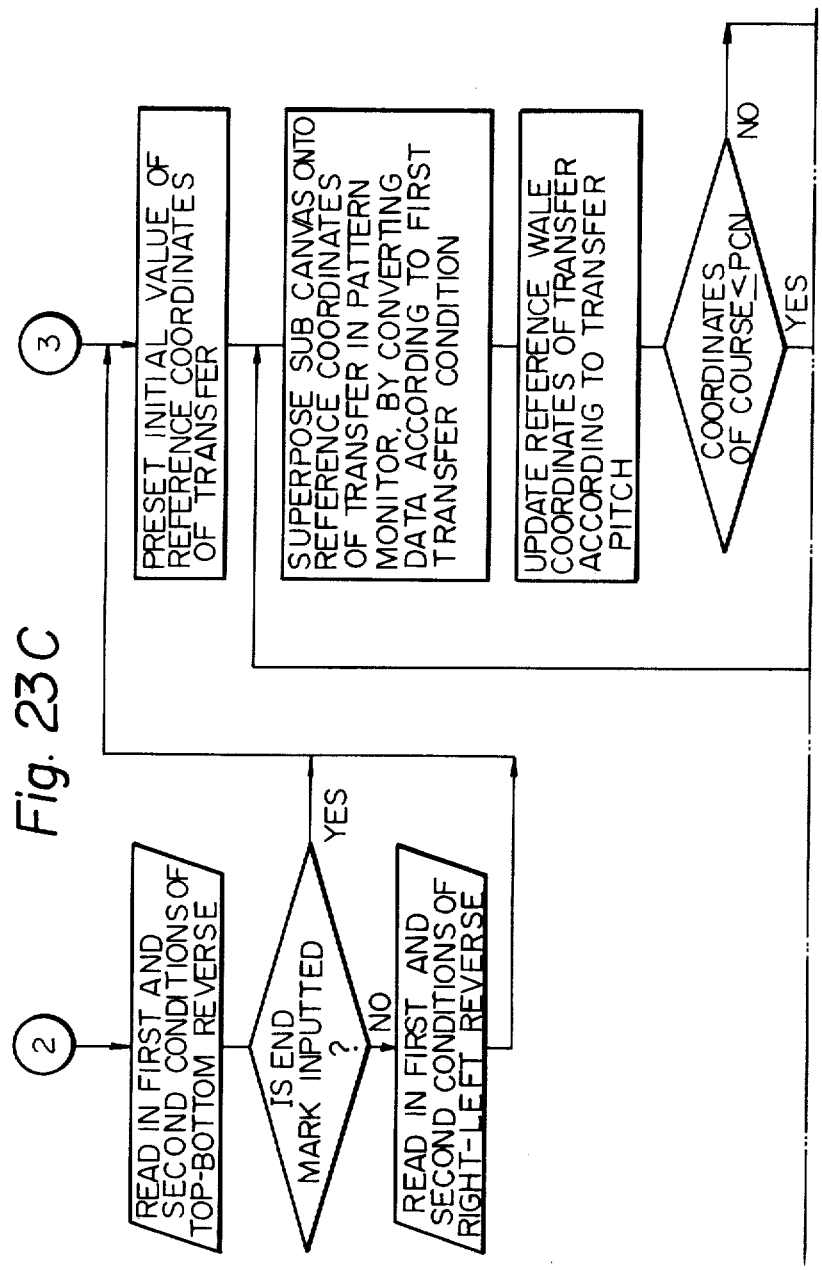
Figure 23D:
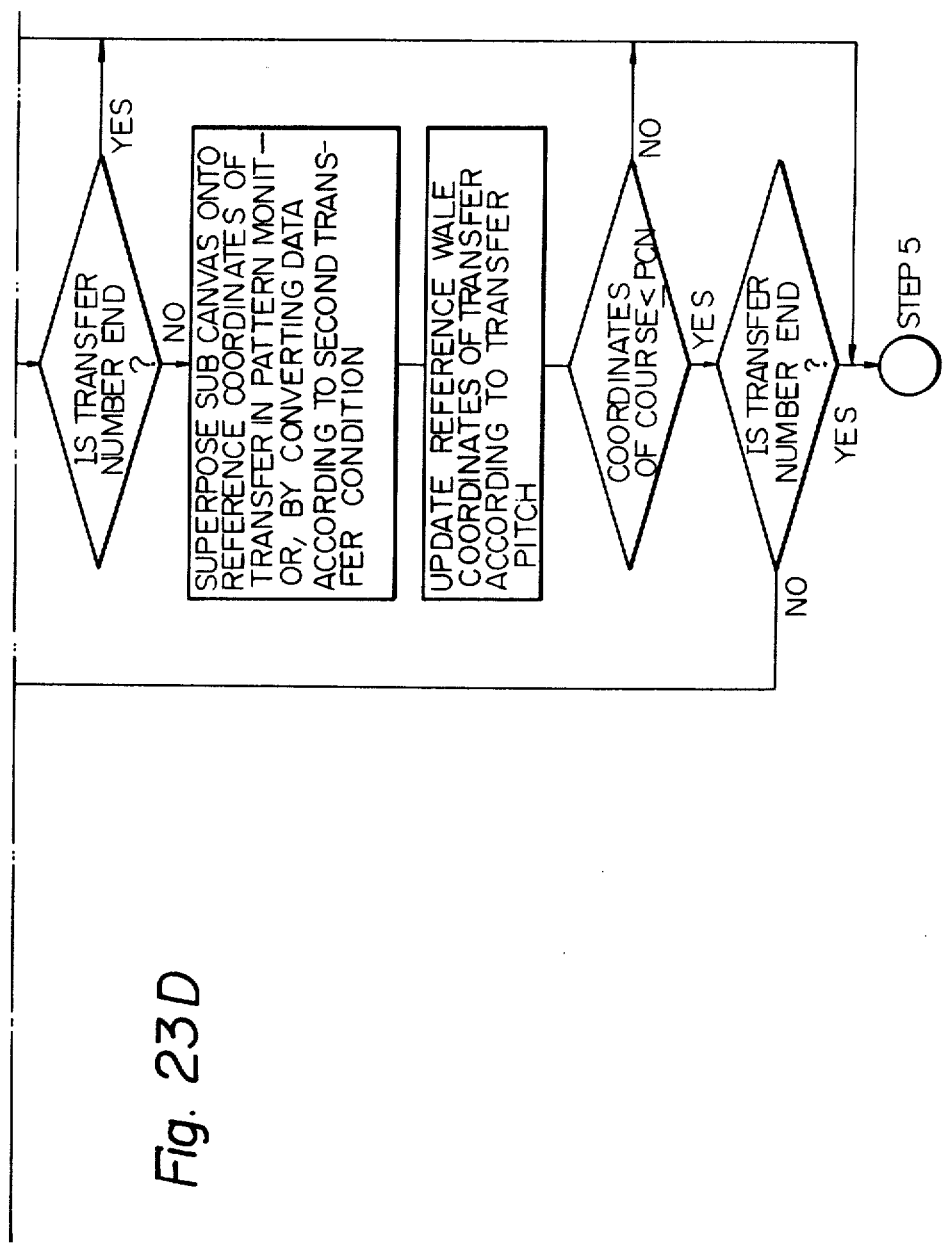

The pattern on the sub-canvas can be repeatedly transferred onto the main canvas in a right upward direction with an angle of 45° C. relative to the horizontal direction (see FIG. 23).

(m) Left Upward Transfer

Figure 24B:
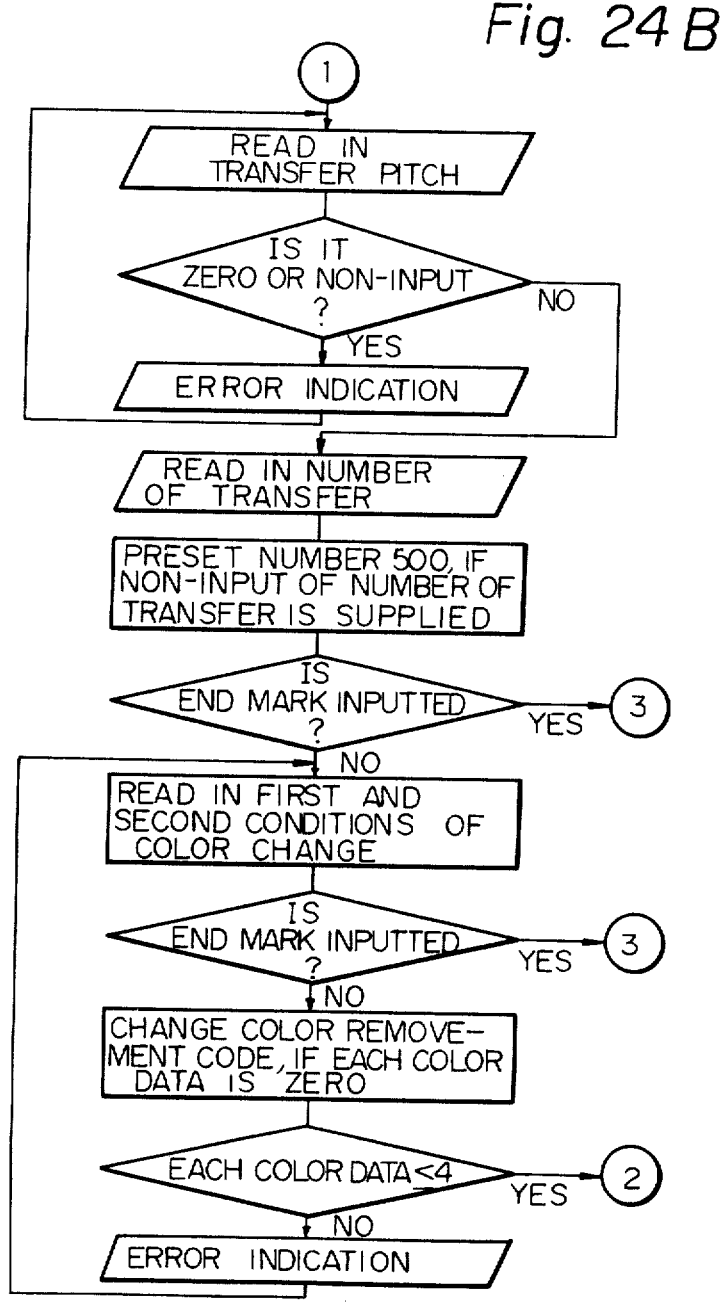
Figure 24C:
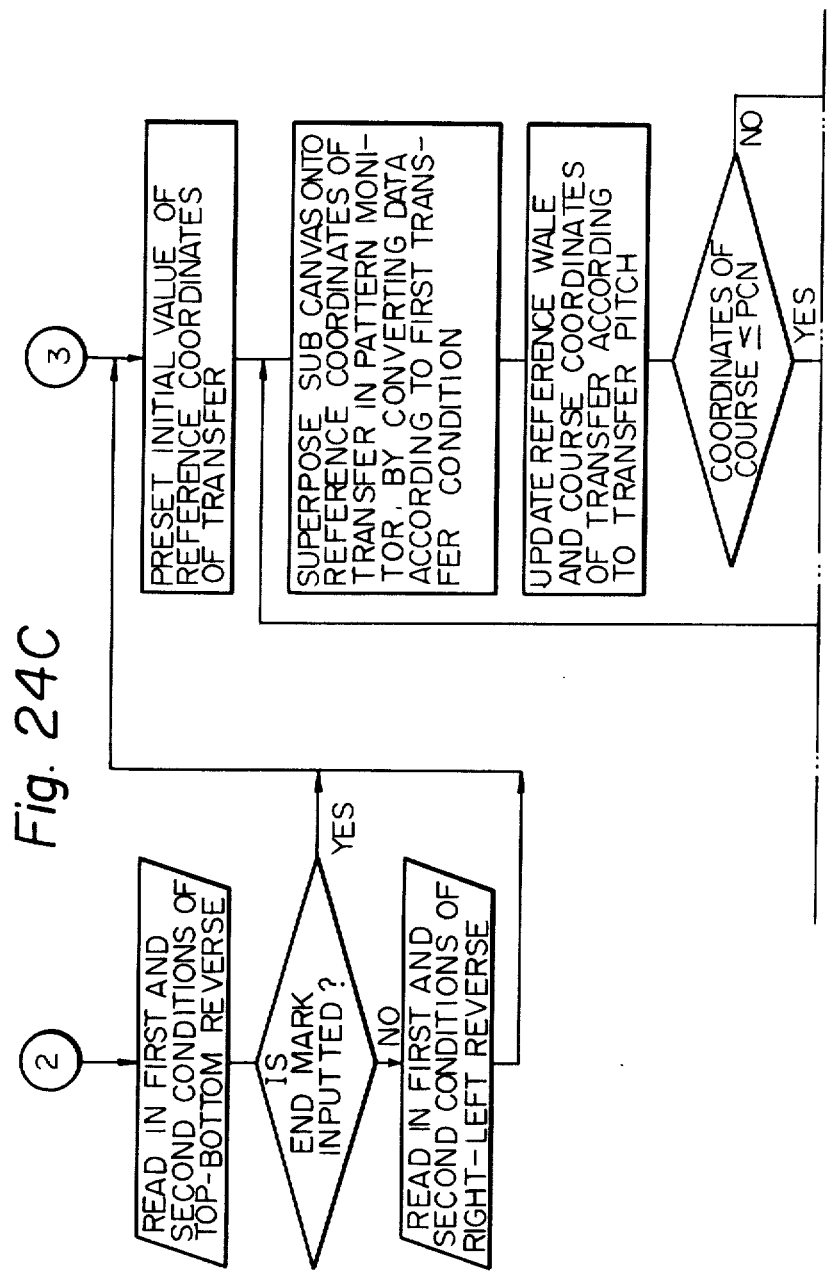
Figure 24D:
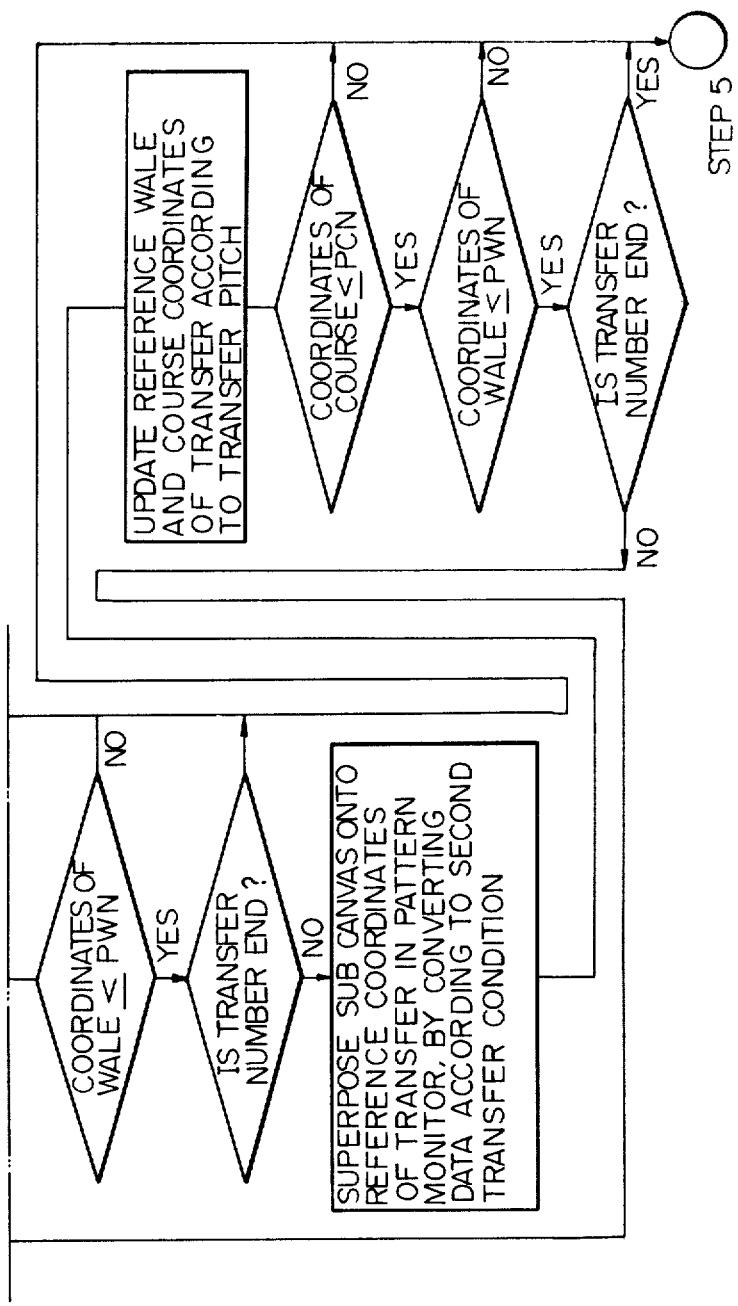

The pattern on the sub-canvas can be repeatedly transferred onto the main canvas in a left-upward direction with an angle of 45° C. relative to the horizontal direction (see FIG. 24).

(n) Lattice or Grid Transfer

Figure 25B:
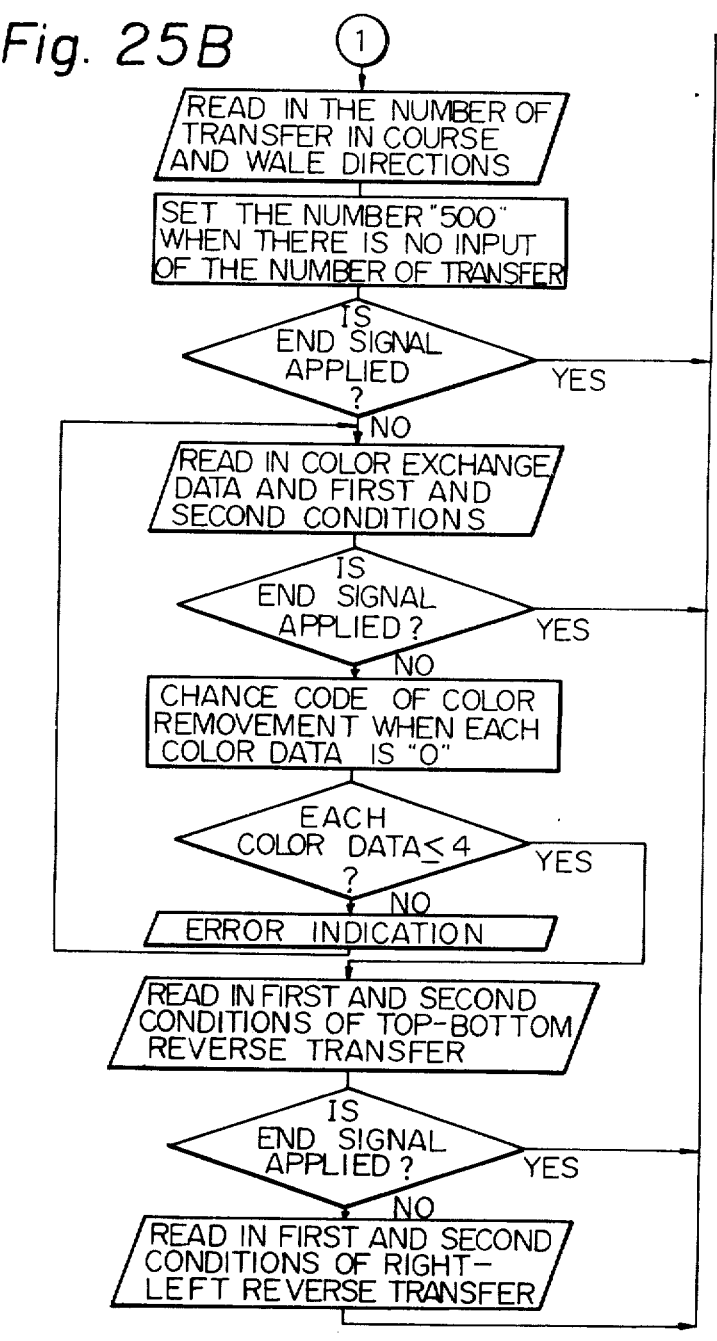

The pattern on the sub-canvas can be repeatedly transferred onto the main canvas in a lattice or grid disposition (see FIG. 25).

With the functions i through n, it is possible to arbitrarily specify the number of repetition, color modification, expansion or reduction of the pattern size, or reversing rotation.

(o) Others

In addition to the foregoing, the following functions can be fulfilled; namely, to transfer outside information from a tape (FIG. 28) or cards (FIG. 26) to the main canvas or the sub-canvas; to monitor the information on the main canvas or the sub-canvas; and to read out the contents of the main canvas or the sub-canvas onto a paper tape (or magnetic tape) (FIG. 29) or cards as an output (see FIGS. 22 and 24).

In operation of the pattern analyzing system for performing the above functions, the following four operative modes are selectively assumed, namely, (i) design on the main canvas, (ii) design on the sub-canvas, (iii) output, and (iv) monitor.

The actual pattern designing operation using the aforesaid functions of the pattern analyzing system will now be described, with reference to two embodiments.

Embodiment 1

A composite design, as shown in FIG. 4G, was formed through the following steps by the pattern analyzing system according to the present invention, which design was basically a combination of a lattice and stripes with an oblique pattern and a modified zig-zag pattern superposed thereon.

Step 1: As fundamental information, the pattern name, the pattern number, the number of colors (four colors in this embodiment), and the number of wales and the number of courses per repeat (e.g., 32×32), were set.

Step 2: The stripes, as shown in FIG. 4A were produced on the main canvas by selecting the operative mode (i) for main canvas design and using the function (d) for stripes, while specifying the coloring and the widths for both the color 1 and the color 2.

Step 3: The two vertical lines, as shown in FIG. 4B, were produced by using the aforesaid function (c) for straight lines, while specifying the starting and ending addresses of the lines (1 and 32), together with the coloring and the widths thereof.

Step 4: The two vertical lines and the two horizontal lines, as shown in FIG. 4C, were produced by similarly using the function (c) for straight lines.

Step 5: The two horizontal lines of the color 3, as shown in FIG. 4D, were produced by similarly using the function (c) for straight lines.

Step 6: The oblique patterns of the color 2, as shown in FIG. 4E, were produced by using the aforesaid function (g) for oblique patterns. To draw the oblique patterns, the starting and the color and the width of the first oblique pattern and the spacing between adjacent oblique patterns were specified. In this embodiment, oblique patterns of the color 2 and colorless oblique patterns (with background color) were set, so as to maintain the previously produced pattern by using the colorless oblique patterns thereon.

Step 7: The modified zig-zag pattern, as shown in FIG. 4F, was produced on the sub-canvas, by selecting the operative mode (ii) for sub-canvas design while specifying its size at 6×6 and using the aforesaid function (h) for random input.

Step 8: The pattern on the sub-canvas, as shown in FIG. 4F, was transferred to the main canvas, as shown in FIG. 4G, by resuming the operative mode (i) for main canvas design and using the aforesaid function (i) for simple transfer while specifying the main canvas address to which the sub-canvas pattern was to be transferred.

Step 9: The contents, or pattern, of the main canvas was checked by selecting the operative mode (iv) for monitor and using the display or the line printer.

Step 10: The contents of the main canvas were read out by selecting the aforesaid operative mode (iii) for output, so as to produce the output information which could be stored on a paper tape or magnetic tape, or could be directly applied to a knit control system for generating a sample of knit or woven wear.

Embodiment 2

The pattern, as shown in FIG. 5A, was produced by a pattern analyzing system according to the present invention. This pattern consists of fundamental elements, as shown in FIG. 5B $a$ and $b$, which are disposed at different sections of FIG. 5C after modifying the coloring and the size thereof.

Step 1: The pattern name and the pattern number were registered. The three colors for the pattern were set, and the number of wales and the number of courses were set at 140×140.

Step 2: The background color, as shown in FIG. 5D, was specified by selecting the aforesaid operative mode (i) for main canvas design and using the aforesaid function (a) for background color.

Step 3: The fundamental pattern, as shown in FIG. 5B a, was produced on the sub-canvas by selecting the aforesaid operative mode (ii) for sub-canvas design while specifying the sub-canvas size of 10 wales times 20 courses and using the aforesaid function (h) for random input or using a stored pattern (on a tape or cards). Those portions which have the same coloring as the background color were made colorless.

Step 4: The pattern, as shown in FIG. 5E, was produced on the main canvas by selecting the aforesaid operative mode (i) for main canvas design and using the aforesaid function (i) for simple transfer so as to carry out the transfers of the following table.

| No. | Vertical magnification | Horizontal magnification | Remarks |
|---|---|---|---|
| 1 | 1 | 1 | — |
| 2 | 1 | 1 | top-bottom reversed, right-left reversed, color changed |
| 3 | 2 | 2 | color changed |
| 5 | 2 | 2 | top-bottom reversed, right-left reversed, color changed |
| 7 | 4 | 5 | — |
| 9 | 4 | 5 | top-bottom reversed, right-left reversed |

Step 5: The fundamental pattern, as shown in FIG. 5B b, was produced on the sub-canvas, by selecting the aforesaid operative mode (ii) for sub-canvas design while specifying the sub-canvas size of 20 wales times 10 courses and using the aforesaid function (h) for random input or using stored pattern (on a tape or cards). Those portions which have the same coloring as the background color were made colorless.

Step 6: The pattern, as shown in FIG. 5F, was produced on the main canvas by selecting the aforesaid operative mode (i) for the main canvas design and using the aforesaid function (i) for simple transfer so as to carry out the transfers of the following table.

| No. | Vertical magnification | Horizontal magnification | Remarks |
|---|---|---|---|
| 4 | 2 | 2 | top-bottom reversed, right-left reversed |
| 6 | 2 | 2 | — |
| 8 | 4 | 5 | top-bottom reversed, right-left reversed, color changed |
| 10 | 4 | 5 | color changed |

Step 7: The contents of the main canvas were monitored for the purpose of checking.

Step 8: The contents of the main canvas were read out as the output information, which could be stored on a tape or cards, or could be directly applied to a knit control system.

FIG. 6 illustrates a paper tape format which is punched for storing the output from the pattern analyzing system. For instance, a paper tape with six units or eight units can be used. When the information for each of the picture elements of FIG. 1B are punched on the paper tape in one row, if the information 00, 01, 10, and 11 are stored by punching the first, second, third and fourth holes of the paper tape, respectively, then each row of the paper tape always has one hole punched, so that erroneous reading of the information on the paper tape can be easily checked. Furthermore, since the information for any of the four colors can be coded in two bits, it is possible to store information relating to a plurality of picture elements in one row of the paper tape. In the format of FIG. 6, the portion M at the beginning of the tape is punched in such a way that it carries reference such as the pattern name and the pattern number. The next portions of the paper tape are punched so as to successively carry a start mark S, a first course information C1, a course end mark CE, a second course information C2, and so on. At the end of the pattern information, end mark E is punched.

Next, an example of the major actual hardware needed to realize the system in FIG. 3 by using an HID-IC-500 computer system, is listed below:

A Magnetic Drum (2, 2a): H-7541-2
A Paper Tape Reader (5): H-7014
A Character Display (5): H-7833-4
A Paper Tape Puncher (4): H-7856
A Line Printer (3): H-7031

These devices are manufactured by HITACHI, Ltd. in Japan.

Figure 7B:
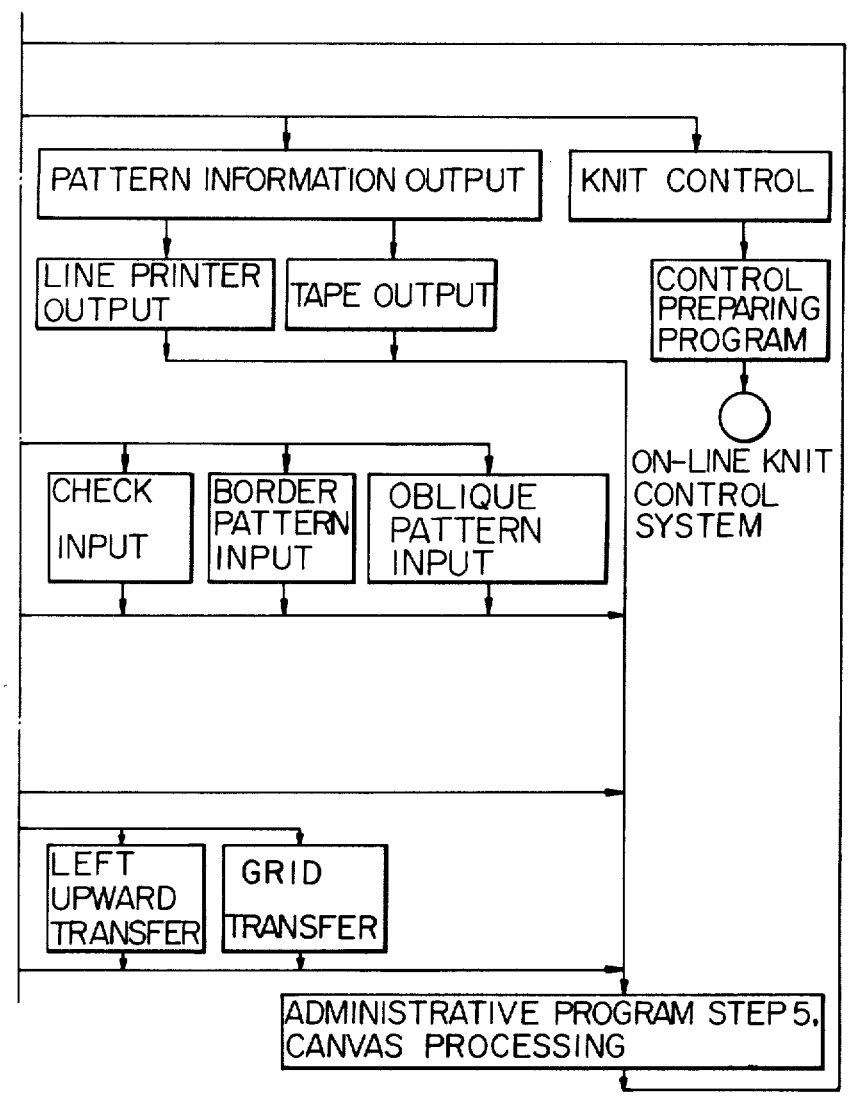
FIG. 7B is the other part of said general flow chart.

FIG. 7 shows a general flow chart of software for effecting the aforesaid operative steps by a computer. Since the flow chart can be easily understood by those skilled in the art, its detailed explanation will not be made here. However, a fuller explanation of formation of the main and sub-canvas will now be given.

MAIN CANVAS FORMATION

Figure 9B:
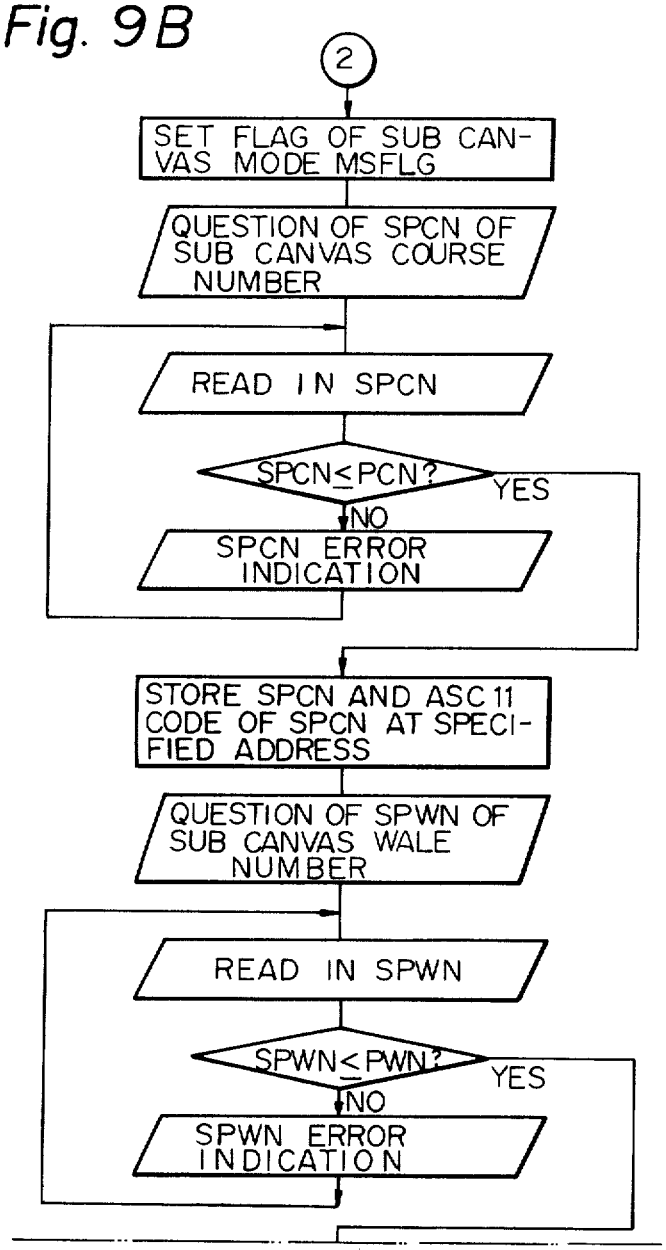
Figure 9C:
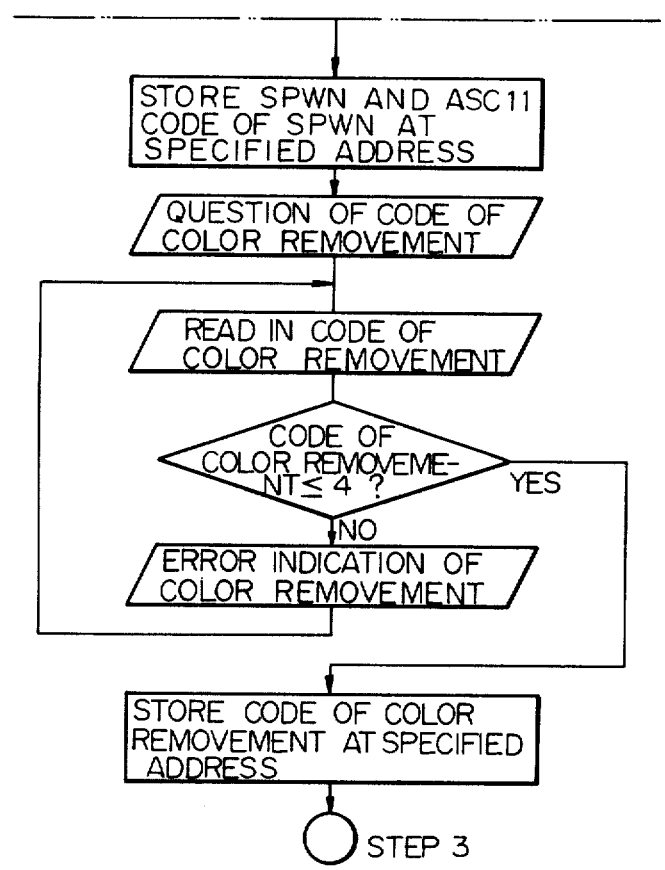

In FIG. 9, the block "SET FLAG OF MAIN CANVAS MODE (MSFLG)", corresponds to the block "MAIN CANVAS FORMATION" in FIG. 7A. This "FLAG" indicates that the pattern generation has to be performed on the main canvas. Desired patterns are stored in the main canvas.

SUB-CANVAS FORMATION

The SUB-CANVAS MODE FORMATION in FIG. 7 is shown in FIG. 9 beginning with the block "SET FLAG OF SUB-CANVAS MODE". This "FLAG" indicates that the pattern generation has to be performed on the sub-canvas, based on the desired pattern. The size of the pattern is defined by SPCN (sub-canvas pattern course number)×SPWN (sub-canvas pattern wale number).

FIG. 8 is a more detailed, breakdown of the block in FIG. 7 "ADMINISTRATIVE PROGRAM STEP 1 PATTERN DEFINITION". Specified addresses are allotted, in advance, to respective parameters, such as color code, canvas size and so on, in the core memory (not shown). Accordingly, each of the parameters can be directly accessed by programs. For example, PWN←Address 200
PCN←Address 201
SPWN←Address 202
SPCN←Address 203

Figure 10B:
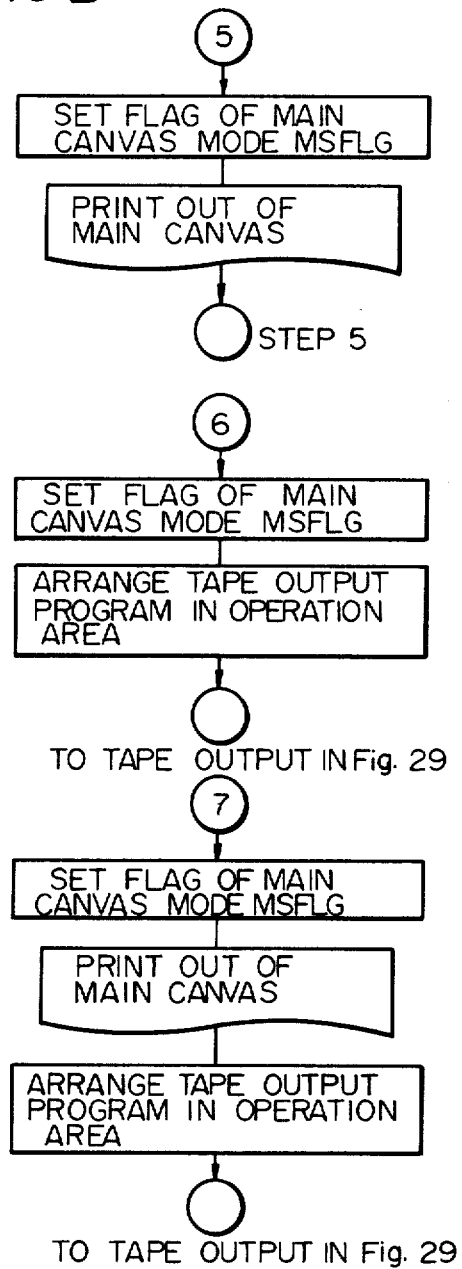
Figure 10C:
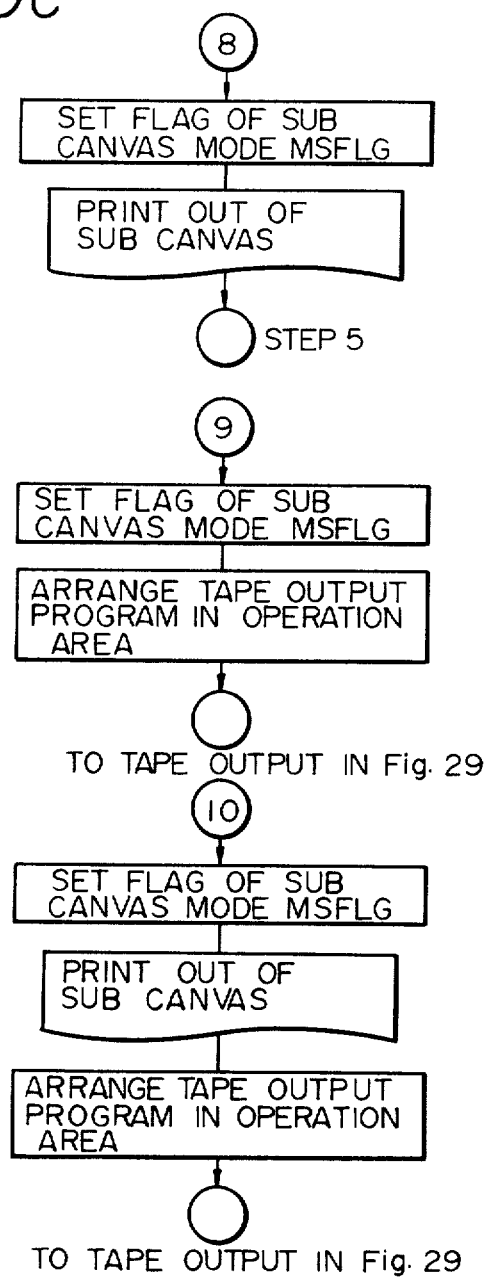

FIGS. 9 and 10 are more detailed breakdowns of the block in FIG. 7 "ADMINISTRATIVE PROGRAM STEP 2 MODE SELECTION".

CODE OF COLOR REMOVEMENT

To better understand FIG. 9, reference is made to FIG. 37. In FIG. 37, the ground pattern is created in the main canvas MC. The ground pattern is composed of color ④ and color ②. Then, the basic pattern BP' in the sub-canvas SC, is transferred to the main canvas MC. The pattern BP' is composed of color ③ and color ①. If there is no code of color removement, the pattern BP'1 is obtained. If there is a code of color removement, which code specifies, for example color ③, the pattern BP'2 is obtained.

Figure 11B:
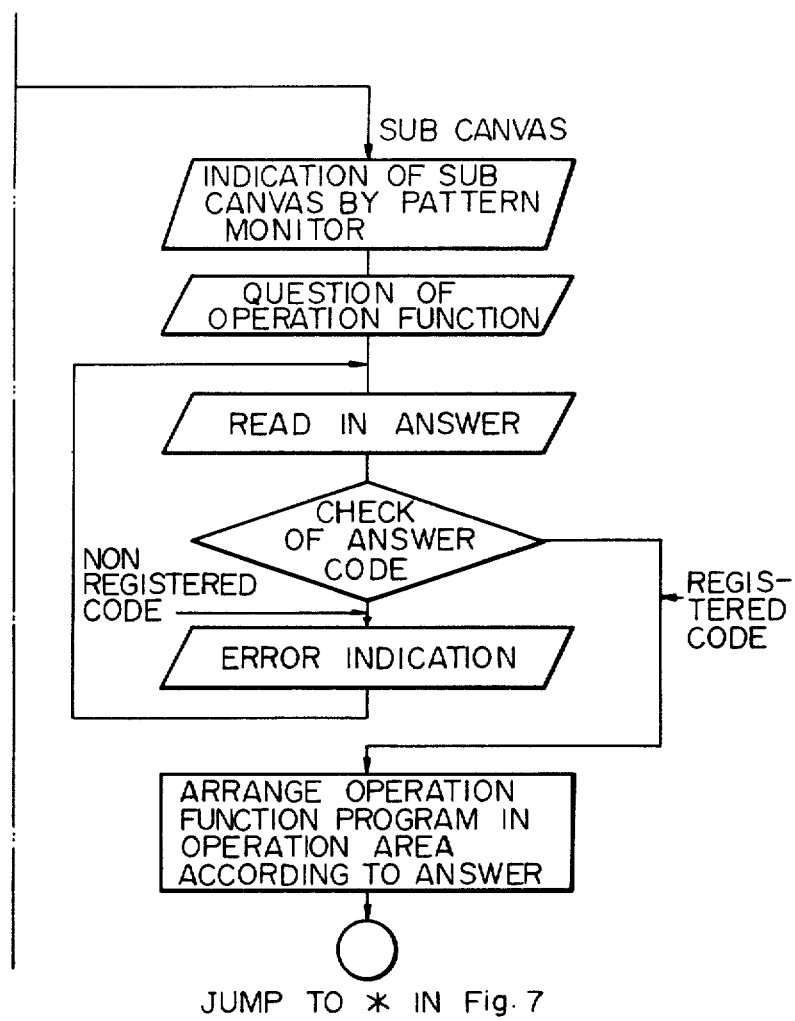

FIG. 11 is a more detailed breakdown of the block of FIG. 7 "ADMINISTRATIVE PROGRAM STEP 3 PATTERN FORMING FUNCTION SELECTION".

FIG. 12 is a more detailed breakdown of the same block in FIG. 7 but directed to the "PATTERN FORMING FUNCTION SELECTION" part.

FIG. 13 is a more detailed breakdown of the block in FIG. 7 "BACKGROUND COLOR INPUT".

FIG. 14 is a more detailed breakdown of the block in FIG. 7 "POINT INPUT".

FIG. 15 is a more detailed breakdown of the block in FIG. 7 "STRAIGHT LINE INPUT".

FIG. 16 is a more detailed breakdown of the block in FIG. 7 "STRIPE PATTERN INPUT".

FIG. 17 is a more detailed breakdown of the block in FIG. 7 "CHECK PATTERN INPUT". In this figure the instruction shown as "CALCULATE SCANNING PARAMETERS OF CANVAS IN ORDER TO WRITE CHECK PATTERN" is now explained.

Figure 33:
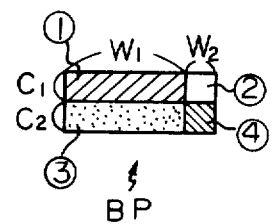
FIGS. 33–35 are diagrams of check patterns related to the explanation of FIG. 17.
Figure 34:
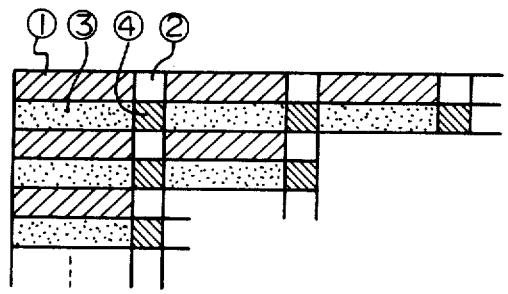

A check pattern to be displayed on the monitor is composed of a desired basic pattern BP such as shown in FIG. 33. The basic pattern BP is made of four colors, ① through ④. Of course $C_1$, color ① is indicated by $W_1$ wale, color ② has $W_2$ wale. Similarly, on course $C_2$, color ③ has $W_1$ wale, color ④ has $W_2$ wale. The numbers of $(W_1 + W_2)$ to be repeated along both the course direction and wale direction are calculated in advance for the purpose of creating the check pattern shown in FIG. 34. These numbers are scanning parameters. Pattern generation is performed by using the scanning parameters.

Figure 35:
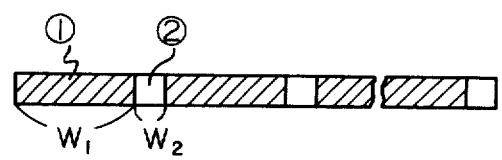

In FIG. 17, the instruction "WRITE ONE COURSE OF CHECK PATTERN INTO BUFFER AREA IN ACCORDANCE WITH SCANNING PARAMETERS OF CANVAS" may be explained with reference to FIG. 35. In FIG. 35, color ① has $W_1$ wale and color ② has $W_2$ wale. The $(W_1 + W_2)$ wales comprise one basic pattern. One course $C_1$ of the check pattern is written in the buffer area in accordance with the scanning parameter, that is $PWN/W_1 + W_2$ (PWN = pattern wale number).

When the basic pattern ((①) and (②)) is repeated $(PWN/W_1 + W_2)$ times along one course, a part of the desired check pattern is created as seen in FIG. 35.

FIG. 18 is a more detailed breakdown of the block in FIG. 7 "BORDER PATTERN INPUT".

FIG. 19 is a more detailed breakdown of the block in FIG. 7 "OBLIQUE PATTERN INPUT".

FIG. 20 is a more detailed breakdown of the block in FIG. 7 "SIMPLE TRANSFER".

FIG. 21 is a more detailed breakdown of the block in FIG. 7 "HORIZONTAL TRANSFER".

FIG. 22 is a more detailed breakdown of the block in FIG. 7 "VERTICAL TRANSFER".

Figure 36A:
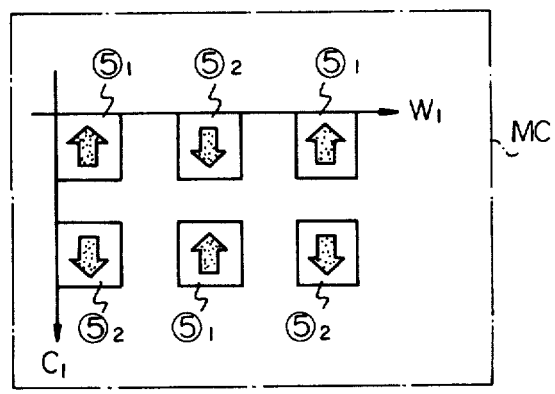
FIG. 36 is a diagram of a pattern related to the explanation of FIGS. 21 and 22.
Figure 36B:
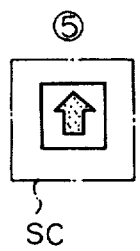

In FIGS. 21 and 22 the instruction "SUPERPOSE OF SUB-CANVAS ONTO REFERENCE COORDINATES OR TRANSFER ON PATTERN MONITOR BY CONVERTING DATA IN ACCORDANCE WITH FIRST (OR SECOND) TRANSFER CONDITION" may be understood by reference to FIG. 36. In FIG. 36, the reference ⑤ is a basic pattern on the sub-canvas SC. Many basic patterns ⑤ are arranged in the main canvas MC along the reference $(W_1, C_1)$ of transfer. In the main canvas MC, the patterns referenced by the numeral ⑤$_1$ are arranged according to the first transfer condition, and the patterns referenced by the numeral ⑤$_2$ are arranged according to the second transfer condition, when the transfers are carried out under the top-bottom reverse mode. These transfers are also carried out under the right-left reverse mode or the color removement-non removement mode.

FIG. 23 is a more detailed breakdown of the block in FIG. 7 "RIGHT UPWARD TRANSFER".

FIG. 24 is a more detailed breakdown of the block in FIG. 7 "LEFT UPWARD TRANSFER".

FIG. 25 is a more detailed breakdown of the block in FIG. 7 "GRID TRANSFER".

FIG. 26 is a more detailed breakdown of the block in FIG. 7 "CARD INPUT".

FIG. 27 is a more detailed breakdown of the block in FIG. 7 "RANDOM INPUT".

Figure 28B:
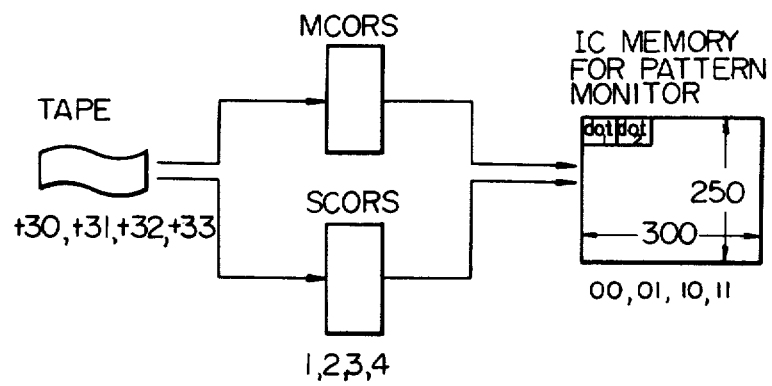

FIG. 28 is a more detailed breakdown of the block in FIG. 7 "TAPE INPUT".

Figure 29A:
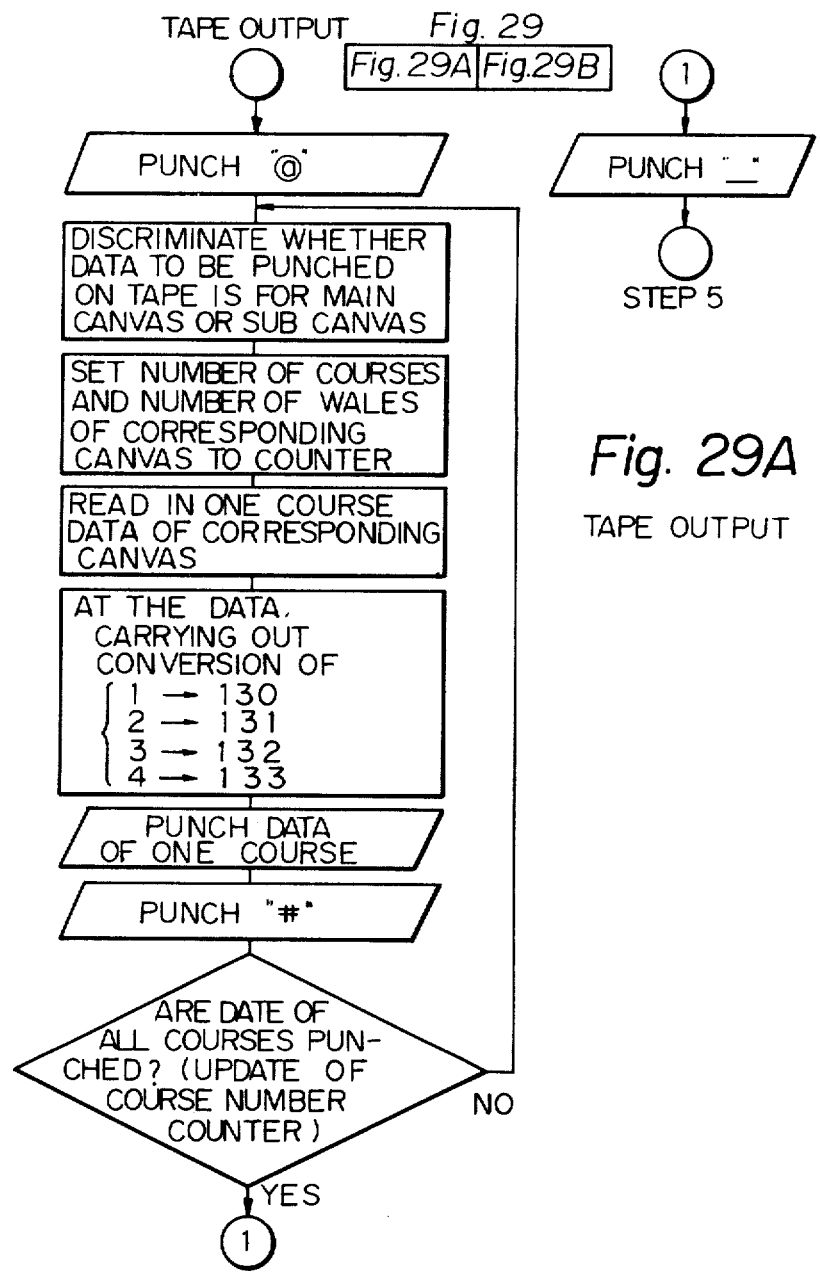

FIG. 29 is a more detailed breakdown of the block in FIG. 7 "TAPE OUTPUT".

Figure 30B:
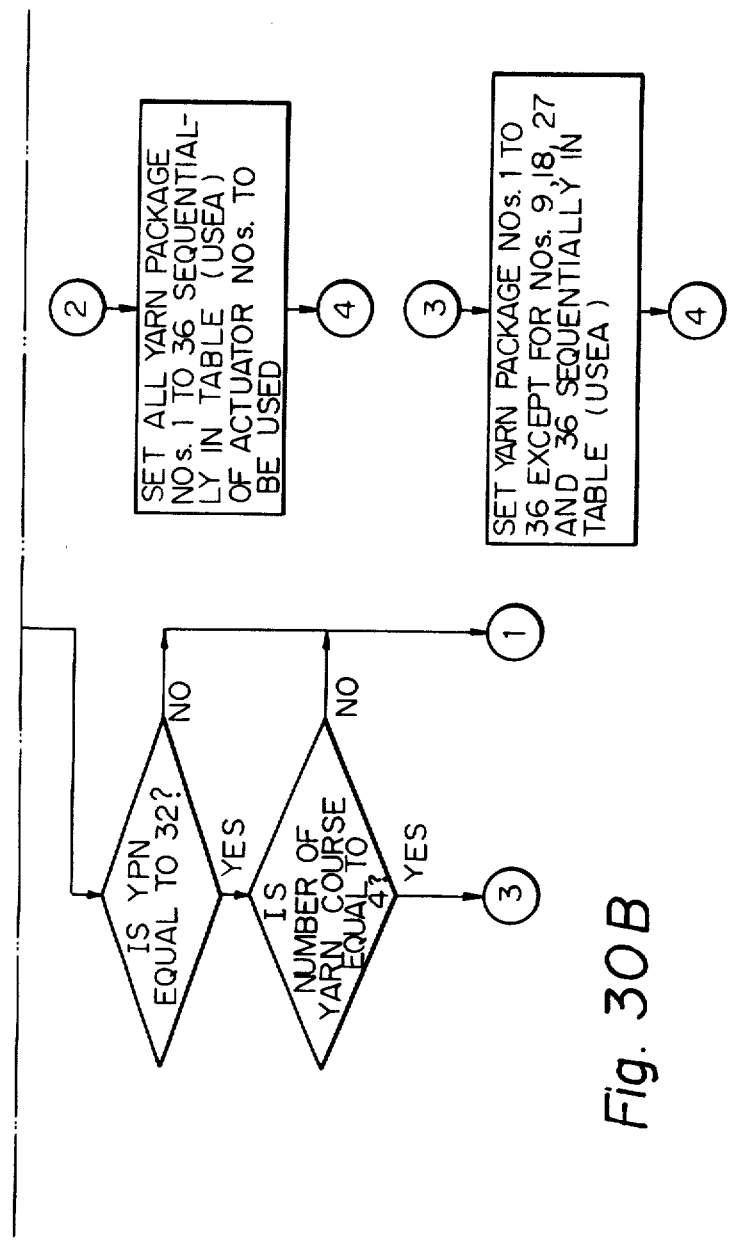
Figure 31A:
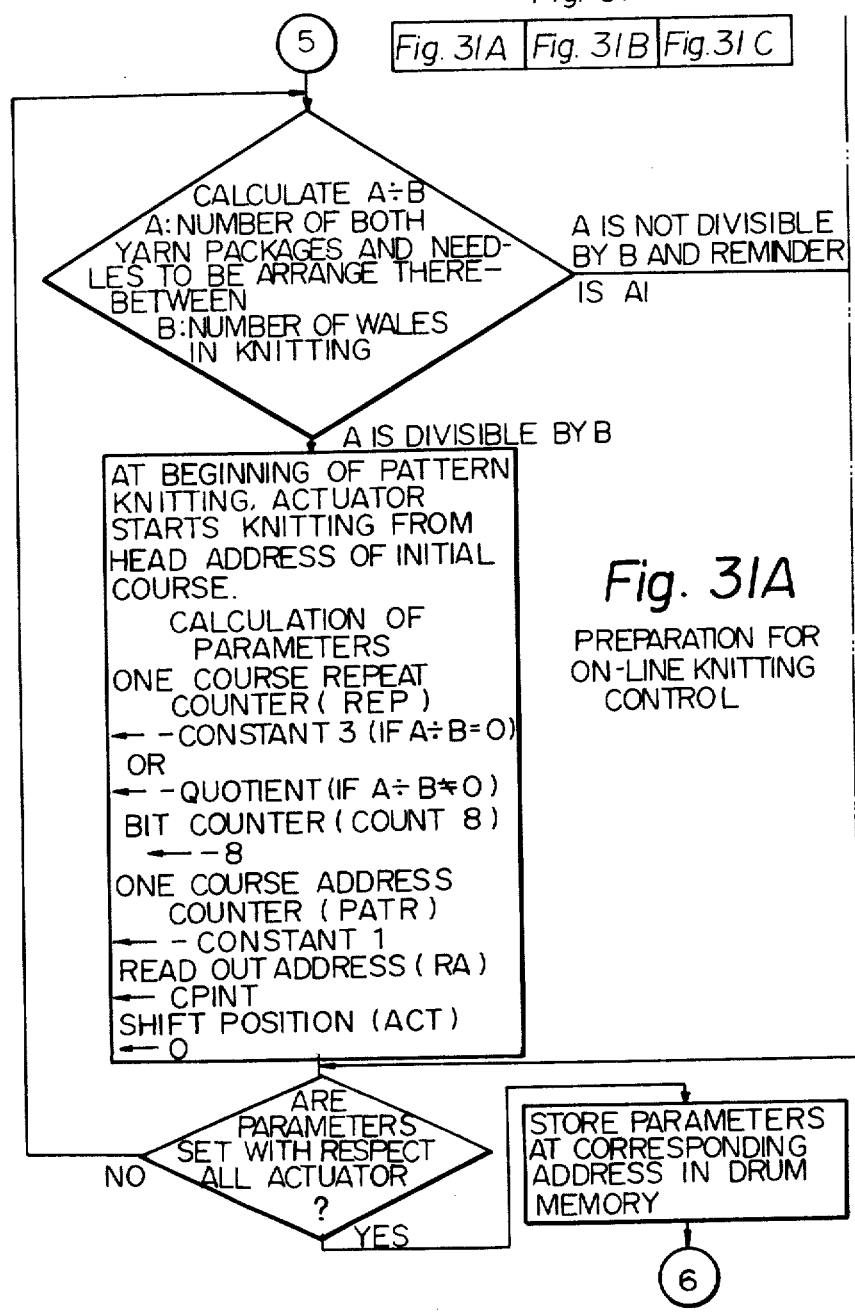
Figure 31B:
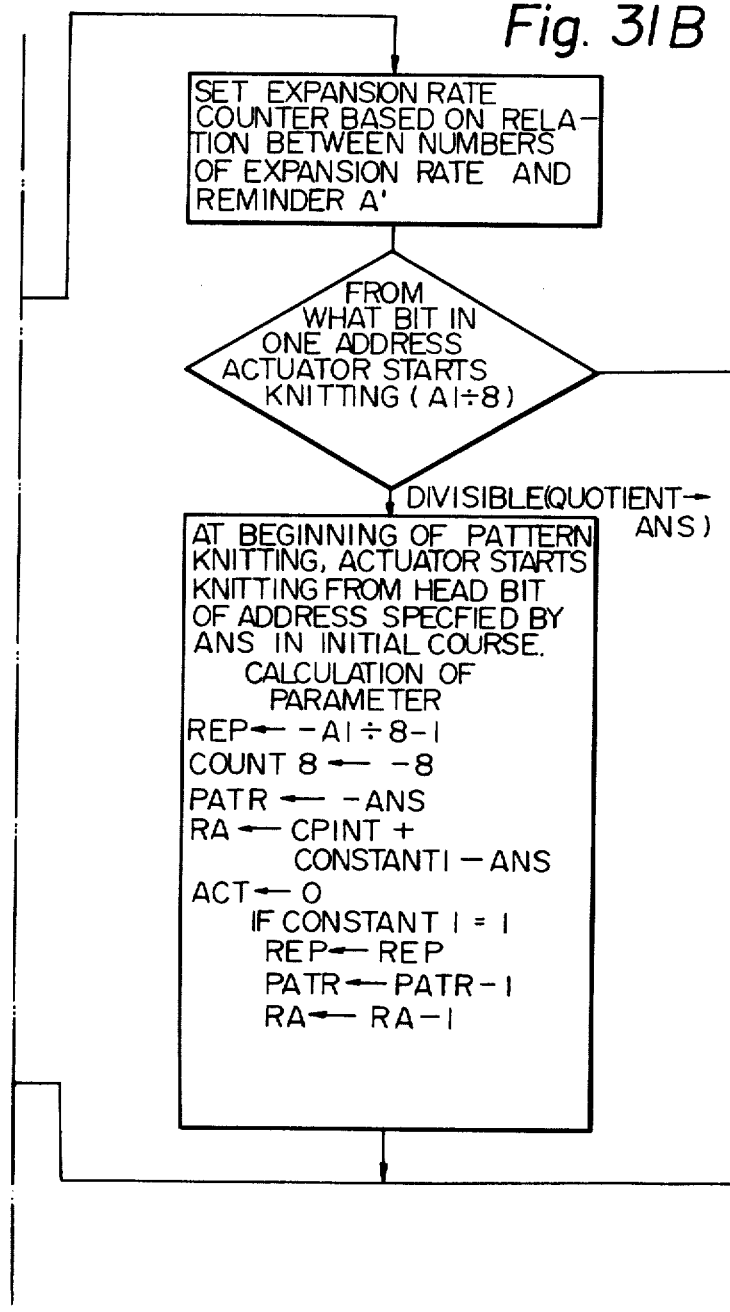
Figure 32A:
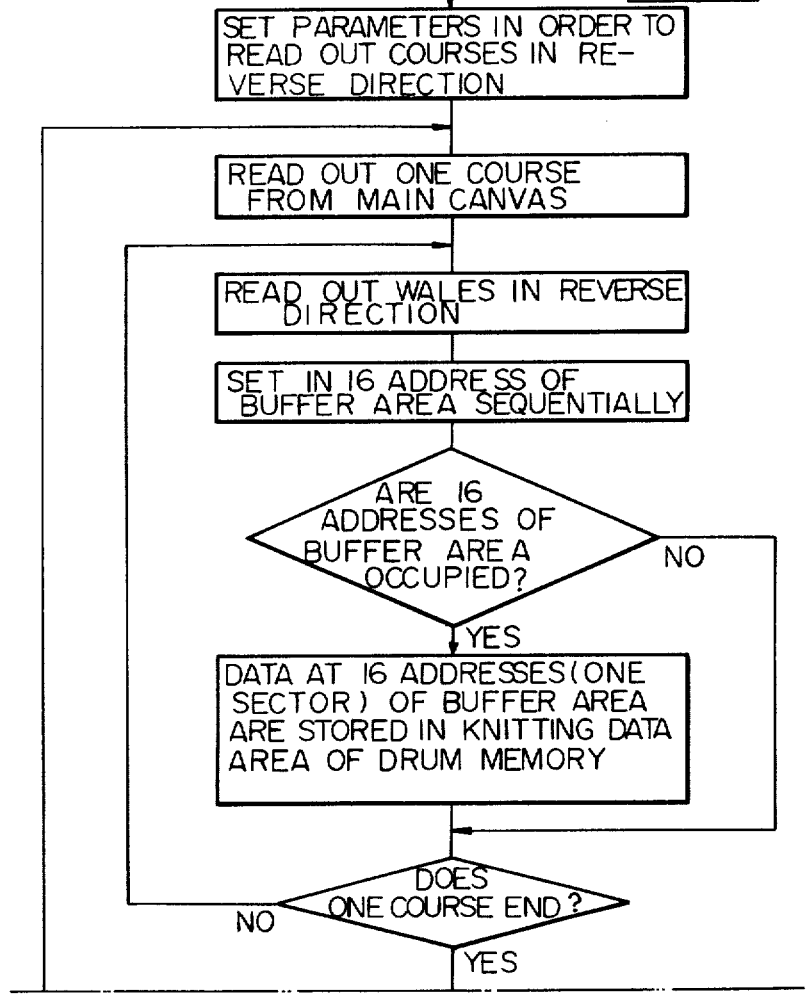
Figure 32B:
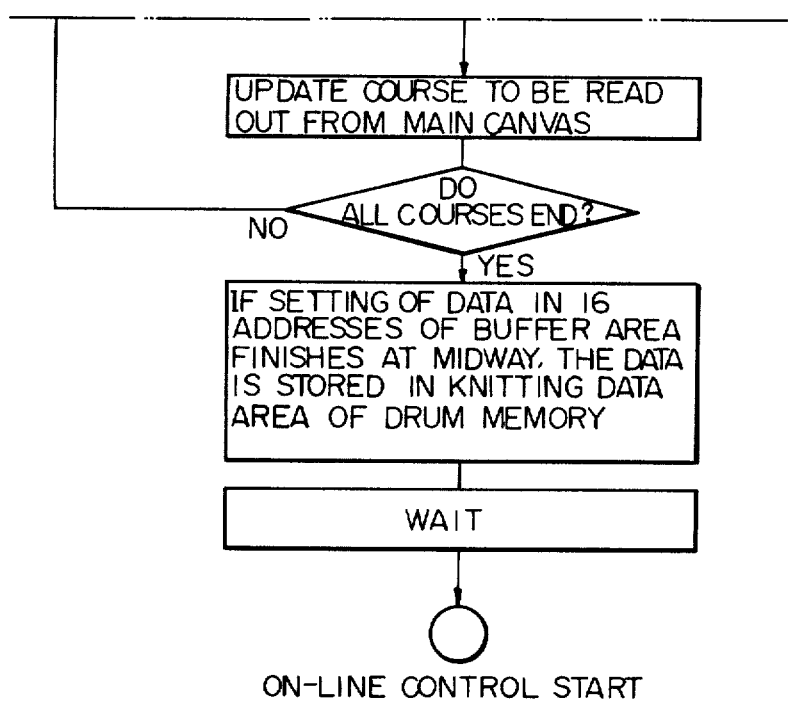

FIGS. 30, 31, and 32 are more detailed breakdowns of the block in FIG. 7 "CONTROL PREPARING PROGRAM".

As is apparent from the foregoing detailed explanation of the present invention with reference to the preferred embodiments, the present invention enables the formation of a pattern by suitable processing digital information without drawing it on a sheet of paper. With the pattern analyzing system according to the present invention, it is also possible to produce a knit pattern, by using the aforesaid digitally produced pattern or by suitably processing information representing a design drawn on a sheet of paper.

In FIGS. 20B through 25C, there are a number of blocks which include the instruction "SUPERPOSE SUB CANVAS ONTO REFERENCE COORDINATES OF TRANSFER IN PATTERN MONITOR BY CONVERTING DATA ACCORDING TO FIRST (OR SECOND) TRANSFER CONDITION". This instruction can be broken down into the following subroutine:

Step A:
 WRITE DATA TO BE TRANSFERRED FROM SUB-CANVAS IN COURSE BUFFER AREA FOR SUB-CANVAS IN ACCORDANCE WITH TOP-BOTTOM REVERSED CONDITION Step B:
 WRITE DATA TO BE TRANSFERRED FROM MAIN CANVAS IN COURSE BUFFER AREA FOR MAIN CANVAS Step C:
 DETERMINE DIRECTION ALONG WHICH DATA OF COURSE BUFFER AREA FOR SUB-CANVAS ARE READ OUT DOT BY DOT, IN ACCORDANCE WITH DISCRIMINATION OF LEFT-RIGHT REVERSE CONDITION Step D:
 TRANSER DATA OF COURSE BUFFER FOR SUB-CANVAS TO COURSE BUFFER FOR MAIN CANVAS DOT BY DOT, IN ACCOR-

DANCE WITH COLOR CHANGE CONDITION

Step E:
DOES OPERATION FOR PROCESSING DATA OF DOTS STORED IN COURSE BUFFER FOR SUB-CANVAS FINISH?
1. If "YES", go on to Step F.
2. If "NO", go back and perform Step D, etc. again.

STEP F:
DOES OPERATION FOR PROCESSING ALL DATA OF SUB-CANVAS FINISH?
1. If "YES", go on to Step G.
2. If "NO", go back and repeat STEPS A–F.

STEP G:
TRANSFER DATA OF COURSE BUFFER FOR MAIN CANVAS TO MAIN CANVAS AND TRANSFER DATA OF MAIN CANVAS TO PATTERN MONITOR
and proceed therefrom to the next program steps, as the case may be, to Step 5.

Regarding the above block A, the course buffer area for sub-canvas is a buffer area which stores all the data concerning each course sequentially supplied from the sub-canvas. The sequence for reading out data, from the sub-canvas, of each course, that is from the top of the course to the bottom thereof or from the bottom thereof to the top thereof, is determined in accordance with the top-bottom reverse condition. Thus, the data of each one of the courses is written into the buffer area along the steps defined by the above recited blocks A through E. When the data process-operation for all the courses finishes, the result of above block F becomes "YES". Regarding the above recited block B, the course buffer area for the main canvas is a buffer area which has a capacity for accommodating all the data stored in the sub-canvas and also has a capacity for accommodating the data of each one course of the main canvas.

The program list for setting up the above block D, which is realized through the assembler language for said HIDIC-500 computer, is shown below. This program concerns the program routine for transferring the color information from the main-canvas to the sub-canvas and changing the colour.

| Label | Operation | Index | Address | Comments |
|---|---|---|---|---|
| | LD | L1 | SCORS | A dot of pattern information is loaded in ACC from the course buffer in the sub-canvas. |
| | CMP | L | N2 | The color of the pattern information is tested; N2 means a code of the color number 2. |
| | NDX | | TRA05 | If the color is color number 3 or 4, the step jumps to TRA05. |
| | MDX | | TRA04 | If the color is color number 1, jump to TRA04. |
| | LD | | CHCL2 | If the color is color number 2, |
| | MDX | | TRA07 | a desired new color code is loaded into ACC, and jump to TRA07. |
| TRA04 | LD | | CHCL1 | A desired new color code for |
| | MDX | | TRA07 | the color number 1 is loaded into ACC, and jump to TRA07. |
| TRA05 | CMP | L | N3 | Test if the color is color number 3. |
| | MDX | | TRA06 | If the color is number 4, jump to TRA06. |
| | MDX | | * | If the color is number 3, execute the next instruction. |
| | LD | | CHCL3 | A new color code number 3 is |
| | MDX | | TRA07 | loaded into ACC, and jump to TRA07. |
| TRA06 | LD | | CHCL4 | A new color code number 4 is loaded into ACC. |
| TRA07 | STO | | DOTCL | A new color code is stored. |
| TRA08 | LD | L | 2 | If the coordinates of the |
| | BSC | L | TRA09, +Z | main-canvas are negative, jump to next step. |
| | LD | | DOTCL | A new color code is loaded into ACC. |
| | BSC | L | TRA09, — | If the code is colorless code, jump to next step. |
| | STO | L2 | MCORS | A new color code is stored in the course buffer of the main canvas |

Note:
The index register 1 holds the address of the course buffer in the sub-canvas. The index register 2 holds the address of the course buffer in the main-canvas.

What is claimed is:
1. A pattern generating and modifying system for producing signals representative of patterns to be knitted, comprising:
(a) input means adapted to be operated by a designer-operator,
(b) a programmable digital processing and controlling unit connected to said input means, said unit including
   (i) means for producing signals representative of predetermined design motifs of said patterns,
   (ii) means for modifying said signals thereby to alter the dimensions, position, color and selected other characteristics of said motifs or patterns, and
   (iii) means for applying said signals or modified signals to output terminals,
(c) memory means associated with said processing unit which include a main canvas data storage area and sub-canvas data storage area,
(d) monitor means coupled to one of said output terminals for visually displaying the contents of said main and sub-canvas areas including said motifs or patterns which have been generated in response to said signals or modified signals,
said processing and controlling unit also including means to transfer data signals between said main and sub-canvas storage areas, means to control said monitor means, means to control the application of said signals or modified signals to predetermined ones of said output terminals, and means to cooperate in controlling said input means.

2. The system according to claim 1 wherein said input means also includes means for producing electrical signals representative of a pre-existing design or design components, said signals being applied to said processing and control unit.

3. The system according to claim 1 wherein said input means includes manually operable keys for initiating the production of said signals representative of said predetermined design motifs and the production of said modified signals.

4. The system according to claim 3 wherein said signals representative of said predetermined design motifs represent motifs including lines, checks and borders.

5. A pattern generating system according to claim 1 wherein said output terminals are connected to means for converting the information stored in the main canvas memory to indicia on cards.

6. A pattern generating system according to claim 1 wherein said digital processing and controlling unit is constructed to apply the information in the main canvas memory as electrical signals to said output terminals to which a utilization circuit for said signals is coupled.

7. A pattern generating and modifying system for producing signals representative of patterns to be knitted, comprising:
(a) input means for receiving input data relating to patterns to be knitted,
(b) an operational unit connected to said input means, the operational unit including
  (i) means for producing signals representative of predetermined design motifs of said patterns,
  (ii) means for modifying said signals thereby to alter the dimensions, position, color and selected other characteristics of said motifs or patterns, and
  (iii) means for applying said signals or modified signals to a monitoring unit.
(c) memory means connected to said operational unit, including a main canvas data storage area and a sub-canvas data storage area,
said monitoring unit having a means for visually displaying the contents of said main and sub-canvas areas each of which stores said motifs or patterns which have been generated in response to said signals or modified signals,
said operational unit further including
  (i) means for transferring data signals between said main and sub-canvas storage areas,
  (ii) means for controlling said monitoring unit,
  (iii) means for processing said signals or modified signals, said means for processing said signals or modified signals including at least one processor for setting up, in said main and sub-canvas data storage areas, ground color, points, straight lines, strips, check, border, oblique or bias patterns, random input, simple transfer, horizontal transfer, vertical transfer, right upward transfer, left upward transfer and lattice or grid transfer.
  (iv) means for cooperating in controlling said input means, and
  (v) means for transferring the processed output signal from said main canvas storage area to an output means adapted to be connected to a machine to be driven by said pattern generating and modifying system.

* * * * *